United States Patent
Lee et al.

(10) Patent No.: US 11,435,974 B2
(45) Date of Patent: Sep. 6, 2022

(54) DISPLAY DEVICE, MOBILE DEVICE, SCREEN MIRRORING METHOD OF DISPLAY DEVICE, AND SCREEN MIRRORING METHOD OF MOBILE DEVICE

(71) Applicant: SAMSUNG ELECTRONICS CO., LTD., Suwon-si (KR)

(72) Inventors: Jongin Lee, Suwon-si (KR); Kilsoo Choi, Suwon-si (KR); Sehyun Kim, Suwon-si (KR); Kwansik Yang, Suwon-si (KR); Jaesoon Lee, Suwon-si (KR); Dahee Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/952,916

(22) Filed: Nov. 19, 2020

(65) Prior Publication Data
US 2021/0149618 A1    May 20, 2021

(30) Foreign Application Priority Data
Nov. 19, 2019  (KR) ................. 10-2019-0149113

(51) Int. Cl.
*G06F 3/14*    (2006.01)
*G06F 3/16*    (2006.01)

(52) U.S. Cl.
CPC ............. *G06F 3/1454* (2013.01); *G06F 3/16* (2013.01)

(58) Field of Classification Search
CPC ............... G06F 3/1454; G06F 3/1446; G06F 2203/04803; G09G 2370/20; H04N 21/4126
See application file for complete search history.

(56) References Cited

U.S. PATENT DOCUMENTS

| 10,776,068 B2 | 9/2020 | Hong et al. |
| 2013/0219072 A1 | 8/2013 | Han et al. |
| 2014/0298355 A1* | 10/2014 | Kim ......................... G06F 9/54 719/313 |
| 2015/0288912 A1* | 10/2015 | Chun ............... H04N 21/42204 348/552 |

(Continued)

FOREIGN PATENT DOCUMENTS

| KR | 10-2015-0073573 A | 7/2015 |
| KR | 10-2016-0092363 A | 8/2016 |

(Continued)

OTHER PUBLICATIONS

Communication dated Jun. 1, 2021, from the European Patent Office in European Application No. 20208626.0.

(Continued)

*Primary Examiner* — Priyank J Shah
(74) *Attorney, Agent, or Firm* — Sughrue Mion, PLLC

(57) ABSTRACT

A screen mirroring method includes: when a display device mirrors a screen of a mobile device simultaneously performing a plurality of tasks, splitting a screen of the display device into a plurality of partial screens; receiving a plurality of pieces of window data corresponding to the plurality of tasks, respectively; and displaying a plurality of images corresponding to the plurality of tasks, on the plurality of partial screens, respectively, based on the plurality of pieces of window data.

19 Claims, 33 Drawing Sheets

(56) References Cited

U.S. PATENT DOCUMENTS

2017/0235435 A1* 8/2017 Sohn .................... G06F 3/0481
                                                    715/738
2017/0364249 A1* 12/2017 Kumaki .................... G06F 3/14
2021/0042132 A1    2/2021 Park et al.

FOREIGN PATENT DOCUMENTS

| KR | 10-2017-0027435 A | 3/2017 |
| KR | 10-2017-0081454 A | 7/2017 |
| KR | 101918040 B1 | 1/2019 |
| WO | 2019/088793 A1 | 5/2019 |

OTHER PUBLICATIONS

International Search Report and Written Opinion dated Feb. 23, 2021, issued by the International Searching Authority in International Application No. PCT/KR2020/016336 (PCT/ISA/220, 210, 237).

* cited by examiner

DISPLAY DEVICE, MOBILE DEVICE, SCREEN MIRRORING METHOD OF DISPLAY DEVICE, AND SCREEN MIRRORING METHOD OF MOBILE DEVICE

CROSS-REFERENCE TO RELATED APPLICATION

This application is based on and claims priority under 35 U.S.C. § 119 to Korean Patent Application No. 10-2019-0149113, filed on Nov. 19, 2019, in the Korean Intellectual Property Office, the disclosure of which is herein incorporated by reference in its entirety.

BACKGROUND

1. Field

The disclosure relates to a display device and a mobile device, which are capable of performing screen mirroring, and screen mirroring methods of the display device and the mobile device.

More particularly, the disclosure relates to a method, performed by a display device, of mirroring a screen of a mobile device simultaneously performing a plurality of tasks, and the display device and mobile device therefor.

2. Description of Related Art

With the development of wired or wireless communication networks, electronic devices that display a screen and output data visually recognizable to a user may be connected to each other.

The electronic devices may transmit data to and receive data from each other through the wired or wireless communication networks. In addition, an electronic device may remotely control the other electronic device, or an electronic device may be used via the other electronic device. To perform control of the electronic devices described above, mirroring techniques are used.

The mirroring techniques refer to techniques for sharing and manipulating screen data between devices including displays.

The mirroring techniques have been developed to be applied to electronic devices that may output a screen through a display, such as portable computers, such as notebook computers, netbook computers, or tablet personal computers (PCs), portable terminals, such as smartphones or personal digital assistants (PDAs), and televisions (TVs). In addition, the mirroring techniques may be applied to a plurality of electronic devices to provide a mirroring service, whereby screens may be shared and the plurality of electronic devices may be remotely controlled by one another. Here, mirroring may also be referred to as screen mirroring.

To provide the mirroring service, data about a screen (or an image) that is to be shared may be transmitted from a device providing the image to a device receiving the image. Here, the device providing the image may be referred to as a source device or a master device, and the device receiving the image may be referred to as a sink device or a client device. Hereinafter, the device providing the image will be referred to as the source device, and the device receiving the image will be referred to as the sink device.

A user of an electronic device providing a small screen, such as a smartphone, may like to watch an enlarged version of a desired image by using an electronic device having a large screen, such as a TV, etc.

As described above, when providing the mirroring service by using a plurality of electronic devices, it is required to provide a screen mirroring method for increasing user convenience and satisfaction and an electronic device implementing the screen mirroring method.

SUMMARY

Provided are a display device and a mobile device and a screen mirroring method of the display device and a screen mirroring method of the mobile device for increasing user convenience or user satisfaction when the display device mirrors and outputs a screen of the mobile device.

More particularly, provided are a display device and a mobile device and a screen mirroring method of the display device and a screen mirroring method of the mobile device for allowing a user to conveniently view, through the display device, a screen of the mobile device simultaneously performing a plurality of tasks.

Additional aspects will be set forth in part in the description which follows and, in part, will be apparent from the description, or may be learned by practice of the presented embodiments of the disclosure.

According to an embodiment of the disclosure, a screen mirroring method of a display device includes: in response to screen mirroring when the display device is requested to mirror a screen of a mobile device simultaneously performing a plurality of tasks, splitting a screen of the display device into a plurality of partial screens; receiving a plurality of pieces of window data corresponding to the plurality of tasks, respectively; and displaying a plurality of images corresponding to the plurality of tasks, on the plurality of partial screens, respectively, based on the plurality of pieces of window data.

The screen mirroring method may further include receiving, from the mobile device, a control signal including information for splitting the screen of the display device into the plurality of partial screens. The splitting of the screen of the display device may include splitting the screen of the display device based on the information for splitting the screen of the display device into the plurality of partial screens.

The control signal may include information about the number of the plurality of tasks.

The splitting of the screen of the display device may include splitting the screen of the display device into the plurality of partial screens according to the number of the plurality of tasks.

The splitting of the screen of the display device may include splitting the screen of the display device into the plurality of partial screens, based on the number of the plurality of tasks, an aspect ratio of a display included in the mobile device, and an aspect ratio of a display included in the display device.

The screen mirroring method may further include, when at least two tasks of the plurality of tasks are accompanied by an audio output, outputting, via the display device, audio data that is selected from the at least two tasks.

The outputting of the audio data may include outputting audio data of a task of the at least two tasks, the task corresponding to a window that is output on a main screen portion of the screen of the mobile device.

The outputting of the audio data may include selecting a task of the at least two tasks based on at least one of an application type or a task type, and outputting audio data corresponding to the selected task.

The screen mirroring method may further include: transmitting information for notifying about an occurrence of a change in at least one of the plurality of tasks performed by the mobile device; and again splitting the screen of the display device based on the information for notifying about the occurrence of the change.

The screen mirroring method may further include performing a pairing operation between the mobile device and the display device. The performing of the pairing operation may include transmitting, via the display device, information about the screen of the display device to the mobile device.

The screen mirroring method may further include setting the screen of the display device that includes the plurality of partial screens, based on a user input.

The displaying of the plurality of images may include displaying the plurality of images including at least one image, which is not output on the screen of the mobile device.

According to an embodiment of the disclosure, a display device includes: a display; a communicator configured to communicate with a mobile device; and a processor configured to execute at least one instruction to: split a screen of the display device into a plurality of partial screens, in response to a request from the display device to mirror a screen of the mobile device simultaneously performing a plurality of tasks; control the communicator to receive a plurality of pieces of window data corresponding to the plurality of tasks, respectively; and control, based on the plurality of pieces of window data, the display to display a plurality of images corresponding to the plurality of tasks on the plurality of partial screens, respectively.

The processor may further be configured to execute the at least one instruction to: control the communicator to receive, from the mobile device, a control signal including information for splitting the screen of the display device into the plurality of partial screens; and split the screen of the display into the plurality of partial screens based on the information for splitting the screen of the display device into the plurality of partial screens.

The processor may further be configured to execute the at least one instruction to split the screen of the display into the plurality of partial screens, according to a number of the plurality of tasks.

The processor may further be configured to execute the at least one instruction to split the screen of the display into the plurality of partial screens, based on the number of the plurality of tasks, an aspect ratio of a display included in the mobile device, and an aspect ratio of the display.

The display device may further include: an audio outputter configured to output audio data, wherein the processor is further configured to execute the at least one instruction to, control the audio outputter to output audio data that is selected from at least two tasks of the plurality of tasks, when the at least two tasks include an audio output.

The processor may further be configured to execute the at least one instruction to output audio data of a task from the at least two tasks, the task corresponding to a window that is output on a main screen portion of the screen of the mobile device.

According to an embodiment of the disclosure, a mobile device includes: a display; a user interface; a communicator configured to communicate with a display device; and a processor configured to execute at least one instruction to: transmit, to the display device, a control signal for requesting that a screen of the display device be split into a plurality of partial screens, when the display device mirrors a screen that is output via the display while a plurality of tasks are simultaneously performed, and transmit, to the display device, a plurality of pieces of window data corresponding to the plurality of tasks, respectively.

Each of the plurality of pieces of window data may include data for generating an image corresponding to at least a portion of a window which is output through the display, when each of the plurality of tasks is performed.

The processor may further be configured to execute the at least one instruction to control the communicator to transmit, to the display device, the control signal comprising at least one of a number of the plurality of tasks, an aspect ratio of the display, a priority order of the plurality of tasks, or information about a task output on a main screen portion of the display from among the plurality of tasks.

The processor may further be configured to execute the at least one instruction to transmit, to the display device, information about a change in at least one of the plurality of tasks, when the change occurs in at least one of the plurality of tasks which are simultaneously performed.

The plurality of tasks may include a first task and a second task. The processor may further be configured to execute the at least one instruction to control the communicator to transmit the control signal to the display device, in response to a first input requesting that the second task be performed while the first task is performed.

The processor may further be configured to execute the at least one instruction to: control the communicator to transmit, to the display device, the control signal requesting that the screen of the display device be split into a first partial screen and a second partial screen respectively corresponding to a first window corresponding to the first task and a second window corresponding to the second task, in response to the first input; and control the communicator to transmit first window data corresponding to the first window and the second window data corresponding to the second window to the display device.

According to an embodiment of the disclosure, a screen mirroring method of a mobile device includes: when a display device mirrors a screen of the mobile device simultaneously performing a plurality of tasks, transmitting, to the display device, a control signal to split a screen of the display device into a plurality of partial screens; and transmitting, to the display device, a plurality of pieces of window data corresponding to the plurality of tasks, respectively. The plurality of pieces of window data may respectively correspond to a plurality of images output on the plurality of partial screens.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
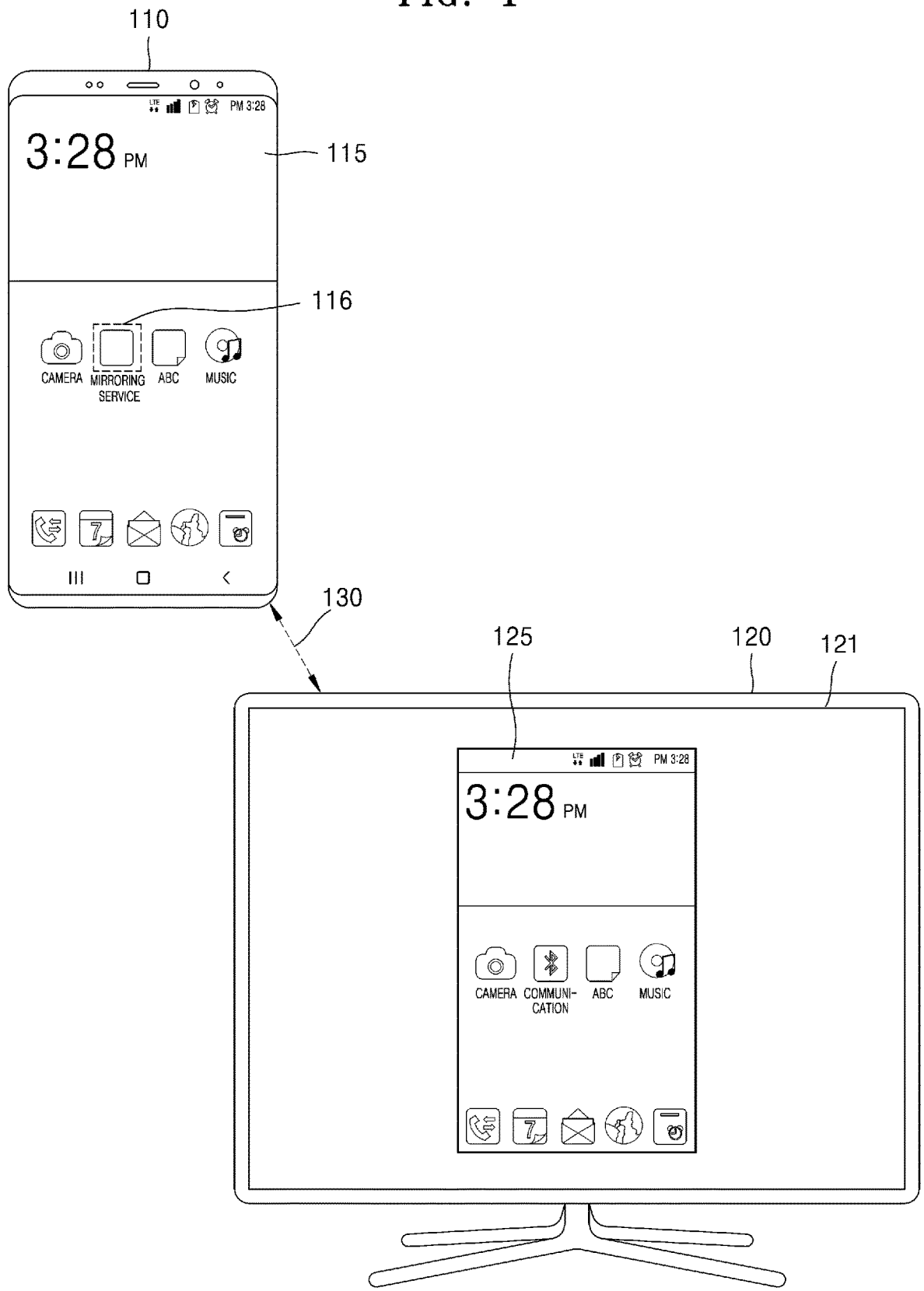
FIG. 1 is a diagram for describing screen mirroring between a mobile device and a display device.

Hereinafter, embodiments of the disclosure will be described in detail with reference to the accompanying drawings for one of ordinary skill in the art to easily understand the disclosure. However, the disclosure may have different forms and should not be construed as being limited to the embodiments described herein. Also, in the drawings, parts not related to descriptions are omitted for the clear description of the disclosure, and throughout the specification, like reference numerals denote like elements.

Throughout the specification, when a part is referred to as being "connected" to other parts, the part may be "directly connected" to the other parts or may be "electrically connected" to the other parts with other devices therebetween. When a part "includes" or "comprises" a certain element, unless it is specifically mentioned otherwise, the part may further include or comprise another component and may not exclude the other component.

The expressions such as "in some embodiments," "according to an embodiment," and the like, described in various parts of this specification do not necessarily refer to the same element as one another.

One or more embodiments of the disclosure may be described as functional block components and various processing operations. All or part of such functional blocks may be realized by any number of hardware and/or software components configured to perform the specified functions. For example, the functional blocks of the disclosure may be implemented with one or more micro-processors or with circuit structures for certain functions. Also, for example, the functional blocks of the disclosure may be implemented with various programming or scripting languages. The functional blocks may be implemented with algorithms executed by one or more processors. Furthermore, the disclosure could employ conventional techniques for electronics configuration, signal processing and/or data control. The words "module," "element," "configuration," etc. may be broadly used and are not limited to mechanical or physical components.

Furthermore, the connecting lines, or connectors shown in the drawings are intended to represent example functional relationships and/or physical or logical couplings between the various elements. It should be noted that many alternative or additional functional relationships, physical connections or logical connections may be present in a practical device.

Herein, the expression "at least one of A, B, and C" indicates any one of "A," "B," "C," "A and B," "A and C," "B and C," and "A, B, and C."

Throughout the disclosure, the expression "at least one of a, b or c" indicates only a, only b, only c, both a and b, both a and c, both b and c, all of a, b, and c, or variations thereof.

According to embodiments of the disclosure, electronic devices performing screen mirroring and screen mirroring methods using the electronic devices are provided.

According to embodiments of the disclosure, the electronic devices may include all types of electronic devices that are capable of providing a mirroring service by sharing and displaying screens. Also, according to embodiments of the disclosure, the electronic devices may include an electronic device operating as a sink device in screen mirroring and an electronic device operating as a source device in screen mirroring. The electronic devices capable of providing the mirroring service may include electronic devices which are capable of outputting screens through displays, such as portable computers including notebook computers, netbook computers, or tablet personal computers (PCs), portable terminals including smartphones or personal digital assistants (PDAs), and televisions (TVs).

According to embodiments of the disclosure, the electronic device operating as the source device in the screen mirroring may include an electronic device that is portable and hereinafter will be referred to as "a mobile device." Also, the electronic device operating as the sink device in the screen mirroring may include an electronic device that provides a large screen through a larger display than the mobile device and hereinafter will be referred to as "a display device."

In detail, the mobile device may be an electronic device that is portable to a user and may include a wearable device, a smartphone, a tablet PC, a PDA, a laptop computer, a media player, and the like. Also, the display device may be an electronic device including a larger display than the mobile device described above, to provide a user with a larger screen than the mobile device. For example, the display device may include a TV, a digital TV, a smart TV, a digital signage, a digital signpost, and the like.

In the accompanying drawings, like elements are indicated by using like reference numerals. Also, throughout the detailed descriptions, like elements are referred to by using like terms.

Hereinafter, a display device, a mobile device, and screen mirroring methods using the display device and the mobile device, according to embodiments of the disclosure, will be described in detail by referring to the accompanying drawings.

FIG. 1 is a diagram for describing screen mirroring between a mobile device 110 and a display device 120.

Referring to FIG. 1, a mirroring service may be provided to a user by using a plurality of electronic devices including the mobile device 110 and the display device 120.

Here, the mirroring service may be provided by using three or more electronic devices, based on a 1-on-n connection method, an n-to-1 connection method, or an n-to-m connection method (here, n and m are natural numbers greater than or equal to 2). According to an embodiment of the disclosure, a case in which the mirroring service is provided by using two electronic devices including the mobile device 110 and the display device 120 based on a 1-on-1 connection method will be described as an example.

Referring to FIG. 1, with respect to the two electronic devices providing the mirroring service, a source device may correspond to the mobile device 110, which is portable to a user, and a sink device may correspond to the display device 120, which is watched by the user. FIG. 1 illustrates an example in which the mobile device 110 corresponds to a user's smartphone, and the display device 120 corresponds to a TV, particularly, a smart TV.

To watch an image that is output on the mobile device 110 through a large screen, the user may use a mirroring service between the mobile device 110 and the display device 120.

Here, the mobile device 110 and the display device 120 may be connected to each other through a wired or wireless communication network.

When the mirroring service is used, a screen 115 that is output through a display of the mobile device 110 may be mirrored to be output by the display device 120. Here, a display screen 121 may directly denote an image that is output by the display device 120 or an area on which an image is displayed through a display included in the display device 120.

FIG. 1 illustrates an example in which the mobile device 110 displays the screen 115, for example, a user interface screen, on which a plurality of menus are displayed in the form of icons. For example, the screen 115 may include at least one icon corresponding to a task, an application, and/or a service to be executed by the mobile device 110. For example, the screen 115 may include a camera use icon, a mirroring service use icon, a dictionary (indicating "ABC") icon, a music play icon (indicating "MUSIC"), and the like.

The user may request an execution of a mirroring service by touching an icon 116 corresponding to the mirroring service on the screen 115. When the mobile device 110 receives a user input for requesting an execution of the mirroring service, the mobile device 110 may transmit data used to generate the screen 115 that is displayed, to the display device 120, through a communication network 130. Then, the display device 120 may display a screen 121 corresponding to the screen 115 that is output by the mobile device 110, by using the received data. Here, the screen 121 that is output by the display device 120 may include all or part of the screen 115 that is output by the mobile device 110. That is, a mirrored image may correspond to an enlarged or reduced version of an image that is mirrored.

Also, the communication network 130 connecting the mobile device 110 with the display device 120 may denote a wired or wireless communication network for transceiving certain data. For example, the communication network 130 may be configured according to the wireless network standards, such as a local area network (LAN), a wide area network (WAN), a wireless LAN (WLAN) (or Wifi), wireless broadband (Wibro), code-division multiple access (CDMA), wideband CDMA (WCDMA), near field communication (NFC), Bluetooth, or the like. Also, the communication network 130 may include a wired network connecting the mobile device 110 with the display device 120 using wired cables, such as a high-definition multimedia interface (HDMI) cable or a mobile high-definition link (MHL) cable.

Also, mirroring techniques used to provide the mirroring service may include display as a service (Daas), Miracast, Airplay, a digital living network alliance (DLNA), etc., but are not limited thereto. According to an embodiment of the disclosure, to transmit, to the display device 120, information or data about a screen corresponding to the screen that is output by the mobile device 110, the mirroring techniques described above may be used.

The mobile device 110 may simultaneously execute a plurality of tasks. Here, the tasks may correspond to components of jobs executed or performed by a computing device and may denote executed operations of specific jobs of the computing device. Also, the tasks may denote processes, threads, or programs for performing specific jobs. Also, to simultaneously perform a plurality of tasks may be referred to as multi-tasking.

According to an embodiment of the disclosure, the mobile device 110 may correspond to a computing device capable of multi-tasking and may simultaneously perform at least two tasks. Also, when a certain application is executed by the mobile device 110, at least one task corresponding to the application may be executed. That is, at least one task may be performed to execute a certain application.

The mobile device 110 has been developed to increase user convenience via providing various services, functions, or applications which may be controlled by a user. Also, a user may simultaneously execute a plurality of applications.

Thus, when a screen of the mobile device 110 performing multi-tasking is mirrored, a mirroring method for increasing user satisfaction via reflecting a user request for a simultaneous execution of a plurality of applications may be required.

Hereinafter, for convenience of description, a program for performing services, functions, or specific operations in the mobile device 110 will be referred to as an "application." For example, when the mobile device 110 corresponds to a smartphone, at least one instruction for realizing a calling function, which is one of main functions, may be referred to as a "calling application." As another example, a specific game program, which is downloaded from an external application providing server, etc. onto the mobile device 110, may be referred to as a "game application." When an application is executed, one or more tasks to execute an intended operation may be performed. That is, the execution of the application may be accompanied with the performance of the one or more tasks. In detail, an execution of one application may be accompanied with an execution of one task, or the execution of one application may be accompanied with an execution of a plurality of tasks.

For example, there is an application for providing video content, as an example of the application executed by the mobile device 110. When the application for providing the video content is executed, the mobile device 110 may simultaneously perform a task for playing video content and a task for displaying a list of video content. In this case, the mobile device 110 may simultaneously perform the plurality of tasks in correspondence to the execution of one application.

As another example, the mobile device 110 may simultaneously execute a plurality of applications. In this case, the mobile device 110 may simultaneously perform a plurality of tasks in correspondence to the execution of the plurality of applications.

Also, when the tasks are performed, the mobile device 110 may visually output windows corresponding to the tasks through a display. Here, the windows may include information indicating the performance of the tasks, data generated when the tasks are performed, and the like. Also, the windows may be referred to as task execution windows or execution windows. In detail, the windows may refer to images that are output on the display of the mobile device 110, when the tasks are performed.

The plurality of windows corresponding to the plurality of tasks performed by the mobile device 110 may be output on the screen 115 of the display. Also, when the plurality of tasks are simultaneously performed, one or more of the plurality of windows corresponding to the plurality of tasks may be output on the screen 115 of the display.

Here, when a window corresponding to a certain task is not output on the screen 115 of the display, it indicates that the task is performed in a background environment or minimized.

Also, a window corresponding to a certain task may be output on a partial screen included in the whole screen. For example, a window corresponding to a certain task may be output in the form of a floating window on the whole screen. Here, a window that is output on the whole screen may correspond to a task performed in a foreground environment or maximize. Also, the window that is output in the form of the floating window described above may correspond to a task performed in a background environment.

Hereinafter, examples of screens that are output through a display of the mobile device 110 when the mobile device 110 performs at least one task while executing at least one application will be described by referring to FIGS. 2 through 7.

Figure 4:
FIG. 4 is a diagram illustrating another screen of the mobile device, which is to be mirrored.
Figure 5:
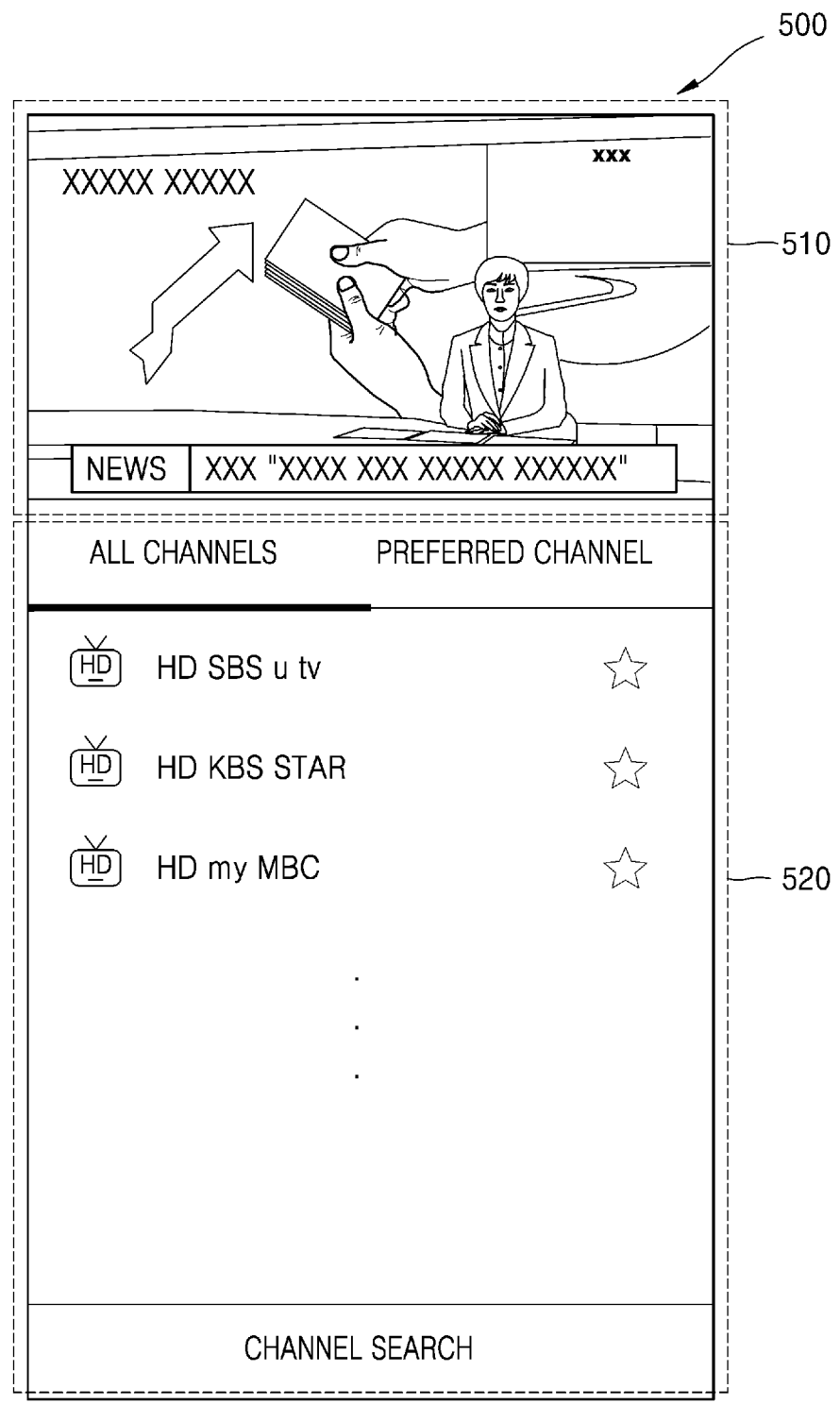
FIG. 5 is a diagram illustrating another screen of the mobile device, which is to be mirrored.
Figure 6:
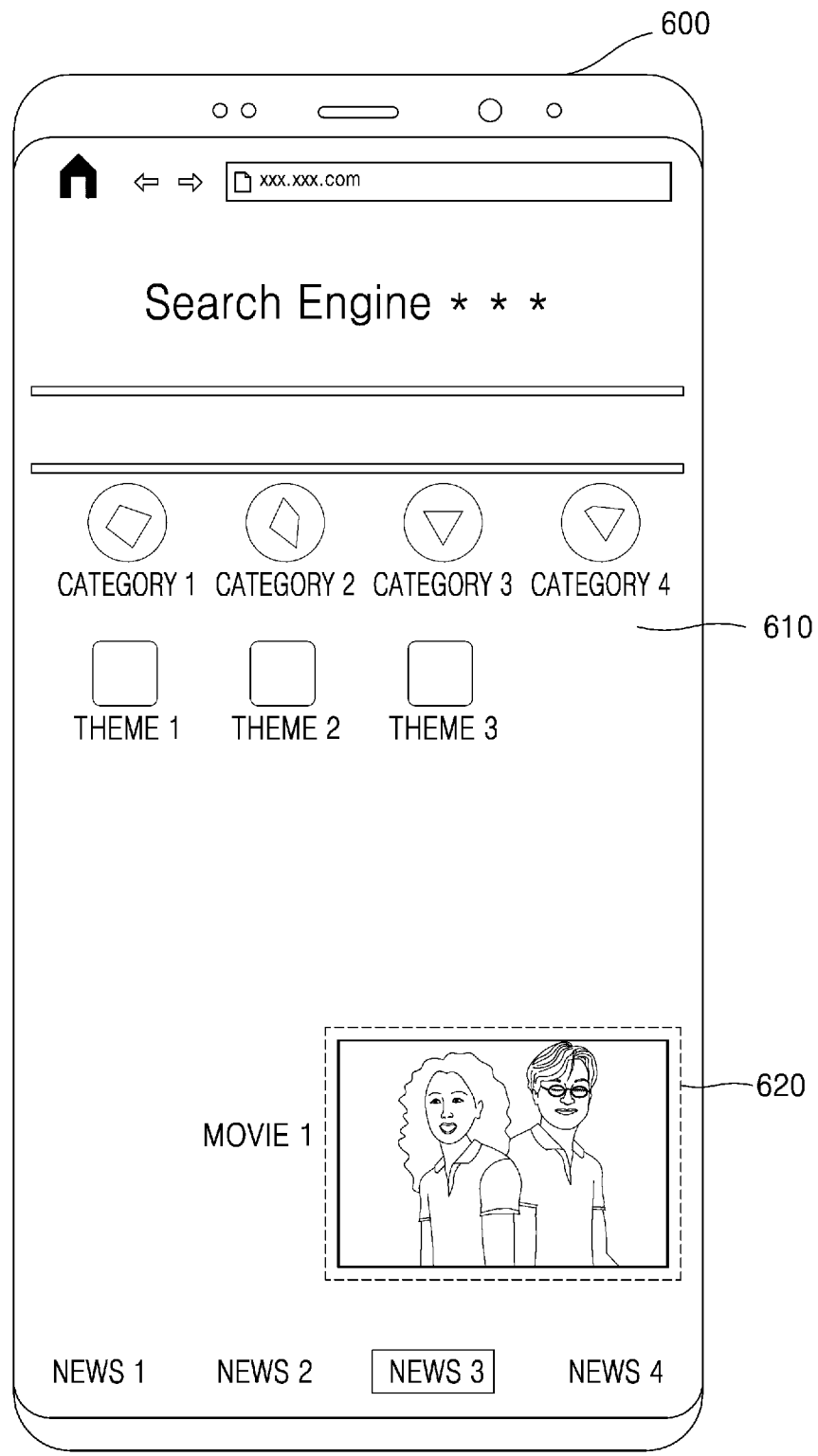
FIG. 6 is a diagram illustrating another screen of the mobile device, which is to be mirrored.
Figure 7:
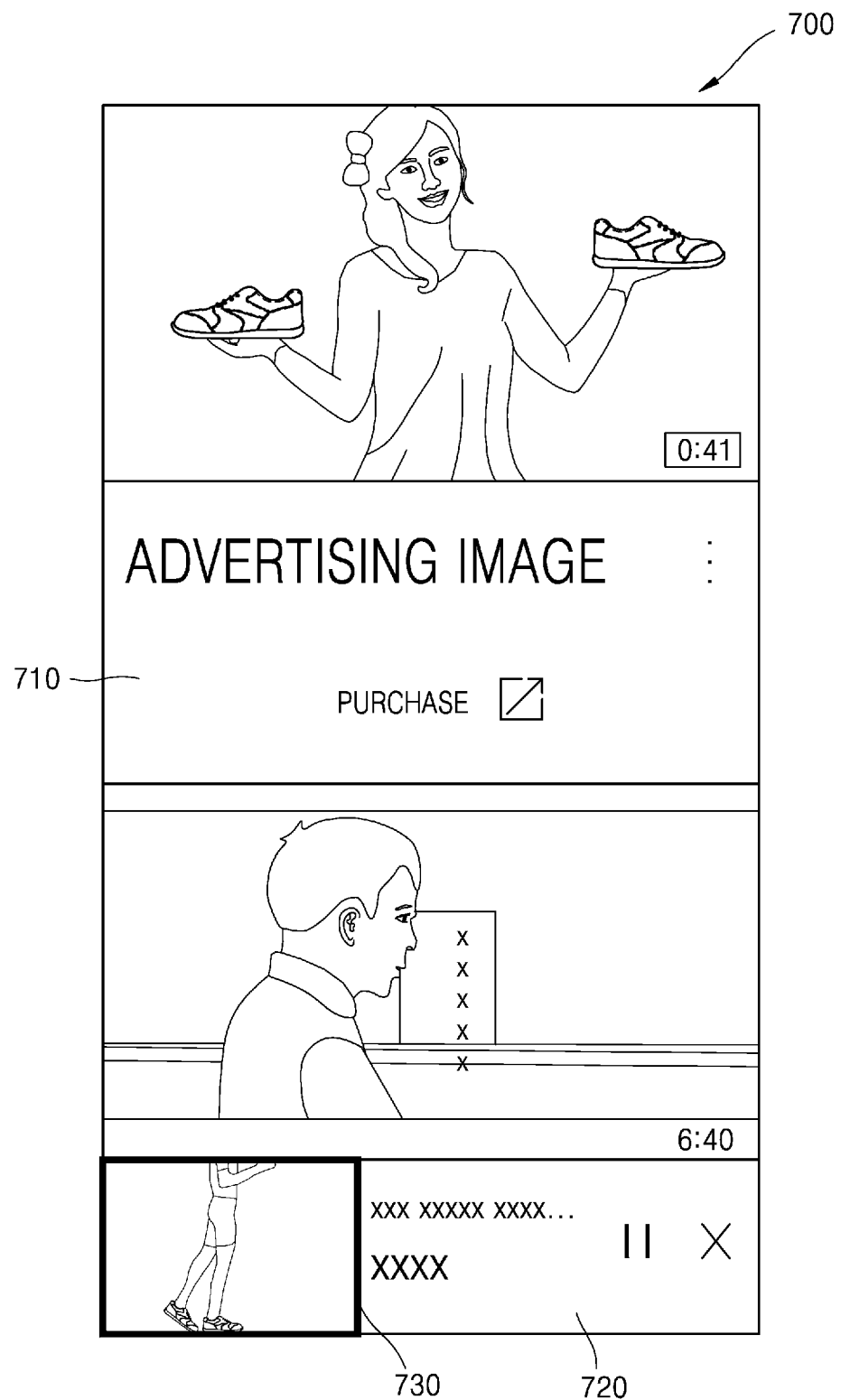
FIG. 7 is a diagram illustrating another screen of the mobile device, which is to be mirrored.

In detail, FIGS. 2 through 5 illustrate examples in which the mobile device 110 visually outputs the screen including one window, and FIGS. 6 and 7 illustrate examples in which the mobile device 110 visually outputs the screen including a plurality of windows.

Figure 2:
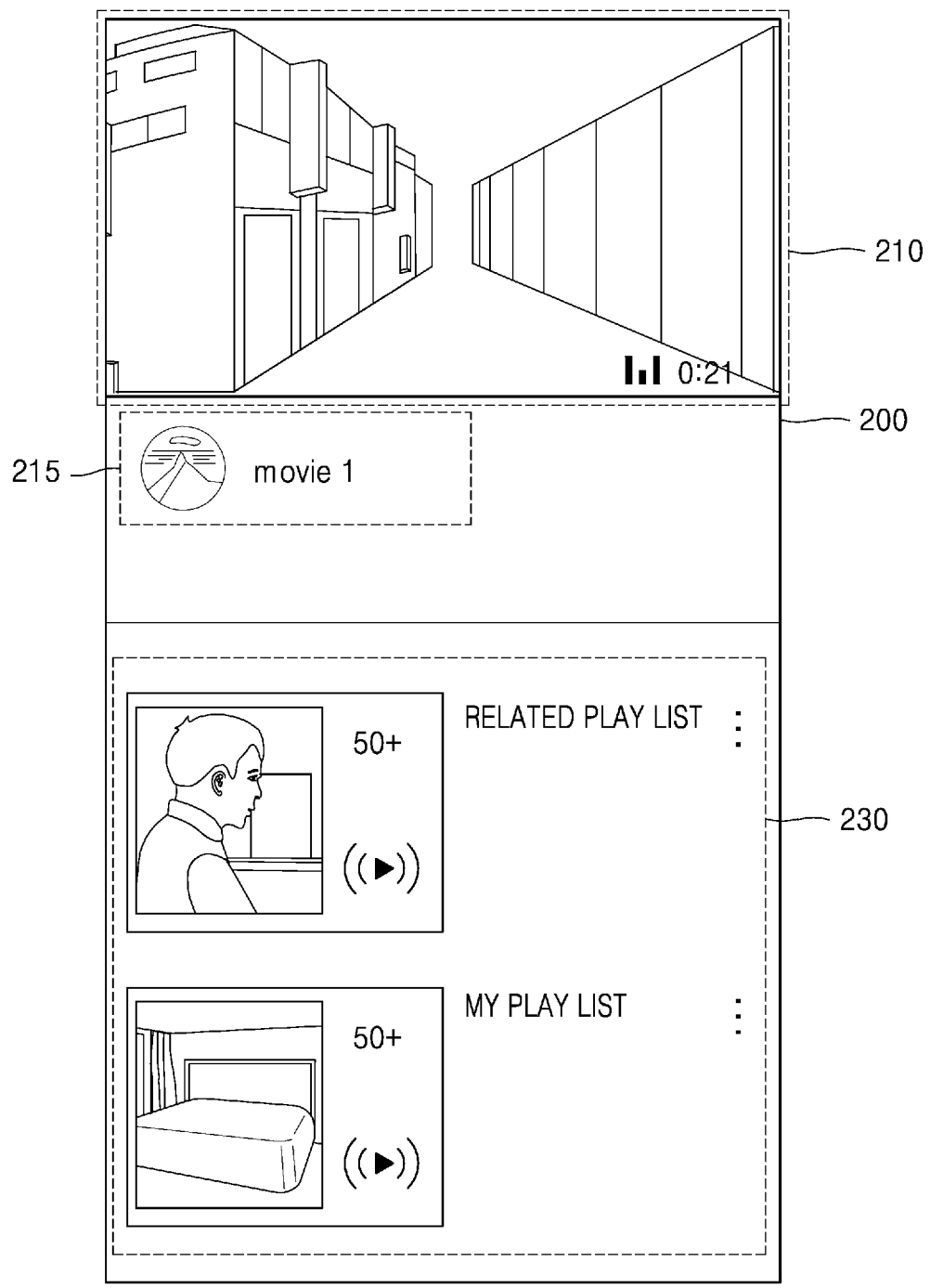
FIG. 2 is a diagram illustrating a screen of a mobile device, which is to be mirrored.

FIG. 2 is a diagram illustrating a screen of the mobile device 110, which is to be mirrored.

The mobile device 110 may execute an application for playing video content (hereinafter, "a content playing application"). FIG. 2 illustrates a screen 200 that is output by the mobile device 110 when the content playing application is executed. That is, the mobile device 110 may output a window for executing the content playing application, on the screen 200. For example, the screen 200 may include a portion 21 for playing the video content. Here, the portion 210 may be referred to as a playing window of the video content.

The display device 120 may mirror at least a portion of the screen that is output by the mobile device 110. In the screen 200 illustrated in FIG. 2, a portion that is actually watched by a user may correspond to the portion 210 corresponding to the playing window. Thus, when the screen 200 illustrated in FIG. 2 is mirrored by the display device 120, the display device 120 may mirror only the portion 210 of the screen 200, the portion corresponding to the playing window.

Figure 3:
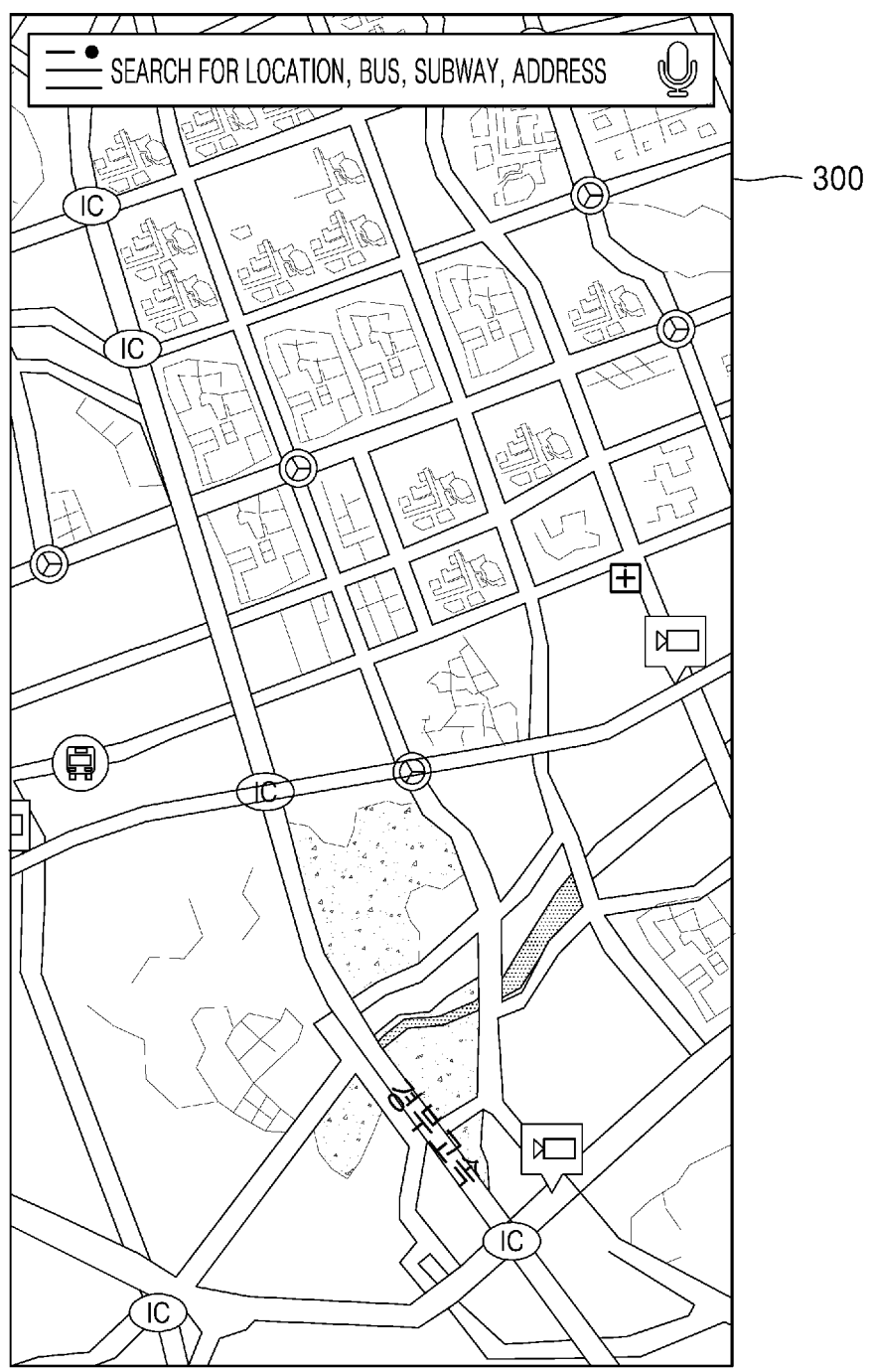
FIG. 3 is a diagram illustrating another screen of the mobile device, which is to be mirrored.

FIG. 3 is a diagram illustrating another screen of the mobile device 110, which is to be mirrored.

Referring to FIG. 3, the application executed by the mobile device 110 may correspond to a map search application. When the map search application is executed, the mobile device 110 may generate a window for searching for a location and may output a screen 300 including the generated window through the display. Here, the map search application may indicate an application for searching for a certain region, a location of a certain area, and the like. Alternatively, the map search application may indicate a navigation application.

FIG. 4 is a diagram illustrating another screen of the mobile device 110, which is to be mirrored.

Referring to FIG. 4, the application executed by the mobile device 110 may correspond to a game application or an application for purchasing game contents (hereinafter, "a game application"). When the game application is executed, the mobile device 110 may perform a corresponding task to generate a window providing a user interface through which a user may purchase game contents. Also, the mobile device 110 may output a screen 400 including the generated window through the display.

FIG. 5 is a diagram illustrating another screen of the mobile device 110, which is to be mirrored.

Referring to FIG. 5, the application executed by the mobile device 110 may correspond to a digital multimedia broadcasting (DMB) application for providing broadcasting content. When the DMB application is executed, the mobile device 110 may output a screen 500 through the display, and the screen 500 includes a portion 510 for outputting a playing window for playing a currently selected broadcasting program and a portion 520 for outputting a window including a list from which a broadcasting program or a broadcasting channel is to be selected.

FIG. 6 is a diagram illustrating another screen of the mobile device 110, which is to be mirrored.

According to an embodiment of the disclosure, the mobile device 110 may simultaneously execute a plurality of applications in a multi-tasking environment. That is, when the mobile device 110 executes an application while executing another application, the mobile device 110 may output a window corresponding to one application through a main screen 610 and output a window corresponding to the other application in the form of a floating window on a sub-screen 620. The plurality of applications simultaneously executed by the mobile device 110 may correspond to the applications described with reference to FIGS. 2 through 5.

When the plurality of applications are simultaneously executed, generally, only one window corresponding to any one application may be output on a main screen of the mobile device 110, and one or more windows corresponding to other one or more applications may not be displayed on the screen of the display of the mobile device 110 or may be output in the form of a floating window or on a sub-screen.

FIG. 6 illustrates an example in which the mobile device 110 outputs a window corresponding to an application for providing an Internet search engine on the main screen 610 and outputs a window corresponding to an application for playing video content on the sub-screen 620.

In this case, when the display device 120 directly mirrors and outputs the screen 600 that is output by the mobile device 110, a screen that is output by the display device 120 may have the same shape as the screen 600. However, a user may want to watch an enlarged version of the sub-screen 620. According to the related art, to increase the size of the sub-screen 620, the user must manually perform a plurality of setting operations to change the size of the sub-screen 620 in the mobile device 110. According to an embodiment of the disclosure, without the manual manipulations of the user, the display device 120 may mirror the screen of the mobile device 110, such that the mirrored screen may increase user convenience.

Figure 8:
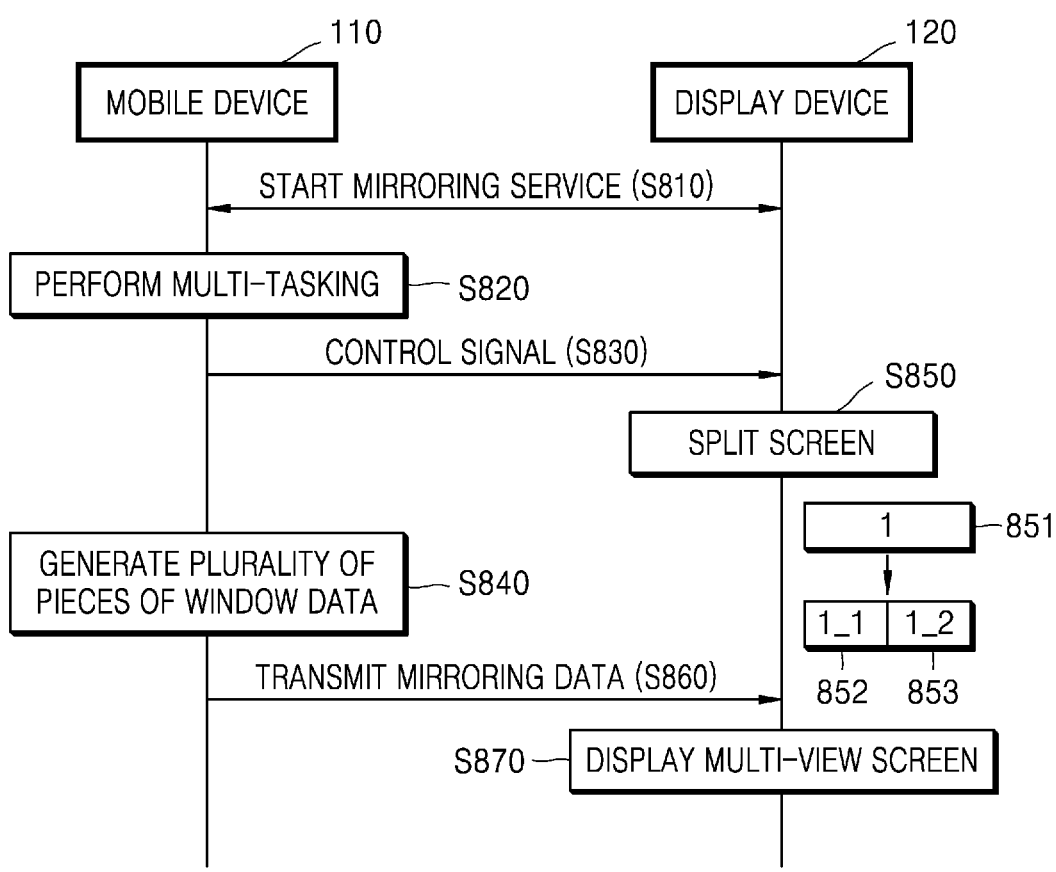
FIG. 8 is a diagram for describing operations performed by a mobile device or a display device, according to an embodiment of the disclosure.
Figure 9:
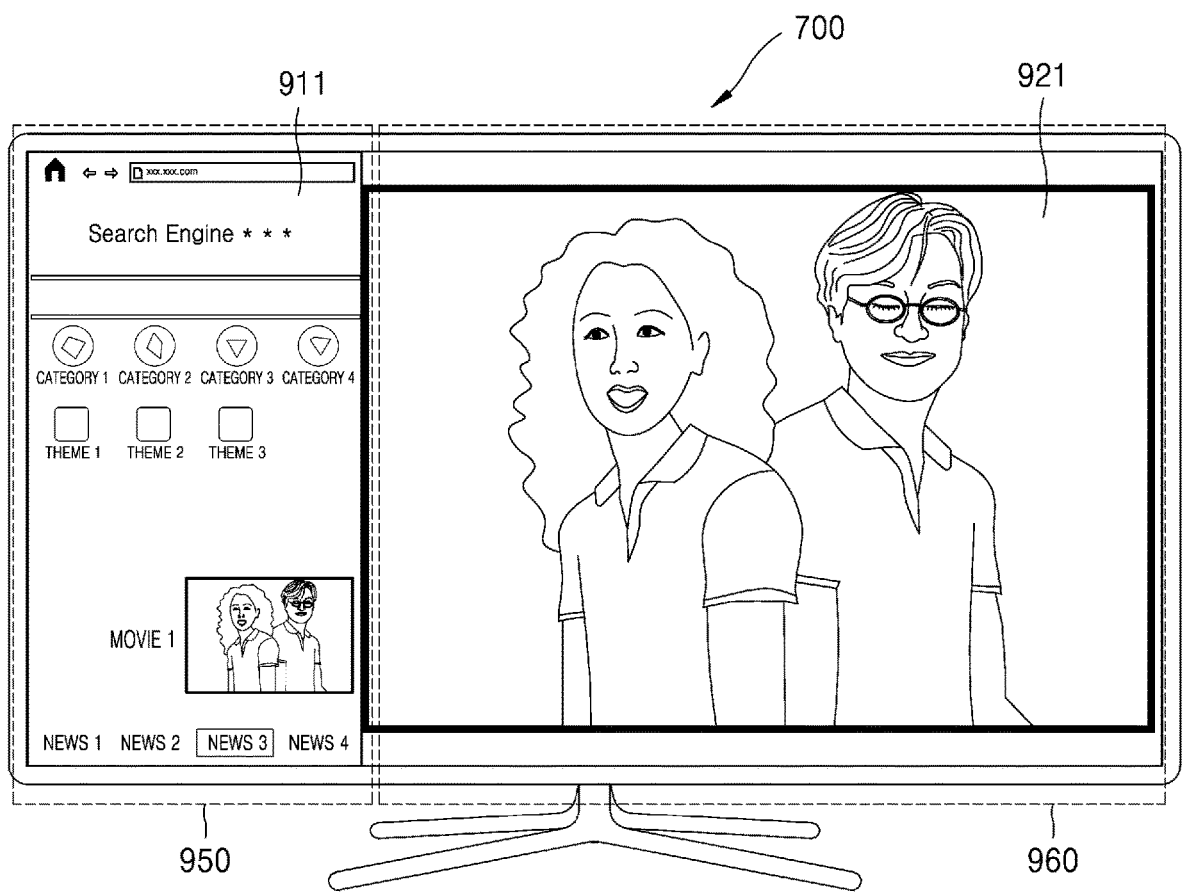
FIG. 9 is a diagram illustrating a screen that is mirrored and output by a display device, according to an embodiment of the disclosure.

In detail, according to an embodiment of the disclosure, when the display device 120 mirrors and outputs the screen 610 of the mobile device 110 illustrated in FIG. 6, the display device 120 may output a screen 900 illustrated in FIG. 9 so that the user may watch the sub-screen 620 as a large image having a high image quality. Screens that are output by the display device 120 will be described hereinafter by referring to FIGS. 8 and 9.

FIG. 7 is a diagram illustrating another screen that is output when the mobile device 110 performs at least one task.

Referring to FIG. 7, one mobile device 110 may generate and output a plurality of windows while executing an application.

When a request for an execution of a content playing application is received, the mobile device 110 may output the screen 200 illustrated in FIG. 2 through the display.

A user may search for other content, while watching certain content by executing the content playing application. For example, the user may input a signal (hereinafter, a touch input) for requesting an operation of searching for other content, into the mobile device 110.

In detail, when, while the content playing application is executed, a touch input of dragging the screen 200 downwards is received, the mobile device 110 may convert the screen 200 into a screen 700 illustrated in FIG. 7, in response to the touch input. Here, the touch input of dragging the screen downwards may correspond to a user input of requesting an operation of outputting a list of pieces of content, in which pieces of video content that are reproducible may be searched.

In response to the touch input described above, a window 720 including the portion 210 for playing the content may be output by being converted into a flowing window or a sub-window. Also, the list of pieces of video content may be output throughout the screen 700. In detail, the screen 700 may display an image indicating a window corresponding to a task of generating and providing the list of pieces of video content.

In this case, the mobile device 110 may simultaneously perform a plurality of tasks while executing the content playing application. In detail, the mobile device 110 may perform the task of playing the video content and the task of generating the list of pieces of video content. Here, when the task of playing the video content is performed, the floating window 720 may be generated, and when the task of generating the list of pieces of video content is performed, a window 710 may be generated.

As illustrated in FIG. 7, when the mobile device 110 executes one application, for example, the video playing application, at a certain time point, the plurality of tasks may be performed while one application is performed, and the windows corresponding to the plurality of tasks, respectively, may be generated. Also, all or part of the plurality of windows that are generated may be output through the display of the mobile device 110.

According to an embodiment of the disclosure, when the mirroring service is executed, the display device 120 may output a screen including all of the plurality of windows corresponding to the plurality of tasks. Operations of the display device 120 to mirror and output the screen 700 that is output by the mobile device 110, and an output screen of the display device 120, will be described in detail hereinafter, with reference to FIGS. 8 and 10.

FIG. 8 is a diagram for describing operations performed by the mobile device 110 or the display device 120, according to an embodiment of the disclosure.

Referring to FIG. 8, the mobile device 110 and the display device 120 performing a screen mirroring method, according to an embodiment of the disclosure, may start a mirroring service in operation S810. Here, the mirroring service may be started in response to a request of a user. In detail, the mirroring service may be started in response to a user input received by the mobile device 110 or the display device 120. According to an embodiment of the disclosure, an example in which the mirroring service is started in response to a user input received through the mobile device 110 will be described.

For example, the mirroring service may be started when a user manipulates a user interface screen that is output by the mobile device 110 or the display device 120. According to the example in which the mirroring service is requested through the mobile device 110, when the user touches on the screen 115 illustrated in FIG. 1, more specifically, the icon 116 for requesting the start of the mirroring service, the icon 116 being included in the user interface screen, the mobile device 110 may receive the user input of requesting the mirroring service. Also, the mobile device 110 may execute the mirroring service in response to the user input.

Also, the operation (S810) of starting the mirroring service may be performed before or after the mobile device 110 performs multi-tasking. In other words, FIG. 7 illustrates the example in which the mirroring service is started (S810) before the mobile device 110 performs multi-tasking. However, the operation (S810) of starting the mirroring service may be performed after the mobile device 110 performs multi-tasking (S820).

Also, to perform the mirroring service, the mobile device 110 and the display device 120 may have to be connected to each other through a wired or wireless communication network. When the mobile device 110 and the display device 120 are connected to each other through a wired communication connection using a cable, etc., the mobile device 110 and the display device 120 may start the mirroring service in response to the input of the request of the mirroring service, without an additional pairing operation.

When the mobile device 110 and the display device 120 are to be connected to each other through a wireless communication network, the mobile device 110 and the display device 120 may perform a pairing operation to configure the wireless communication network. In detail, when the mirroring service is started, the mobile device 110 and the display device 120 may perform the pairing operation for screen mirroring.

Here, the pairing operation may denote an operation of setting the wireless communication network by transceiving data required for a wireless communication connection between the mobile device 110 and the display device 120, so that the display device 120 may output a screen corresponding to a screen that is output by the mobile device 110. When the pairing operation is completed, the mobile device 110 and the display device 120 may transceive data required for mirroring.

The pairing operation between the mobile device 110 and the display device 120 may be completed before the mirroring service is started.

When the wireless communication network is previously configured between the mobile device 110 and the display device 120, the pairing operation described above may be omitted.

When the mobile device 110 and the display device 120 previously executes the mirroring service at a previous time point, the pairing operation between the mobile device 110 and the display device 120 may be performed at the previous time point. Also, when the mirroring service is started (S810) at a sequential time point, the mobile device 110 and the display device 120 may configure the communication connection therebetween by using data which is required for the wireless communication connection and obtained in the pairing operation previously performed.

The mobile device 110 may perform multi-tasking (S820). In detail, the mobile device 110 may simultaneously perform a plurality of tasks while at least one application is executed. As described above, the operation of starting the mirroring service (S810) may be performed after the operation of performing the multi-tasking (S820).

When the mirroring service is started (S810) and the multi-tasking is performed (S820) so that the display device 120 is requested to mirror the screen of the mobile device 110 simultaneously performing the plurality of tasks, the display device 120 may receive a control signal for splitting a screen from the mobile device 110 in operation S830. Alternatively, when the multi-tasking is started after the mirroring service is started, the display device 120 may receive the control signal in correspondence to the start of the multi-tasking.

Here, the screen splitting may denote splitting of the screen of the display device 120 into a plurality of partial screens. Also, the "screen" of the display device 120, which is an object of the splitting operation, may directly denote a display included in the display device 120 or an entire portion of the display. In detail, the "screen" of the display device 120, which is an object of the splitting operation, may denote the entire portion of the display included in the display device 120, on which an image may be displayed.

In detail, the display device 120 may receive the control signal from the mobile device 110 in operation S830, the control signal including information for splitting the display of the display device 120, in detail, the screen of the display, into a plurality of partial screens.

The control signal transmitted in operation S830 may include information about the plurality of tasks performed by the mobile device 110. In detail, the control signal may include information about the number of the plurality of tasks simultaneously performed by the mobile device 110. For example, when the mobile device 110 simultaneously performs two tasks, the control signal transmitted from the mobile device 110 to the display device 120 may include information indicating that the number of tasks is two and information requesting splitting of the screen.

Alternatively, the control signal may include information indicating into which number of partial screens the screen of the display device 120 is to be split. For example, the control signal may include information requesting that the screen of the display device 120 be split into two partial screens. As described with reference to FIG. 6, the example in which the mobile device 110 simultaneously performs the task corresponding to the application for providing the Internet search engine and the task corresponding to the application for playing the video content will be described. In this case, the control signal may include information for notifying that the simultaneously performed tasks include the task corresponding to the application for providing the Internet search engine and the task corresponding to the application for playing the video content.

The control signal may include information about at least one of an aspect ratio of a display of the mobile device 110 or an aspect ratio of a window generated when the plurality of tasks are performed. Hereinafter, for convenience of description, the information about the at least one of the aspect ratio of the display of the mobile device 110 or the aspect ratio of the window (or an execution window) generated when the plurality of tasks are performed will be referred to as "aspect ratio information." Here, the aspect ratio information may not be included in the request of splitting the screen, but may be transmitted from the mobile device 110 to the display device 120 during the pairing operation, which is performed while the operation of starting the mirroring service (S810) described above is performed.

The control signal may include information about at least one of the number of the plurality of tasks, the aspect ratio of the display included in the mobile device 110, a priority order of the plurality of tasks, or a task that is output on a main screen of the display from among the plurality of tasks.

When the control signal is received (S830) by the display device 120, the display device 120 may perform screen splitting based on the received control signal in operation S850. In detail, the display device 120 may split the entire screen of a display, on which an image is displayed, into a plurality of portions.

Here, a function to perform the screen splitting may be referred to as a screen splitting function. According to an embodiment of the disclosure, the display device 120 may include the screen splitting function. For example, the screen splitting function may denote a function of splitting a screen of the display device 120 into a plurality of portions and outputting separate images on the split portions, respectively. Also, the screen splitting function may be referred to as various names, such as "a multi-link screen function," "a picture in picture (PIP) function," "a screen splitting driving function," and the like.

For example, when the control signal transmitted in operation S830 corresponds to a signal for requesting splitting of the screen of the display of the display device 120 into two partial screens, the display device 120 may split an entire area 851 of the display into two partial areas, that is, a first partial screen 852 and a second partial screen 853.

Also, in operation S850, the display device 120 may split the screen of the display device 120 into a plurality of partial screens, based on the number of the plurality of tasks, an aspect ratio of the display included in the mobile device 110, and an aspect ratio of the display included in the display device 120.

For example, the aspect ratio of the display included in the mobile device 110 or the display device 120 may vary and may include, for example, 16:9, 21:9, 4:3, 1:85:1, or the like. In detail, when the display device 120 splits the screen, a shape of an image output by the mobile device 110 may vary depending on the aspect ratio of the display included in the mobile device 110. Also, a shape of an image output by the display device 120 may vary depending on the aspect ratio of the display included in the display device 120.

When the screen of the display device 120 is split based on the number of the plurality of tasks, the aspect ratio of the display included in the mobile device 110, and the aspect ratio of the display included in the display device 120, a plurality of images in the screen may be relatively more efficiently arranged. For example, a black screen area, which is a remaining area of the screen output by the display device 120, on which images are not displayed, may be minimized.

Also, when the control signal is received by the display device 120 (S830), the display device 120 may perform screen splitting based on the received control signal and settings about a multi-view screen in operation S850. Here, the multi-view screen may denote a screen including a plurality of separate images in one screen. According to an embodiment of the disclosure, when a plurality of windows are output in one screen, the screen may be referred to as a multi-view screen.

Also, the settings about the multi-view screen may denote settings about at least one of sizes, aspect ratios, or arrangement structures of a plurality of images included in the multi-view screen displayed in operation S870. In detail, the settings about the multi-view screen may denote settings about at least one of a size, an aspect ratio, or an arrangement structure of each of n images included in the multi-view screen, when the multi-view screen includes the n (n is a natural number) images. For example, when the control signal received in operation S830 requests splitting of the screen of the display device 120 into two partial screens and the multi-view screen includes two images, the settings about the multi-view screen may denote settings about at least one of a size, an aspect ratio, or an arrangement structure of each of the two images. In this case, the screen splitting may be performed based on the control signal and the settings about the multi-view screen in operation S850.

The settings about the multi-view screen described above may be performed before operation S850 or may be performed based on a user input through at least one of the mobile device 110 or the display device 120. Alternatively, the settings about the multi-view screen described above may be performed based on direct settings of at least one of the mobile device 110 or the display device 120. The settings about the multi-view screen will be described in detail hereinafter by referring to FIG. 23.

The mobile device 110 may generate a plurality of pieces of window data respectively corresponding to the plurality of tasks performed in operation S820, in operation S840. Here, the window data may denote data used to generate windows (or execution windows) corresponding to the tasks. For example, the window data may include image data indicating the windows corresponding to the tasks.

When a window outputs both image data and audio data, the window data may include data for generating the output image data and data for generating the output audio data. For example, a task may be accompanied with the execution of the content playing application described with reference to FIG. 2. In this case, the window corresponding to the task may be formed as a content playing window. In this case, the window data may include data for generating the content playing window.

In detail, a video may be played through the content playing window, and thus, the window data corresponding to the content playing window may include both data for generating image data that is output to play the content and data for generating audio data that is output to play the content.

Alternatively, the window data may include cast data used to generate the window corresponding to the task, in addition to image data. Here, the cast data may denote information about a source providing a predetermined window. For example, the task may correspond to a task accompanied with the execution of the content playing application described with reference to FIG. 2. Also, it may be assumed that the content playing application receives video content from a content providing server based on a streaming method. The mobile device 110 may generate a content playing window based on the data received from the content providing server based on the streaming method.

In the example described above, the window data may include information required for accessing the content providing server (for example, information about a network access to the content providing server, information for specifying predetermined video content received from the content providing server based on the streaming method, etc.). Then, the display device 120 may use the received window data to access the content providing server, receive the predetermined video content from the accessed content providing server, generate and display a playing window of the predetermined video content.

As described with reference to FIG. 6, the example in which the mobile device 110 simultaneously performs the task corresponding to the application providing the Internet search engine and the task corresponding to the application for playing the video content will be described. In this case, the mobile device 110 may generate window data for generating a window corresponding to the application for providing the Internet search engine and window data for generating a window corresponding to the video content playing application. Here, the "window corresponding to the application" may denote an execution window of a task performed according to an execution of the application. Thus, the "window corresponding to the application" may denote the same as a "window corresponding to the task performed (with the execution of the application)."

When the mobile device 110 simultaneously performs two tasks as described in the example illustrated in FIG. 6, two pieces of window data corresponding to the two performed tasks, respectively, may be generated in operation S840. In detail, when the mobile device 110 simultaneously performs two tasks as described in the example illustrated in FIG. 6, a piece of window data for generating a window displayed on the main screen 610 corresponding to one application and another piece of window data for generating a window displayed on the sub-screen 620 corresponding to another application may be generated in operation S840.

The display device 120 may receive the plurality of pieces of window data generated in operation S840, in operation S860.

Also, the display device 120 may respectively display the plurality of images corresponding to the plurality of tasks on the plurality of partial screens divided in operation S850, based on the plurality of pieces of window data received in operation S860 (S870). Hereinafter, a screen including the plurality of images displayed in operation S870 will be referred to as a "multi-view screen" for convenience of explanation.

Here, each of the plurality of images displayed in operation S870 may correspond to at least a portion of the window that is output when each of the plurality of tasks is performed. In detail, the image displayed in operation S870 may correspond to the whole or a portion of the window that is output when a predetermined task is performed.

As described above, when two pieces of window data respectively corresponding to two tasks are received in operation S860, an image corresponding to a task, the image being generated by using one piece of window data, may be displayed on a first partial screen 852, and an image corresponding to another task, the image being generated by using another piece of window data, may be displayed on a second partial screen 853. The screen of the display device 120, which is displayed in operation S870, will be described in detail hereinafter with reference to FIGS. 9 and 10.

FIG. 9 is a diagram illustrating the screen that is mirrored and output by the display device 120, according to an embodiment of the disclosure.

According to an embodiment of the disclosure, when the display device 120 mirrors the screen 600 of the mobile device 110 simultaneously performing the plurality of tasks, the screen 600 that is output in the mobile device 110 and the screen that is output in the display device 120 may have different shapes from each other. In detail, when the plurality of tasks are simultaneously performed by the mobile device 110, a window may correspond to at least one task from among the plurality of tasks, the at least one task being performed in the background environment. In this case, the window may be output as a size, which is difficult to be recognized by a user, as a sub-screen or a floating screen, or the window may not be output on the screen of the mobile device 110. According to an embodiment of the disclosure, the display device 120 may output the window corresponding to the at least one task on the screen of the display of the display device 120 such that the window is easily recognizable to the user.

Referring to FIG. 9, the display device 120 may display the screen 900 in operation S870. In detail, the screen 900 may correspond to a screen displayed by the display device 120 by mirroring the screen 600 displayed on the mobile device 110 when the mobile device 110 displays the screen 600 illustrated in FIG. 6.

As described with reference to FIG. 6, for example, the mobile device 110 may simultaneously perform two tasks. In detail, the mobile device 110 may simultaneously perform the two tasks including a task for providing an Internet search engine (or a task accompanied with an execution of an application for providing the Internet search engine) (hereinafter, "a first task") and a task for playing video content (or a task accompanied with an execution of an application for playing the video content) (hereinafter, "a second task").

Thus, the display device 120 may split the screen of the display into a first partial screen 950 and a second partial screen 960 in operation S850. Here, the first partial screen 950 and the second partial screen 960 may correspond to the first partial screen 852 and the second partial screen 853, respectively, described with reference to FIG. 8. Also, in operation S860, the display device 120 may receive window data (hereinafter, "first window data") corresponding to the first task and window data (hereinafter, "second window data") corresponding to the second task.

Also, the display device 120 may display a window (in detail, an execution window of the application for providing the Internet search engine) corresponding to the first task on the first partial screen 950 and a window (in detail, an execution window corresponding to the task accompanied with the execution of the application for playing the video content corresponding to the second task on the second partial screen 960.

For example, the first window data may include a network access address (for example, a uniform resource locator (URL) of an Internet server providing the Internet search engine, etc.) of a source for providing the Internet search engine. Alternatively, the first window data may include image data about the execution window (in detail, the main screen 610 illustrated in FIG. 6) of the task for providing the Internet search engine.

Also, the second window data may include a network access address (for example, a URL of a content providing server for providing the content playing application, a URL corresponding to video content played through the video content playing application, or the like) of a source for providing the video content playing application. Alternatively, the second window data may include image data of the video content that is output on a playing window of the content playing application.

In the example described above, when the first window data includes the network access address of the source for providing the Internet search engine, the display device 120 may receive image data about the window corresponding to the Internet search engine by accessing the source by using the network access address. Also, based on the received image data, the display device 120 may generate an image corresponding to the first task and display the generated image on the first partial screen 950.

In the example described above, when the second window data includes the network access address of the source for providing the video content playing application, the display device 120 may receive image data about the window corresponding to the video content playing application by accessing the source by using the network access address. Also, based on the received image data, the display device 120 may generate an image corresponding to the second task and display the generated image on the second partial screen 960. For example, when the source for providing the video content playing application transmits the video content having a resolution of 8K based on a streaming method, the display device 120 may directly receive the video content having the resolution of 8K by accessing the source and may output the video content on the second partial screen 960. Thus, the user may view a high quality image through the second partial screen 960.

Unlike the embodiment of the disclosure, the screen 600 that is output from the mobile device 110 may be directly mirrored and output by the display device 120. In this case, the window (in detail, the content playing window, which is the execution window of the task performed concurrently with the video content playing application) of the task corresponding to the video content playing application may be output as a small image (in detail, an image output on the sub-screen 620) on the screen 600. That is, the video content that is output through the sub-screen 620 may also be output on the screen of the display device 120 to correspond to a relatively small portion of the whole screen.

Thus, even when the user uses the display device 120 having a larger screen than the mobile device 110, the user may not be able to experience the convenience of watching the played video content through a large screen.

Also, when the display device 120 directly mirrors and outputs the screen 600 output by the mobile device 110, the sub-screen 620 included in the screen 600 may generally have a size of a floating window. Also, video content that is output on the floating window may generally correspond to a thumbnail image, and thus, may generally have a low image quality.

Thus, when the display device 120 directly mirrors the low quality image of the sub-screen 620 on the large screen of the display device 120, the image output by the display device 120 may have an even lower image quality. In detail, the user may recognize the image output on the display device 120, the image corresponding to the sub-screen 620, as a broken image.

According to an embodiment of the disclosure, the user may not watch the low quality image corresponding to the sub-screen 620 on the screen of the display device 120, as in the case in which the display device 120 directly mirrors the screen of the mobile device 110.

In detail, according to an embodiment of the disclosure, rather than directly mirroring and outputting, via the display device 120, the screen 600 that is output on the mobile device 110, the display device 120 may generate and display, on the split partial screens, images generated by using the window data. Thus, the user may view an image 921 corresponding to the sub-screen 620, by taking advantage of the display device 120 having a larger screen and a higher image quality than the mobile device 110. Here, the image 921 may not be an image generated by simply enlarging the low quality thumbnail image output on the sub-screen 620, but may be an image generated by using the second window data for generating the window that is output through the display of the mobile device 110 when a predetermined task is performed. Thus, the image 921 may be displayed as a high quality, high resolution image.

Also, according to an embodiment of the disclosure, a window corresponding to at least one task from among the plurality of tasks simultaneously performed on the mobile device 110, the at least one task being performed in the background environment, may be displayed on the display device 120, thereby increasing user's viewing convenience and satisfaction.

Figure 10A:
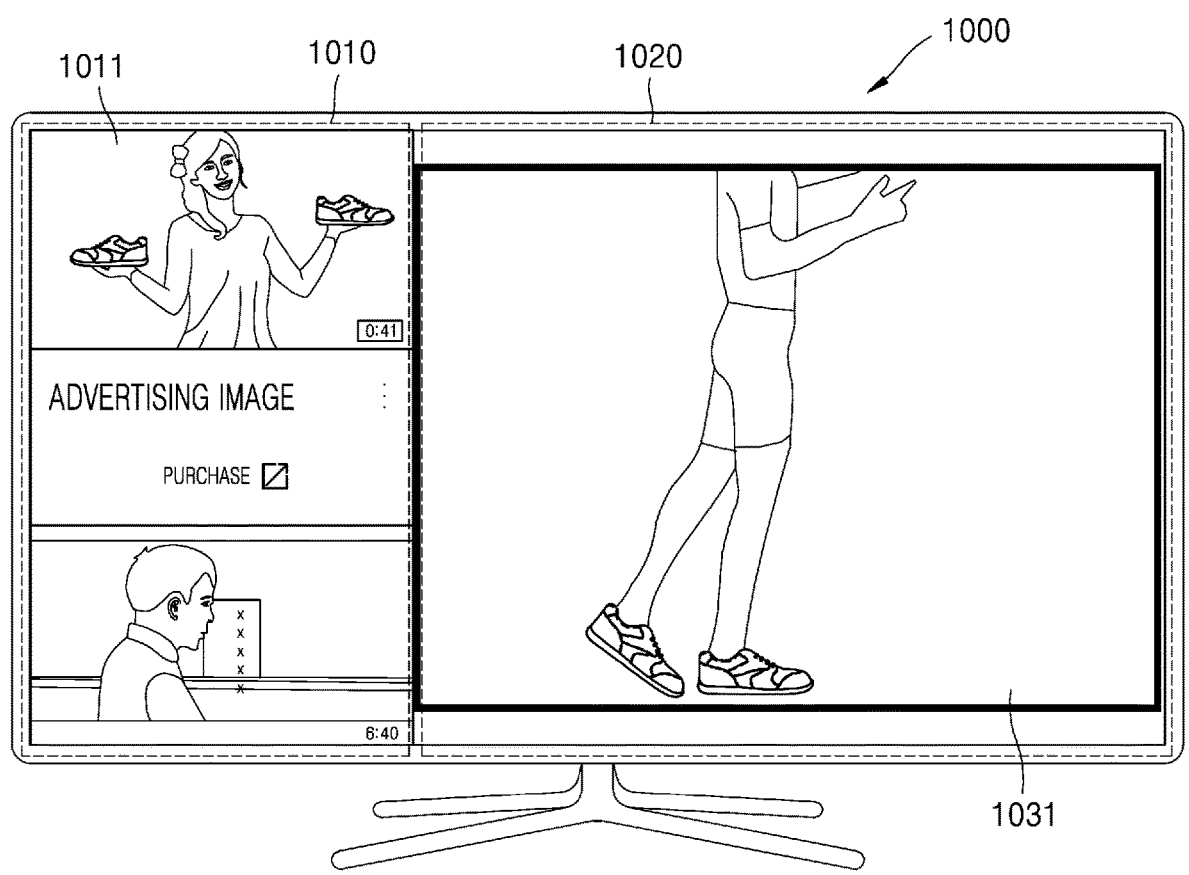
FIG. 10A is another diagram illustrating the screen that is mirrored and output by the display device, according to an embodiment of the disclosure.

FIG. 10A is another diagram illustrating the screen that is mirrored and output by the display device 120, according to an embodiment of the disclosure.

Referring to FIG. 10A, the display device 120 may display a screen 1000 in operation S870. In detail, the screen 1000 may correspond to a screen that is displayed by the display device 120 by mirroring the screen 700 displayed on the mobile device 110, when the mobile device 110 displays the screen 700 illustrated in FIG. 7.

Referring to FIG. 7, two tasks may be simultaneously performed while one application, for example, a content playing application, is executed. As illustrated in FIG. 7, when the two tasks are performed, two windows respectively corresponding to the two tasks may be generated and may be output through a display of the mobile device 110.

According to an embodiment of the disclosure, by performing the operations described with reference to FIG. 8, the display device 120 may display the screen 1000 in correspondence to the screen 700 of the mobile device 110. In detail, an image corresponding to the window 710 displayed throughout the screen 700 of the mobile device 110 may be displayed through a first partial screen 1010 included in the screen 1000 of the display device 120. Also, an image corresponding to the floating window 720 displayed on a portion of the screen 700 of the mobile device 110 may be displayed through a second partial screen 1020 included in the screen 1000 of the display device 120. In detail, an image 1011 may correspond to the window 710 of the screen 700. Also, an image 1031 may correspond to the floating window 720.

FIG. 7 illustrates an example in which the image 1031 mirrored in correspondence to the floating window 720 may correspond to an image corresponding to the playing window 730, which is included in the floating window 720. In detail, an object to be actually viewed by a user may correspond to video content that is output in the playing window 730. Thus, only the playing window 730, which is to be viewed by the user, from the floating window 720, may be mirrored and displayed on the second partial screen 1020. Alternatively, the floating window 720 may be generally mirrored and displayed on the second partial screen 1020.

According to an embodiment of the disclosure illustrated in FIG. 10A, the user may be able to continually view content, which is being watched by the user, through a large screen having a high image quality, while the user searches for content.

Figure 10B:
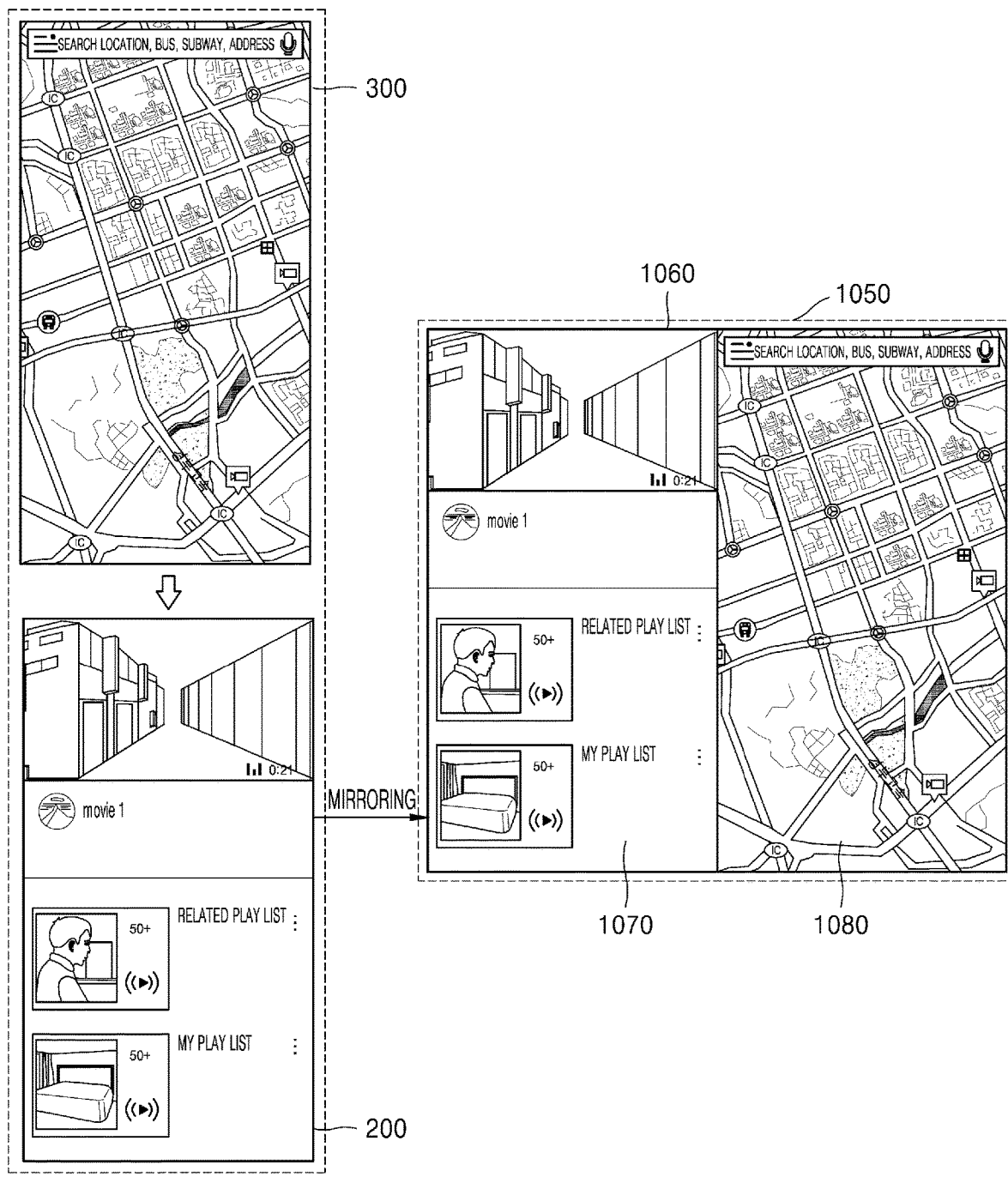
FIG. 10B is another diagram illustrating the screen that is mirrored and output by the display device, according to an embodiment of the disclosure.

FIG. 10B is another diagram illustrating the screen that is mirrored and output by the display device 120, according to an embodiment of the disclosure.

When a plurality of tasks are simultaneously performed, at least one of the plurality of tasks may be performed in a background environment. In this case, a window corresponding to the task performed in the background environment may not be output on the screen of the mobile device 110.

Referring to FIG. 10B, a block 1040 may indicate screens that are output through a display of the mobile device 110, and a block 1050 may indicate a screen that is output through a display of the display device 120 that mirrors and outputs the screens of the mobile device 110.

Referring to FIG. 10B, the mobile device 110 may additionally execute the content playing application described in FIG. 2, in a state in which the execution of the map search application described in FIG. 3 is not ended after execution. Thus, the mobile device 110 may perform a task accompanied with the content playing application while performing a task accompanied with the map searching application. In this case, the mobile device 110 may simultaneously perform two tasks.

First, the mobile device 110 may display the screen 300 while only the map searching application is executed. When the content playing application is additionally executed, the mobile device 110 may control the map searching application (or the task accompanied with the execution of the map searching application) to be executed in the background environment. Thus, when the content playing application is additionally executed, the mobile device 110 may convert the screen 300 into the screen 200 to control the screen 200 corresponding to the content playing application to be output. In this case, the mobile device 110 may control the screen 300 indicating a window corresponding to the task accompanied with the execution of the map searching application, the task being performed in a background environment, not to be output, and only the screen 200 indicating a window corresponding to the task accompanied with the execution of the content playing application, the task being performed in a foreground environment, to be output.

As described above, when the mobile device 110 simultaneously performs the plurality of tasks, the display device 120 may visually output a window corresponding to the task that the mobile device 110 performs in the background environment, even when the mobile device 110 does not display the window corresponding to the task performed in the background environment.

Referring to FIG. 10B, when the display device 120 mirrors the screen of the mobile device 110 that displays only the screen 200 corresponding to the content playing application when the mobile device 110 simultaneously performs the task accompanied with the map searching application and the task accompanied with the content playing application, the display device 120 may display a screen 1060. In detail, an image corresponding to the screen 200 may be displayed on a first partial screen 1070 of the screen 1060 and an image corresponding to the screen 300 may be displayed on a second partial screen 1080.

As described with reference to FIG. 10B, when the display device 120 mirrors the screen of the mobile device 110 even when the mobile device 110 does not display the screen 300 corresponding to the task performed in the background environment, the display device 120 may mirror and output the screen 300 corresponding to the task performed in the background environment described above.

Thus, the user may view the screen about the window corresponding to the application, which is not ended by the user.

As described with reference to FIGS. 9 through 10B, according to an embodiment of the disclosure, because the display device 120 may provide a larger screen than the mobile device 110, the display device 120 may output a screen by changing a screen output by the mobile device 110 such that the changed screen may increase user convenience for watching the screen. Also, when the display device 120 mirrors the screen of the mobile device 110 simultaneously performing the plurality of tasks, the display device 120 may display a high quality image. Thus, user satisfaction with respect to receiving the mirroring service may be increased.

Also, according to an embodiment of the disclosure, the number of partial screens split in operation S850 may be limited according to the setting. For example, when the mobile device 110 simultaneously performs tasks, the number of which is greater than equal to a predetermined number, only tasks corresponding to the number of partial screens that are set, from among the recently performed tasks, may be considered for splitting the screen. As another example, when the mobile device 110 simultaneously performs tasks, the number of which is greater than or equal to a predetermined number, only tasks corresponding to the number of partial screens that are set, from among high priority tasks, may be considered for splitting the screen.

For example, when the mobile device 110 simultaneously performs five tasks, and five images indicating five windows respectively corresponding to the five tasks are included in a multi-view screen, the multi-view screen may include so many images to distract user's attention. Thus, the screen splitting may be performed by setting the number of tasks, which is set through at least one of the mobile device 110 or the display device 120, as a threshold value. For example, when the maximum number of partial screens is three, the display device 120 may split the screen into three partial screens in operation S850, even when the mobile device 110 simultaneously performs five tasks.

Figure 11:
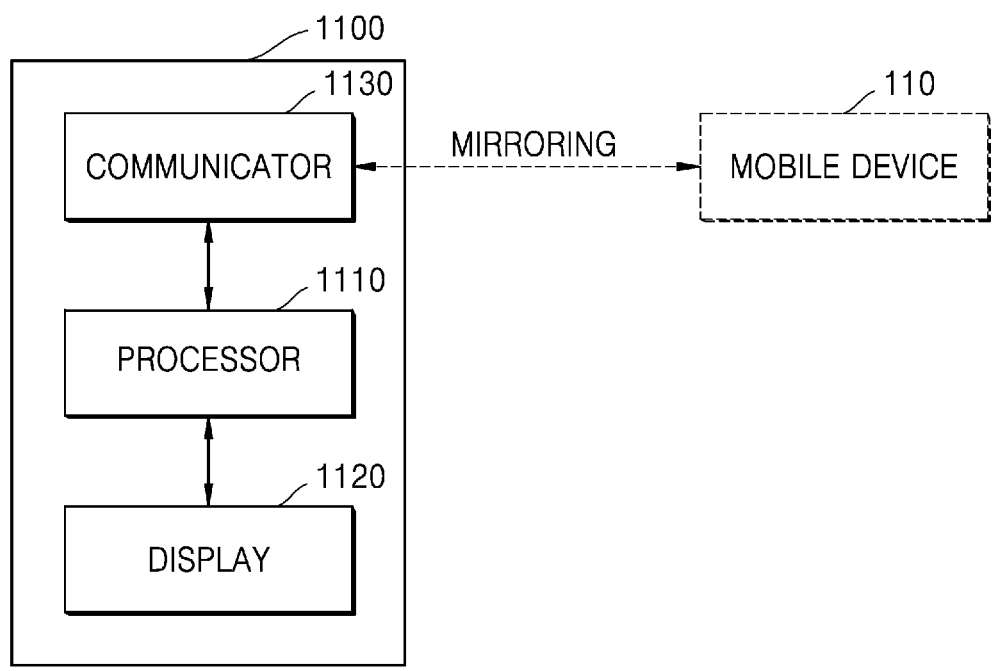
FIG. 11 is a diagram illustrating a display device according to an embodiment of the disclosure.

FIG. 11 is a diagram illustrating a display device 1100 according to an embodiment of the disclosure.

The display device 1100 illustrated in FIG. 11 may correspond to the display device 120 described with reference to FIGS. 1 through 10B. Thus, when describing the display device 1100, operations of the display device 120 described with reference to FIGS. 1 through 10B will not be redundantly described.

Referring to FIG. 11, the display device 1100 may include a processor 1110, a display 1120, and a communicator 1130.

The processor 1110 may execute at least one instruction to control a desired operation to be performed. Here, the at least one instruction may be stored in an internal memory included in the processor 1110 or a memory included in the display device 1100 separately from the processor 1110.

In detail, the processor 1110 may execute the at least one instruction to control at least one component included in the display device 1100 to perform a desired operation. Thus, when the processor 1110 performs certain operations, the processor 1110 may control the at least one component included in the display device 1100 to perform the operations.

The display 1120 may output an image on a screen. In detail, the display 1120 may output an image corresponding to video data through a display panel included in the display 1120, so that a user may visually recognize the video data.

For example, the screen output by the display 1120 may be generated by mirroring a screen output by a display of the mobile device 110. According to an embodiment of the disclosure, the display 1120 may correspond to a mirrored screen (for example, the screen 900 illustrated in FIG. 9, the screen 1000 illustrated in FIG. 10A, or the screen 1050 illustrated in FIG. 10B) according to an embodiment of the disclosure.

The communicator 1130 may perform communication with another electronic device through at least one wired or wireless communication network.

According to an embodiment of the disclosure, the communicator 1130 may communicate with the mobile device 110.

In the accompanying drawings, like reference numerals denote like elements. Thus, because the mobile device 110 illustrated in FIG. 11 indicates the mobile device 110 described with reference to FIG. 1, when describing the mobile device 110 communicating with the display device 1100, operations of the mobile device 110 described with reference to FIGS. 1 through 10B will not be redundantly described.

In detail, the processor 1110 may include random-access memory (RAM) used as a storage for storing signals or data input from the outside of the display device 1100 or as a storage corresponding to various operations performed by the display device 1100, read-only memory (ROM) storing control programs and/or a plurality of instructions for controlling operations of the display device 1100, and at least one processor. The processor 1110 may include a graphics processing unit (GPU) for processing graphics data corresponding to video data. The processor 1110 may be realized as a system on chip (SoC) combining a core and the GPU. Also, the processor 1110 may include a multi-core rather than a single-core. For example, the processor 1110 may include a dual core, a triple core, a quad core, a hexa core, an octa core, a deca core, a dodeca core, a hexadecimal core, or the like.

The communicator 1130 may communicate with the mobile device 110 through a wired or wireless communication network. In detail, the communicator 1130 may include at least one short-range wireless communication module performing communication according to the communication standards, such as Bluetooth, Wifi, Bluetooth low energy (BLE), near-field communication (NFC)/radio-frequency identification (RFID), Wifi-direct, ultra-wideband (UWB), or Zigbee. Here, the short-range wireless communication module may also be referred to as a short-range wireless communicator.

Also, the communicator 1130 may further include a remote communication module performing communication with a server for supporting remote communication according to the remote communication standards. In detail, the communicator 1130 may include the remote communication module performing communication through a network for Internet communication. Also, the communicator 1130 may include a communication network according to the communication standards, such as 3G, 4G, and/or 5G. Also, the remote communication module may also be referred to as a remote communicator.

Also, the communicator 1130 may include at least one port, through which the communicator 1130 may be connected to the mobile device 110 by using wired cables, so that the communicator 1130 may communicate with the mobile device 110 based on a wired communication method. For example, the communicator 1130 may include a cable connection port, such as an HDMI port.

According to an embodiment of the disclosure, when the display device 1100 mirrors a screen of the mobile device 110 simultaneously performing a plurality of tasks, the processor 1110 may split a screen of the display 1120 into a plurality of partial screens. Also, the processor 1110 may control the communicator 1130 to receive a plurality of pieces of window data corresponding to the plurality of tasks, respectively. Also, the processor 1110 may control a plurality of images corresponding to the plurality of tasks to be displayed on the plurality of partial screens, respectively, by using the plurality of pieces of window data.

Hereinafter, operations of the display device 1100 will be described in more detail by referring to FIG. 12.

Figure 12:
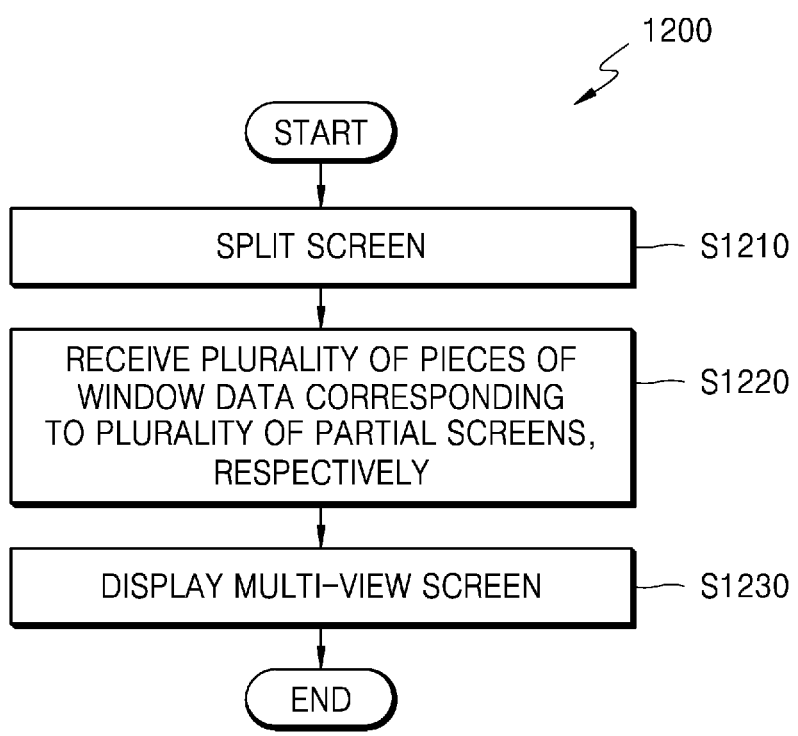
FIG. 12 is a flowchart of a screen mirroring method of a display device, according to an embodiment of the disclosure.

FIG. 12 is a flowchart of a screen mirroring method 1200 performed by the display device 1100, according to an embodiment of the disclosure. The screen mirroring method 1200 illustrated in FIG. 12 may be performed by the display device 1100. Also, operations included in the screen mirroring method 1200 may correspond to the operations of the display device 120 described with reference to FIGS. 1 through 10B. Thus, when describing the screen mirroring method 1200, the same aspects as FIGS. 1 through 11 will not be described.

According to an embodiment of the disclosure, the screen mirroring method 1200 may include splitting a screen of the display 1120 into a plurality of partial screens, when the display device 1100 mirrors a screen of the mobile device 110 simultaneously performing a plurality of tasks (S1210). Operations included in operation S1210 may be performed by the processor 1110. Also, the operations included in operation S1210 may correspond to the operations included in operation S850 described with reference to FIG. 8.

The screen mirroring method 1200 may include receiving a plurality of pieces of window data corresponding to the plurality of tasks, respectively (S1220). Operations included in operation S1220 may be performed by the communicator 1130 under control of the processor 1110. Also, the operations included in operation S1220 may correspond to the operations included in operation S860 described with reference to FIG. 8.

The screen mirroring method 1200 may include displaying a plurality of images corresponding to the plurality of tasks on the plurality of partial screens, respectively, by using the plurality of pieces of window data (S1230). Operations included in the operation S1230 may be performed under control of the processor 1110. In detail, the displaying of the screen including the plurality of images may be performed by the display 1120 under control of the processor 1110. Also, the operations included in operation S1230 may correspond to the operations included in operation S870 described with reference to FIG. 8.

Figure 13:
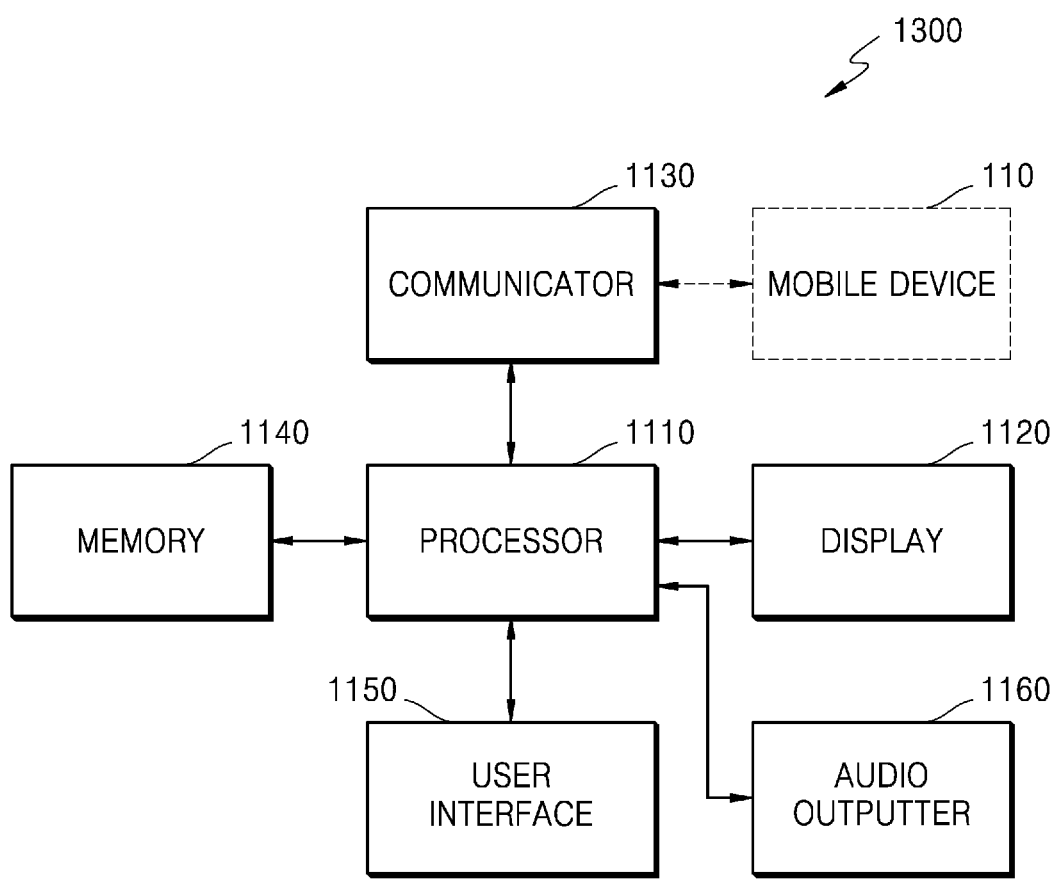
FIG. 13 is another diagram illustrating the display device, according to an embodiment of the disclosure.

FIG. 13 is another diagram illustrating the display device, according to an embodiment of the disclosure. A display device 1300 illustrated in FIG. 13 may correspond to the display devices 120 and 1100 respectively illustrated in FIGS. 1 and 11. Referring to FIG. 13, the display device 1300 may further include at least one of a memory 1140, a user interface 1150, or an audio outputter 1160, compared to the display device 1100.

The memory 1140 may store at least one instruction. Also, the memory 1140 may store at least one instruction executed by the processor 1110. Also, the memory 1140 may store at least one program executed by the processor 1110.

In detail, the memory 1140 may include at least one type of storage medium from a flash-type memory, a hard disk-type memory, a multimedia card micro-type memory, a card type memory (for example, an SD or an XD memory), RAM, static RAM (SRAM), ROM, electrically erasable programmable ROM (EEPROM), a magnetic memory, a magnetic disk, or an optical disk.

The user interface 1150 may receive a user input for controlling the display device 1300. The user interface 1150 may include, but is not limited to, a user input device including a touch panel configured to sense a user's touch, a hardware button configured to receive user's push manipulation, a hardware scroll wheel configured to receive user's rotation manipulation, a keyboard, a dome switch, and the like.

Also, the user interface 1150 may include a voice recognition device configured to recognize sound data. For example, the sound recognition device may include a microphone. The sound recognition device may receive a user's voice command or voice request. Accordingly, the processor 1110 may control an operation corresponding to the voice command or the voice request to be performed.

Also, the user interface 1150 may include a motion sensing sensor. For example, the motion sensing sensor may sense a motion of the display device 1300 and receive the sensed motion as a user input. Also, the sound recognition device and the motion sensing sensor described above may not be included in the user interface 1150. Rather, the sound recognition device and the motion sensing sensor may be included in the display device 1300 as modules separate from the user interface 1150.

The audio outputter 1160 may output audio data under control of the processor 1110.

In detail, the audio outputter 1160 may output audio data (for example, a voice, sound, etc.) that is input through the communicator 1130. Also, the audio outputter 1160 may output audio data stored in the memory 1140 under control of the processor 1110. The audio outputter 1160 may include at least one of a speaker, a headphone output terminal or a Sony/Philips digital interface (S/PDIF) output terminal. The audio outputter 1160 may include a combination of the speaker, the headphone output terminal and the S/PDIF output terminal.

According to an embodiment of the disclosure, the audio outputter 1160 may output audio data corresponding to a mirrored screen output by the display 1120 under control of the processor 1110. In detail, the audio outputter 1160 may output audio data corresponding to at least one of the plurality of images respectively corresponding to the plurality of tasks displayed on the display 1120.

Figure 14:
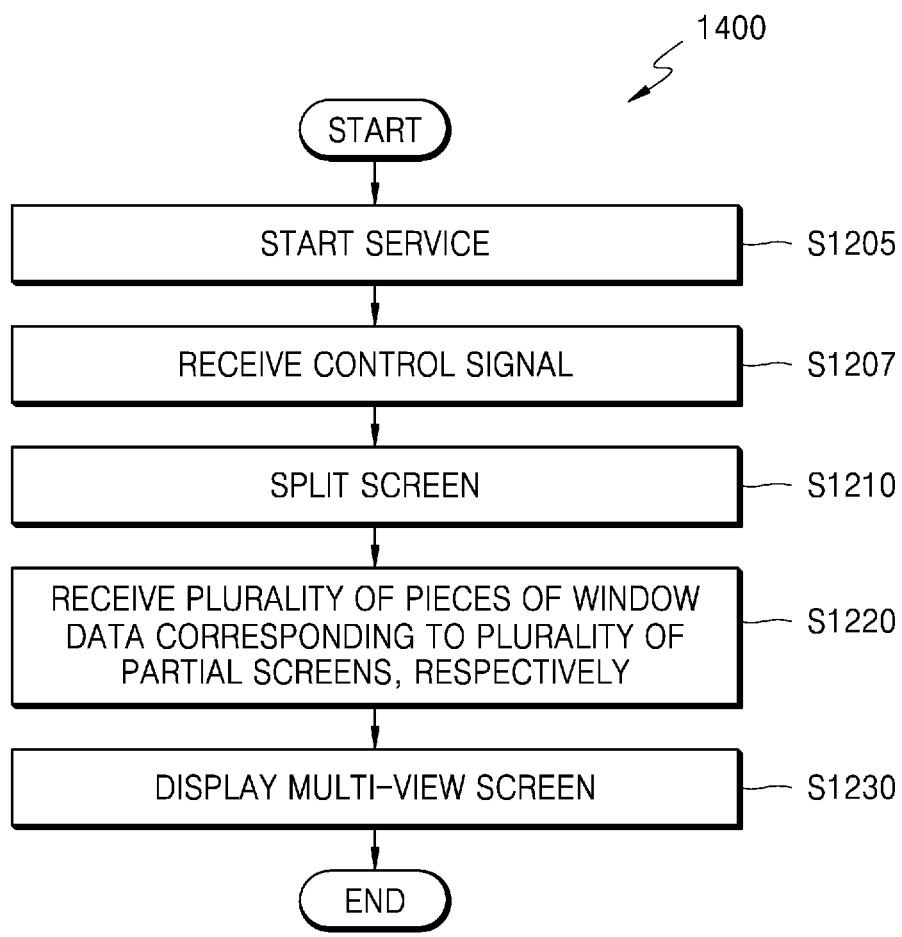
FIG. 14 is another flowchart of the screen mirroring method of the display device, according to an embodiment of the disclosure.

FIG. 14 is another flowchart of the screen mirroring method of the display device, according to an embodiment of the disclosure. Also, FIG. 14 is a flowchart of the operations performed by the display device 120, 1100, or 1300, according to an embodiment of the disclosure, described with reference to FIGS. 1 through 13. Also, a screen mirroring method 1400 illustrated in FIG. 14 may further include operations S1205 and S1207, compared with the screen mirroring method 1200 illustrated in FIG. 12. Operations included in the screen mirroring method 1400, which are the same as the operations included in the screen mirroring method 1200, are illustrated by using the same reference numerals.

Thus, when describing the screen mirroring method 1400 illustrated in FIG. 14, aspects that are the same as the aspects with respect to the display device 120, 1100, or 1300 and the screen mirroring method 1200 described with reference to FIGS. 1 through 13 will not be redundantly described. Also, when describing the screen mirroring method 1400, the display device 1300 illustrated in FIG. 13 will be referenced.

Referring to FIG. 14, the screen mirroring method 1400 may start a mirroring service in operation S1205. In detail, the mirroring service between the mobile device 110 and the display device 1300 may be started. Here, the mirroring service may be started in response to a user input received by the mobile device 110 or the display device 1300.

Operations included in the operation S1205 may be performed under control of the processor 1110. Also, the operations included in operation S1205 may correspond to the operations included in operation S810 described with reference to FIG. 8.

Also, the screen mirroring method 1400 may further include receiving, via the display device 1300, a control signal for splitting a screen from the mobile device 110 (S1207). Operations included in operation S1207 may be performed by the communicator 1130 under control of the processor 1110. Also, the operations included in operation S1207 may correspond to the operations included in operation S830 described with reference to FIG. 8.

Next, the screen mirroring method 1400 may include splitting a screen of the display 1120 into a plurality of partial screens, when the display device 1300 mirrors a screen of the mobile device 110 simultaneously performing a plurality of tasks (S1210).

The screen mirroring method 1400 may include receiving a plurality of pieces of window data corresponding to the plurality of tasks, respectively (S1220).

Also, the screen mirroring method 1400 may include displaying a plurality of images respectively corresponding to the plurality of tasks on the plurality of partial screens, respectively, by using the plurality of pieces of window data (S1230).

Also, operation S1230 may further include outputting audio data corresponding to the plurality of images, when displaying the plurality of images. The outputting of the audio data may be performed by the audio outputter 1160 under control of the processor 1110.

The outputting of the audio data will be described hereinafter in detail.

According to an embodiment of the disclosure, at least two of the plurality of tasks may be accompanied by an audio output. In this case, when the at least two tasks of the plurality of tasks are accompanied by the audio output, the processor 1110 may control the audio outputter 1160 to output audio data corresponding to a first task from the at least two tasks. Here, the first task may not denote a task that is performed first. Rather, the first task may refer to a task selected for the audio output.

For example, while a calling service is performed via an execution of a calling application, the mobile device 110 may additionally execute a content playing application in response to a user's request. Here, both of the task accompanied with the execution of the calling application (in detail, the task for performing a voice calling function) and a task accompanied with the execution of the content playing application (in detail, a task for playing video content) may be accompanied by audio outputs. In this case, in response to a user's request, a screen of the mobile device 110 may be mirrored by the display device 1300 based on the screen mirroring method 1400 according to an embodiment of the disclosure.

As described above, when both of the at least two tasks which are simultaneously performed are accompanied by the audio outputs, the processor 1110 may output the audio data corresponding to the first task, which denotes a task corresponding to a window displayed on a main screen of the screen of the mobile device 110, from the at least two tasks. In detail, the audio data corresponding to the first task, which is selected from the at least two tasks, may be output through the audio outputter 1160 under control of the processor 1110.

Alternatively, the processor 1110 may select any one of the at least two tasks based on at least one of an application type or a task type and output audio data corresponding to the selected task. As described above, the mobile device 110 may additionally execute the content playing application in response to the user's request, while the wired calling service is performed via the execution of the calling application. In the example described above, the calling application may be directly aimed for a voice calling operation (or a video calling operation), and thus, the audio output may be inevitable. In this case, the audio output accompanied by the calling application may be controlled to be preferentially output by the display device 1300.

Alternatively, the processor 1110 may determine a priority order of the audio output and output audio data according to the determined priority order. Here, the priority order may be determined according to a user's setting. Alternatively, the priority order may be determined according to a direct setting of the processor 1110. With respect to the outputting of the audio data, the operation of setting the priority order will be described hereinafter with reference to FIG. 24.

Alternatively, the processor 1110 may control audio data corresponding to a task selected by the user from the at least two tasks accompanied by the audio outputs to be output.

Also, when the at least two tasks are simultaneously performed and accompanied by the audio outputs, the processor 1110 may output a piece of audio data corresponding to each of the at least two tasks by mixing the pieces of audio data. Here, the at least two pieces of audio data may be mixed according to different output ratios.

For example, the processor 1110 may control an output ratio of a piece of audio data accompanied with the main screen of the screen of the mobile device 110 to be greater than an output ratio of a piece of audio data accompanied with a sub-screen (or a floating window or a floating screen) of the screen of the mobile device 110.

Alternatively, when mixing the at least two pieces of audio data according to the different output ratios, the processor 1110 may increase the output ratio according to the priority order of the audio output described above, such that the output ratio is increased as the priority order is increased.

Figure 15:
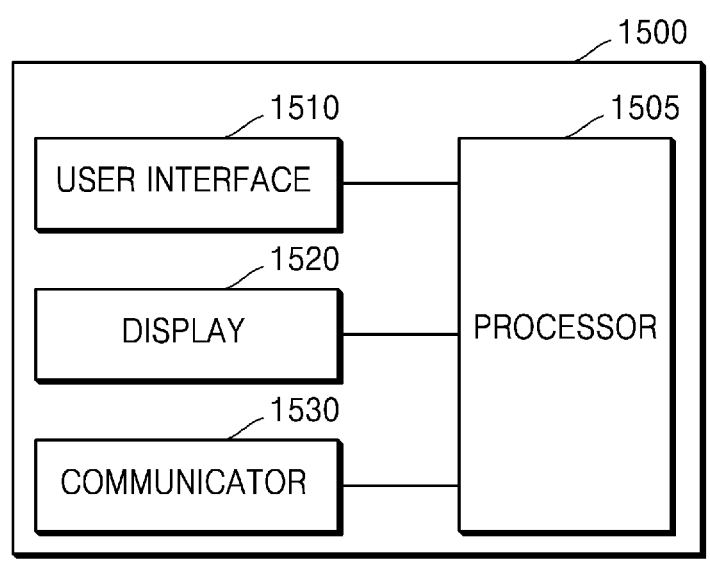
FIG. 15 is a diagram illustrating a mobile device, according to an embodiment of the disclosure.

FIG. 15 is a diagram illustrating a mobile device 1500, according to an embodiment of the disclosure.

Referring to FIG. 15, the mobile device 1500 illustrated in FIG. 15 may correspond to the mobile device 110 described with reference to FIGS. 1 through 13. Thus, when describing the mobile device 1500, operations of the mobile device 110 described with reference to FIGS. 1 through 13 will not be redundantly described.

Referring to FIG. 15, the mobile device 1500 may include a processor 1505, a user interface 1510, a display 1520, and a communicator 1530.

The processor 1505 may execute at least one instruction to control a desired operation to be performed. Here, the at least one instruction may be stored in an internal memory included in the processor 1505 or a memory included in the display device 1100 separately from the processor 1505.

In detail, the processor 1505 may execute the at least one instruction to control at least one component included in the mobile device 1500 to perform a desired operation. Thus, when the processor 1505 performs certain operations, the processor 1505 controls the at least one component included in the mobile device 1500 to perform the operations.

The display 1520 may output an image on a screen. In detail, the display 1520 may output an image corresponding to video data through a display panel included in the display 1520, so that a user may visually recognize the video data.

Also, the display 1520 may further include a touch pad combined with the display panel. When the display 1520 is formed as the display panel combined with the touch pad, the display 1520 may display a user interface screen for receiving a touch input. Also, when a user manipulation (for example, a touch operation) corresponding to a certain command is sensed on the user interface screen, the display 1520 may transmit the sensed touch input to the processor 1505. Then, the processor 1505 may interpret the sensed touch input to recognize and execute the certain command input by the user.

The communicator 1530 may perform communication with another electronic device through at least one wired or wireless communication network.

According to an embodiment of the disclosure, the communicator 1530 may communicate with the display device (for example, 120, 1100, or 1300) through wired or wireless communication connection.

In detail, the communicator 1530 may include at least one short-range wireless communication module performing communication according to the communication standards, such as Bluetooth, Wifi, BLE, NFC/RFID, Wifi-direct, UWB, or Zigbee.

Also, the communicator 1530 may further include a remote communication module performing communication with a server for supporting remote communication according to the remote communication standards. In detail, the communicator 1530 may include a remote communication module performing communication through a network for Internet communication. Also, the communicator 1530 may include a communication network according to the communication standards, such as 3G, 4G, and/or 5G. Also, the remote communication module may also be referred to as a mobile communication module.

Also, the communicator 1530 may include at least one port to be connected to the display device (for example, 120, 1100, or 1300) through wired cables, to communicate with the display device (for example, 120, 1100, or 1300) through wired communication. For example, the communicator 1130 may include a cable connection port, such as an HDMI port, a USB connection port, or the like.

The user interface 1510 may receive a user input for controlling the mobile device 1500. The user interface 1510 may include, but is not limited to, a user input device, such as a touch panel configured to sense a user's touch operation, a hardware button configured to receive user's push manipulation, a hardware scroll wheel configured to receive user's rotation manipulation, a keyboard, a dome switch, and the like. Also, each of the button, the wheel, and the dome switch may include a key corresponding to each of different functions.

Also, the user interface 1510 may include a voice recognition device configured for voice recognition. For example, the voice recognition device may include a microphone. The voice recognition device may receive a user's voice command or voice request. Accordingly, the processor 1505 may control an operation corresponding to the voice command or the voice request to be performed.

Also, the user interface 1510 may include a motion sensing sensor. For example, the motion sensing sensor may sense a motion of a user in a vehicle and receive the sensed motion as a user input. Also, the voice recognition device and the motion sensing sensor described above may not be included in the user interface 1510. Rather, the voice recognition device and the motion sensing sensor may be included in the mobile device 1500 as separate components or modules from the user interface 1510.

When the display device (for example, 120, 1100, or 1300) mirrors a screen output by the display 1520 while a plurality of tasks are simultaneously performed, the processor 1505 may transmit a control signal for requesting that a screen of the display device (for example, 120, 1100, or 1300) be split into a plurality of partial screens, to the display device (for example, 120, 1100, or 1300). Also, the processor 1505 may transmit via communicator 1530 a plurality of pieces of window data corresponding to the plurality of tasks respectively to the display device (for example, 120, 1100, or 1300).

Hereinafter, operations of the mobile device 1500 will be described in more detail by referring to FIG. 16A.

Figure 16A:
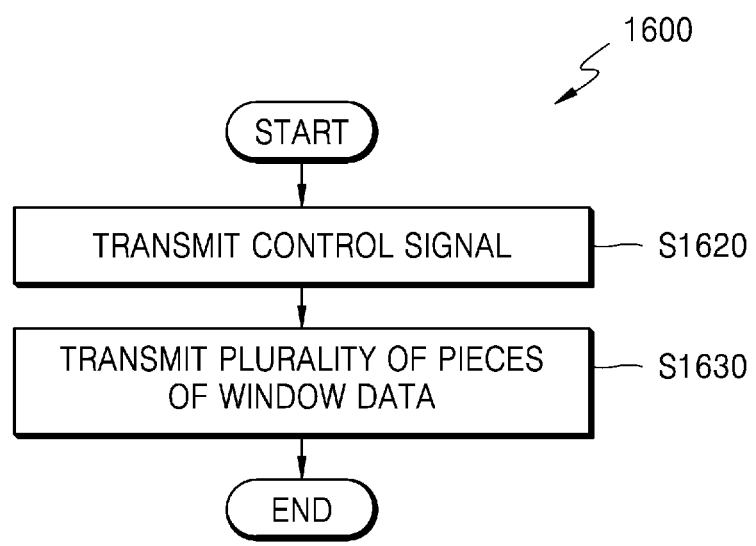
FIG. 16A is a flowchart of a screen mirroring method of a mobile device, according to an embodiment of the disclosure.

FIG. 16A is a flowchart of a screen mirroring method 1600 performed by the mobile device 1500, according to an embodiment of the disclosure. The screen mirroring method 1600 illustrated in FIG. 16A may be performed by the mobile device 1500. Also, operations included in the screen mirroring method 1600 may correspond to the operations of the mobile device 110 described with reference to FIGS. 1 through 14. Thus, when describing the screen mirroring method 1600, aspects as FIGS. 1 through 15 will not be redundantly described.

The screen mirroring method 1600 may include transmitting the control signal for requesting the splitting of the screen of the display device (for example, 120, 1100, or 1300) from the mobile device 1500 to the display device (for example, 120, 1100, or 1300) (S1620).

In detail, the screen mirroring method 1600 may include transmitting, to the display device (for example, 120, 1100, or 1300), the control signal for requesting the splitting of the screen of the display device (for example, 120, 1100, or 1300) into a plurality of partial screens, when the display device (for example, 120, 1100, or 1300) mirrors a screen output through the display 1520 while the mobile device 1500 simultaneously performs a plurality of tasks (S1620). Operations included in operation S1620 may be performed by the communicator 1530 under control of the processor 1505. Also, the operations included in operation S1620 may correspond to the operations included in operation S830 described with reference to FIG. 8.

The screen mirroring method 1600 may include transmitting a plurality of pieces of window data corresponding to the plurality of tasks, respectively, to the display device (for example, 120, 1100, or 1300 (S1630). Operations included in operation S1630 may be performed by the communicator 1530 under control of the processor 1505. Also, the operations included in operation S1630 may correspond to the operations included in operation S860 described with reference to FIG. 8. Here, each of the plurality of pieces of window data may include data for generating an image corresponding to at least a portion of a window that is output through the display 1520 when each of the plurality of tasks is performed. The plurality of pieces of window data will be described in detail hereinafter with reference to FIG. 25.

Figure 16B:
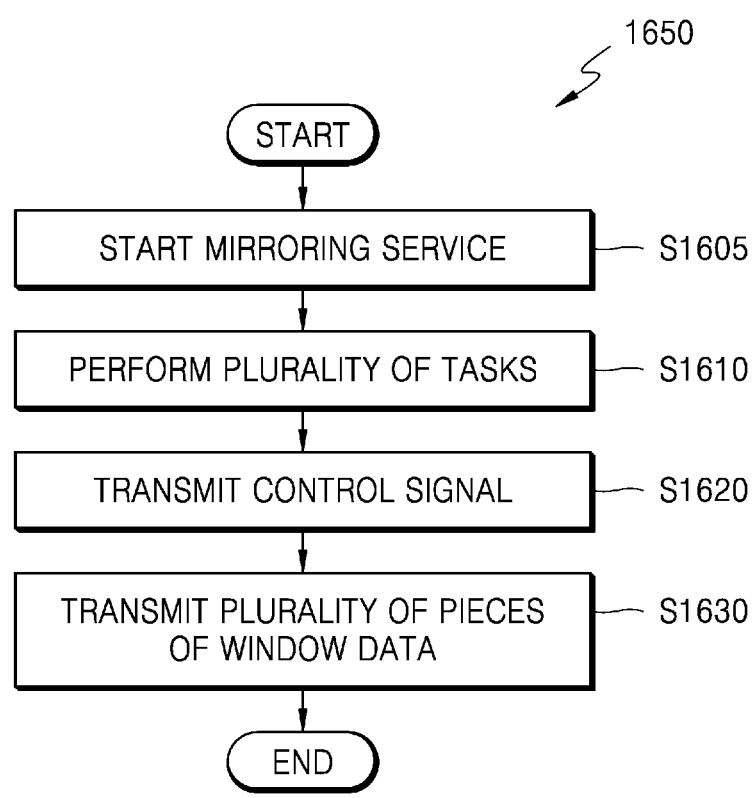
FIG. 16B is another flowchart of the screen mirroring method of the mobile device, according to an embodiment of the disclosure.

FIG. 16B is another flowchart of the screen mirroring method performed by the mobile device, according to an embodiment of the disclosure. Also, FIG. 16B is the flowchart of the operations performed by the mobile device 110 or 1500.

A screen mirroring method 1650 illustrated in FIG. 16B may be performed by the mobile device 1500. Also, operations included in the screen mirroring method 1650 may correspond to the operations of the mobile device 110 described with reference to FIGS. 1 through 14. Thus, when describing the screen mirroring method 1650, the same aspects as FIGS. 1 through 15 will not be redundantly described.

Also, the screen mirroring method 1650 illustrated in FIG. 16B may further include operations S1605 and S1610, compared with the screen mirroring method 1600 illustrated in FIG. 16A. Also, operations included in the screen mirroring method 1650, which are the same as the operations included in the screen mirroring method 1600, are illustrated by using the same reference numerals. Thus, when describing the screen mirroring method 1650 illustrated in FIG. 16B, aspects that are the same as the aspects with respect to the screen mirroring method 1600 illustrated in FIG. 16A will not be redundantly described.

Referring to FIG. 16B, the screen mirroring method 1650 may include starting a mirroring service (S1605). In detail, the mirroring service between the mobile device 110 and the display device 1300 may be executed. Here, the mirroring service may be started in response to a user input received through the mobile device 110 or the display device 1300.

Operations included in the operation S1605 may be performed under control of the processor 1505. Also, the operations included in operation S1605 may correspond to the operations included in operation S810 described with reference to FIG. 8.

Also, the operation (S1605) of starting the mirroring service may be performed before or after the mobile device 1500 performs multi-tasking. In other words, FIG. 16B illustrates an example in which the mirroring service is started (S1605) before the mobile device 1500 performs multi-tasking. However, the operation (S1605) of starting the mirroring service may be performed after the mobile device 110 performs the multi-tasking (S1610).

The mobile device 1500 may perform multi-tasking (S1610). In detail, the mobile device 1500 may simultaneously perform a plurality of tasks while at least one application is executed. As described above, the operation of starting the mirroring service (S1650) may be performed after the operation of performing the multi-tasking (S1610).

When the operation of starting the mirroring service (S1650) and the operation of performing the multi-tasking (S1610) are performed and the display device (for example, 120, 1100, or 1300) is requested to mirror the screen of the mobile device 1500 simultaneously performing the plurality of tasks, a control signal for requesting splitting of a screen of the display device (for example, 120, 1100, or 1300) may be transmitted from the mobile device 1500 to the display device (for example, 120, 1100, or 1300) (S1620).

Next, the screen mirroring method 1650 may include transmitting a plurality of pieces of window data corresponding to the plurality of tasks, respectively, to the display device (for example, 120, 1100, or 1300) (S1630).

In detail, the control signal transmitted in operation S1620 may be automatically generated and transmitted when the plurality of tasks are simultaneously performed. For example, the plurality of tasks simultaneously performed may include a first task and a second task. In detail, in response to a first input of requesting performing of the second task while the first task is performed, the mobile device 1500 may generate and transmit the control signal to the display device (for example, 120, 1100, or 1300).

In detail, in response to the first input, the processor 1505 may transmit, to the display device (for example, 120, 1100, or 1300), the control signal for requesting that the screen of the display device (for example, 120, 1100, or 1300) be split into a first partial screen and a second partial screen respectively corresponding to a first window corresponding to the first task and a second window corresponding to the second task (S1620). Also, the processor 1505 may transmit first window data corresponding to the first window and second window data corresponding to the second window to the display device (for example, 120, 1100, or 1300) (S1630).

Also, after operation S1630, when a change occurs in at least one of the plurality of tasks simultaneously performed, the screen mirroring method 1650 may include transmitting information about the change to the display device (for example, 120, 1100, or 1300). Accordingly, the display device (for example, 120, 1100, or 1300) may again split the screen based on the information about the change. In detail, when the change occurs in the at least one of the plurality of tasks simultaneously performed, the processor 1505 may transmit the information about the change to the display device (for example, 120, 1100, or 1300).

Figure 17:
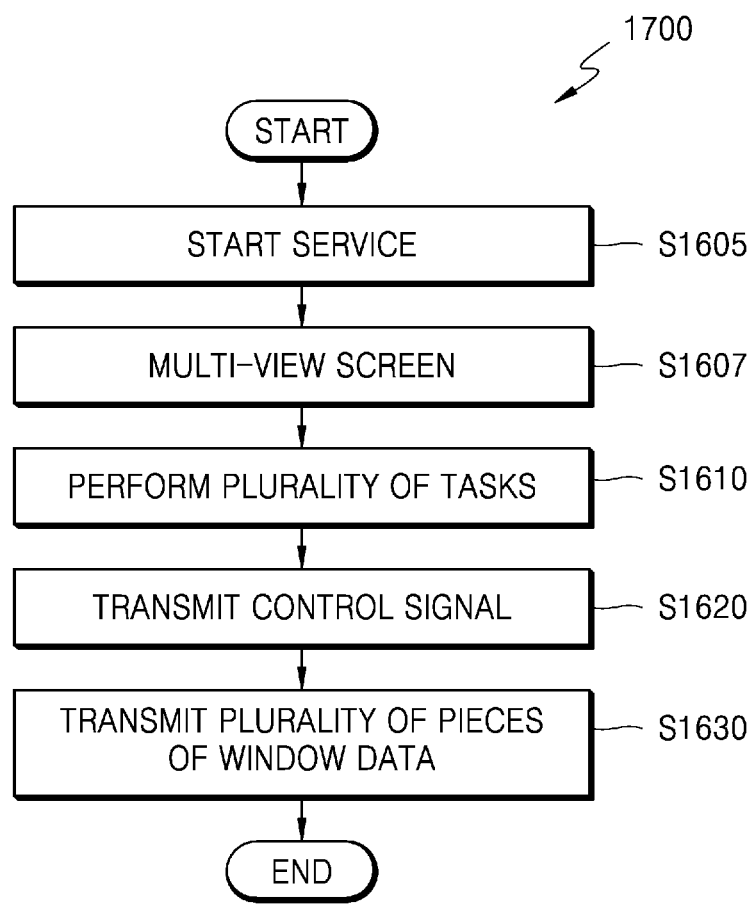
FIG. 17 is another flowchart of the screen mirroring method of the mobile device, according to an embodiment of the disclosure.

FIG. 17 is another flowchart of the screen mirroring method of the mobile device, according to an embodiment of the disclosure. Also, FIG. 17 is the flowchart of operations performed by the mobile device 110 or 1500.

A screen mirroring method 1700 illustrated in FIG. 17 may be performed by the mobile device 1500. Also, operations included in the screen mirroring method 1700 may correspond to the operations of the mobile device 110 described with reference to FIGS. 1 through 14. Thus, when describing the screen mirroring method 1700, the same aspects as FIGS. 1 through 15 will not be redundantly described.

Also, the screen mirroring method 1700 illustrated in FIG. 17 may further include operation S1607, compared with the screen mirroring method 1650 illustrated in FIG. 16B. Also, operations included in the screen mirroring method 1700, which are the same as the operations included in the screen mirroring method 1650, are illustrated by using the same reference numerals. Thus, when describing the screen mirroring method 1700 illustrated in FIG. 17, aspects that are the same as the aspects with respect to the screen mirroring method 1650 illustrated in FIG. 16B will not be redundantly described.

The screen mirroring method 1700 may include setting a multi-view screen (S1607) after operation S1605. Operations included in the operation S1607 may be performed under control of the processor 1505. Here, the setting of the multi-view screen may denote setting at least one of sizes, aspect ratios, or an arrangement structure of a plurality of images included in the multi-view screen displayed in operation S1670.

In detail, the operations of operation S1607 may be performed by the processor 1505 based on a user input of setting the multi-view screen. Alternatively, the operations of operation S1607 may be performed according to direct settings (for example, default settings) of the processor 1505.

Also, FIG. 17 illustrates an example in which operation S1607 is performed after operation S1605. However, operation S1607 may be performed before the operation of transmitting the control signal (S1620) or simultaneously with the operation of transmitting the control signal (S1620).

Also, it is illustrated and described that the screen mirroring method 1700 includes the operation of setting the multi-view screen (S1607) via the mobile device 1500. However, the operation of setting the multi-view screen (S1607) may be performed by the display device (for example, 120, 1100, or 1300).

Figure 18:
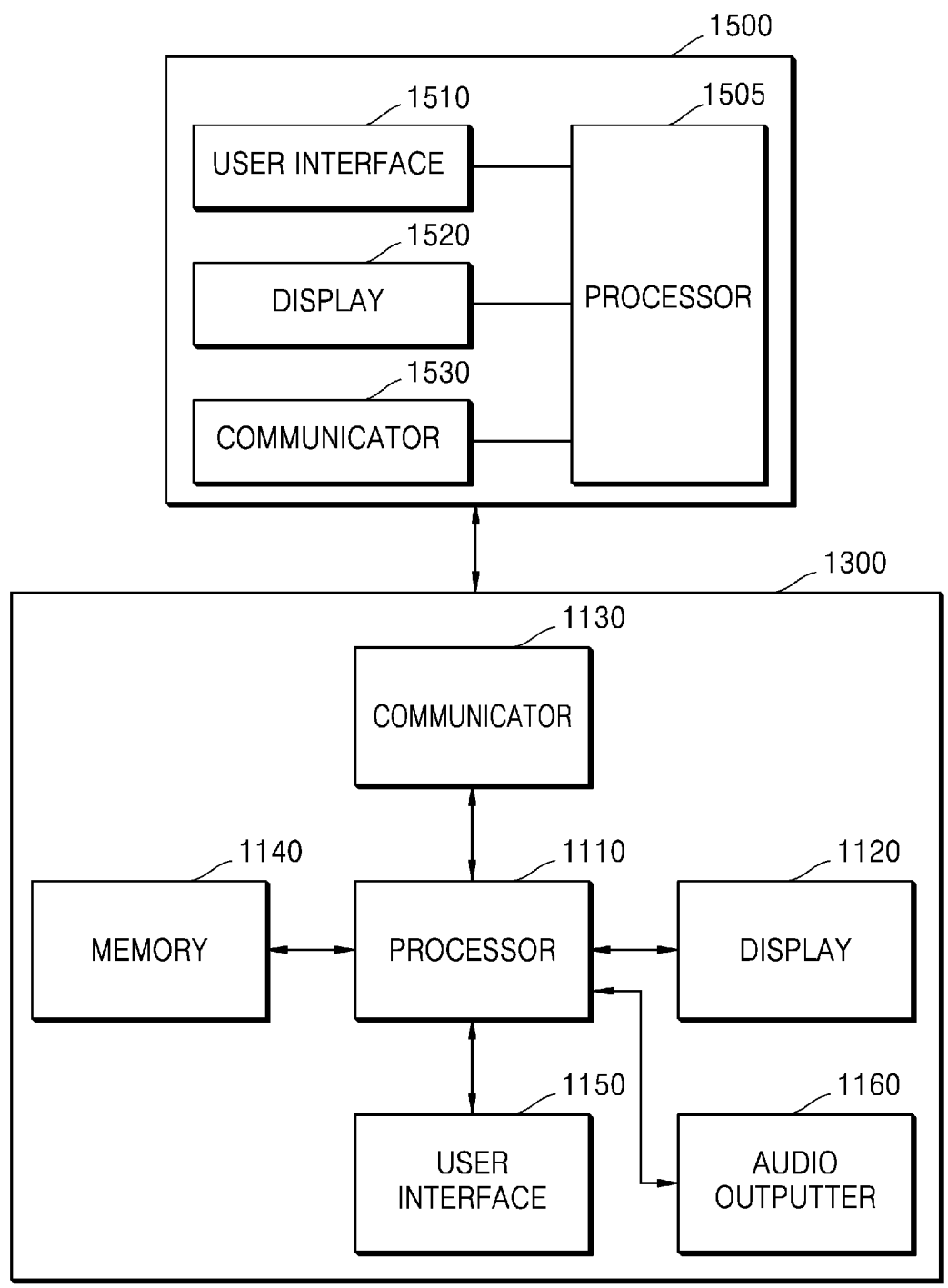
FIG. 18 is a diagram for describing communication connection between a display device and a mobile device, according to an embodiment of the disclosure.

FIG. 18 is a diagram for describing communication connection between the display device and the mobile device, according to an embodiment of the disclosure.

In detail, FIG. 18 illustrates the mobile device 1500 of FIG. 15 and the display device 1300 of FIG. 13 as a mobile device according to an embodiment of the disclosure and a display device according to an embodiment of the disclosure, the mobile device and the display device performing the screen mirroring method 1200, 1400, 1600, 1650, or 1700 according to an embodiment of the disclosure.

Hereinafter, user interface screens output for performing the screen mirroring method 1200, 1400, 1600, 1650, or 1700 according to an embodiment of the disclosure will be described with reference to FIGS. 19 through 24.

The user interface screens illustrated in FIGS. 19 through 24 may be output through any one of the display 1520 of the mobile device (for example, 1500) according to an embodiment of the disclosure or the display 1120 of the display device (for example, 1300) according to an embodiment of the disclosure.

In general, a user input may be more easily received through the mobile device than the display device. Thus, examples in which the user interface screens are output through the display 1520 of the mobile device (for example, 1500) will be described hereinafter with reference to FIGS. 19 through 24.

Figure 19:
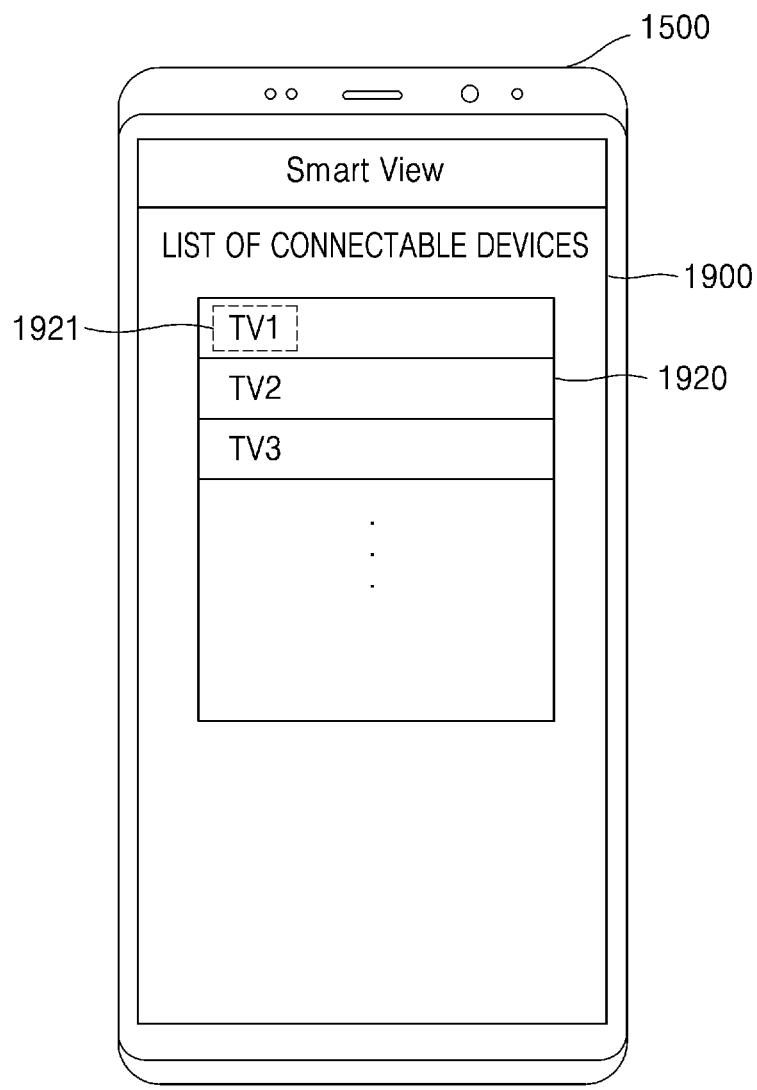
FIG. 19 is a diagram illustrating a user interface screen that is output by a mobile device, according to an embodiment of the disclosure.

FIG. 19 is a diagram illustrating a user interface screen 1900 that is output by the mobile device 1500, according to an embodiment of the disclosure.

Referring to FIG. 19, the user interface screen 1900 may correspond to a screen that is output according to the operation of starting the mirroring service (S810) described above. For example, a user may request an execution of the mirroring service by touching the icon 116 corresponding to the mirroring service on the user interface screen 115 illustrated in FIG. 2. Then, the display 1520 of the mobile device 1500 may output the user interface screen 1900 in response to the touch input on the icon 116. FIG. 19 illustrates the mirroring service as having the name of "smart view."

In detail, when the execution of the mirroring service is requested, the processor 1505 of the mobile device 1500 may search for display devices which may be connected with the mobile device 1500 and may control the user interface screen 1900 showing a list 1920 including the searched devices to be generated and displayed.

The user may select a display device from among the display devices included in the list 1920, with respect to which the user is to be provided with the mirroring service. For example, when a touch input of selecting TV1 1921, which is a display device included in the list 1920, is received, the mobile device 1500 may start the mirroring service with the TV1 1921 in response to the touch input.

Also, when there is no history of a pairing operation with the TV1 1921, which is the selected display device, the mobile device 1500 may perform the pairing operation with the TV1 1921. Alternatively, when there is a history of performing the pairing operation with the TV1 1921, the mobile device 1500 may directly connect communication based on the history of the pairing operation with the TV1 1921. Thus, an execution of the mirroring service between the mobile device 1500 and the TV1 1921 may be started.

Figure 20:
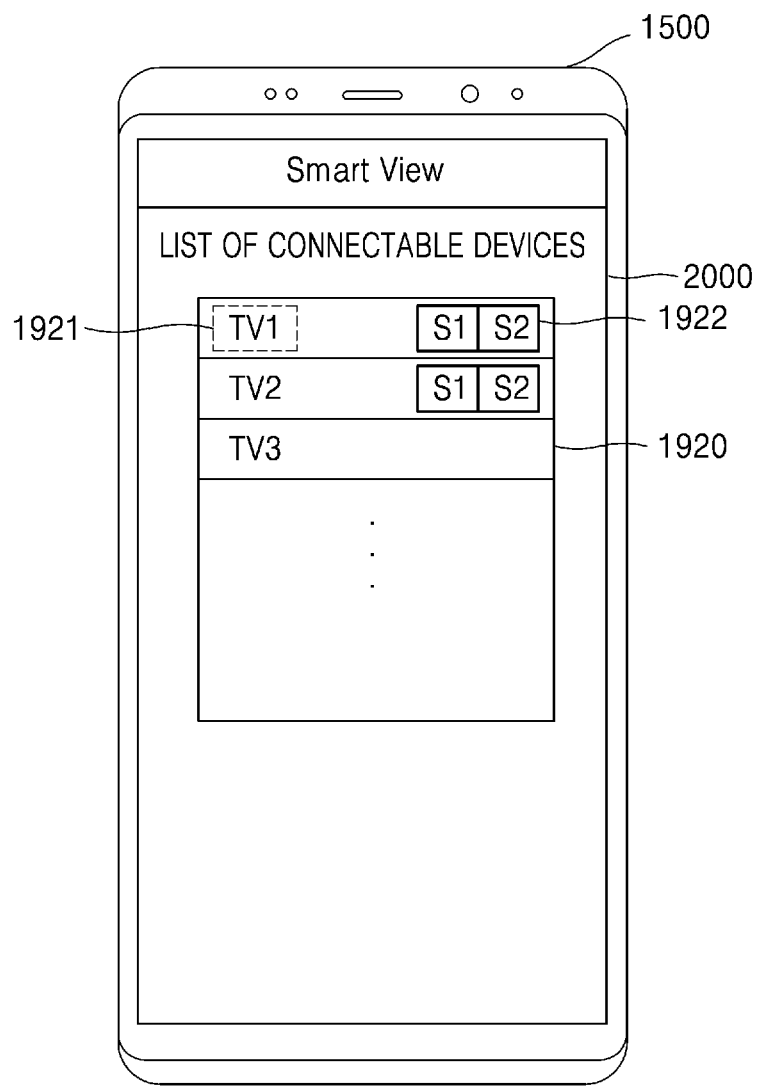
FIG. 20 is another diagram illustrating the user interface screen that is output by the mobile device, according to an embodiment of the disclosure.

FIG. 20 is another diagram illustrating the user interface screen that is output by the mobile device, according to an embodiment of the disclosure.

Referring to FIG. 20, a user interface screen 2000 may correspond to another screen that is output according to the operation of starting the mirroring service (S810) described above. Aspects of the user interface screen 2000 that are the same as the aspects of the user interface screen 1900 illustrated in FIG. 19 are illustrated by using the same reference numerals. Thus, when describing the outputting of the user interface screen 2000, aspects that are the same as the aspects described in FIG. 19 will not be redundantly described.

Referring to FIG. 20, the list 1920 included in the user interface screen 2000 may include information about whether or not each of the searched display devices, which may be connected, provides a function of splitting a screen. Thus, when the user wants to watch a multi-view screen in correspondence to the splitting of the screen according to an embodiment of the disclosure, the user may select a display device providing the function of splitting the screen through the user interface screen 2000.

For example, an icon 1922 for notifying that a corresponding display device has the function of splitting the screen may be displayed on the list 1920. For example, the icon 1922 for notifying about the existence of the function of splitting the screen with respect to each of the display devices included in the list 1920 may be included or may not be included. Here, the icon 1922 may include at least one of a symbol, a letter, or a figure indicating the function of splitting the screen.

In the example illustrated in FIGS. 20, TV1 and TV2 may have the function of splitting the screen and TV3 may not have the function of splitting the screen.

Figure 21:
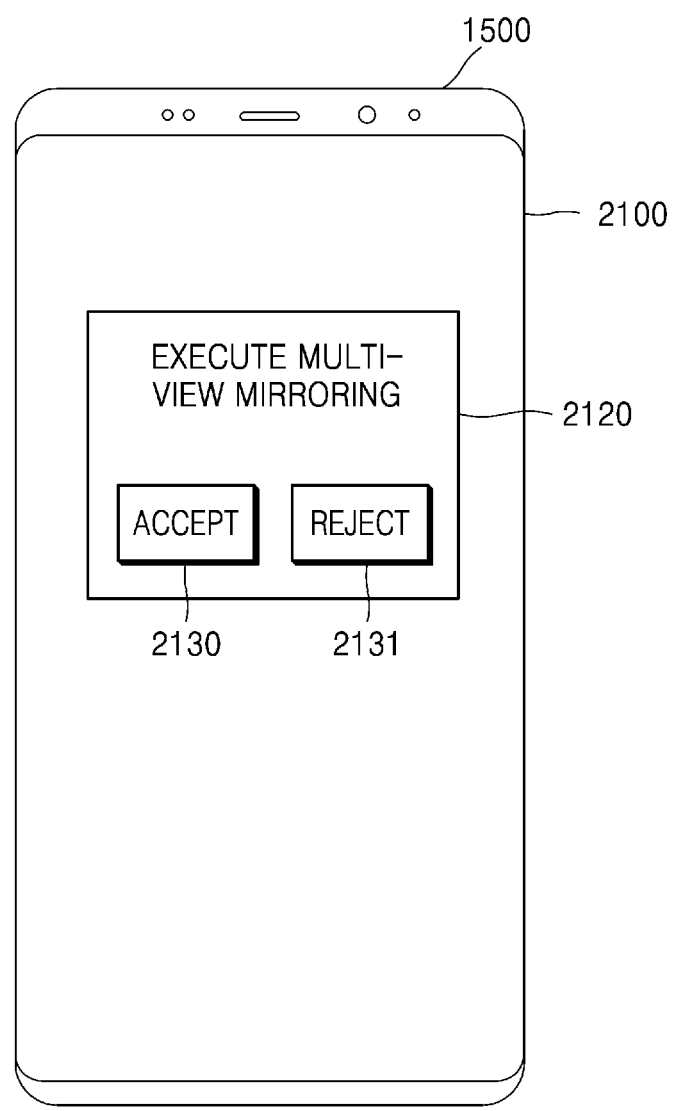
FIG. 21 is another diagram illustrating the user interface screen that is output by the mobile device, according to an embodiment of the disclosure.

FIG. 21 is another diagram illustrating the user interface screen that is output by the mobile device, according to an embodiment of the disclosure.

When a display device (for example, the TV1) selected on the user interface screen 1900 or the user interface screen 2000 includes the function of splitting the screen, the mobile device 1500 may display, on the display 1520, a user interface screen 2100 including a menu 2120 for receiving a user input about whether or not to perform the screen mirroring method according to an embodiment of the disclosure.

In FIG. 21, the screen mirroring method according to an embodiment of the disclosure is illustrated as having the name of "multi-view mirroring." That is, the multi-view mirroring may refer to screen mirroring, whereby a plurality of images corresponding to a plurality of tasks simultaneously performed on the mobile device 1500 are respectively output on a plurality of partial screens generated by splitting the screen of the display device 1300, according to an embodiment of the disclosure.

For example, when a user input corresponding to an acceptance key 2130 of the menu 2120 is received on the user interface 1510, the mobile device 1500 may transmit a control signal for requesting splitting of a screen for the multi-view mirroring, to the display device 1300. In detail, the control signal may be transmitted to the display device 1300 under control of the processor 1505.

Alternatively, when a user input corresponding to a rejection key 2123 of the menu 2120 is received on the user interface 1510, the mobile device 1500 may perform general mirroring rather than the multi-view mirroring, according to an embodiment of the disclosure. Here, the general mirroring denotes mirroring, whereby a screen output by the display 1520 of the mobile device 1500 is directly output by the display 1120 of the display device 1300.

Figure 22:
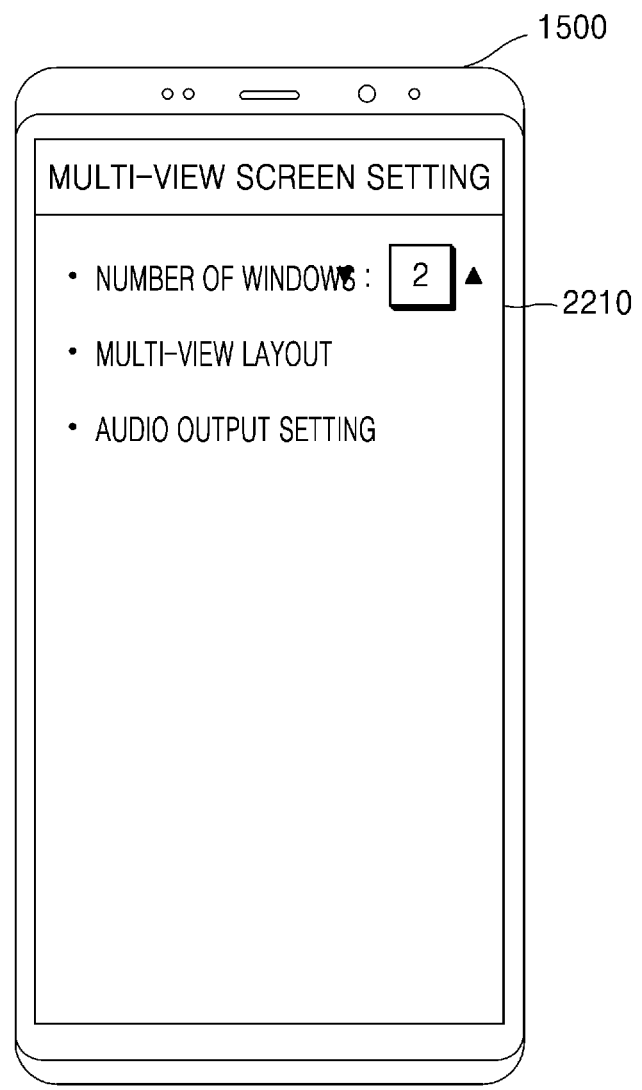
FIG. 22 is another diagram illustrating the user interface screen that is output by the mobile device, according to an embodiment of the disclosure.

FIG. 22 is another diagram illustrating the user interface screen that is output by the mobile device, according to an embodiment of the disclosure.

Figure 23:
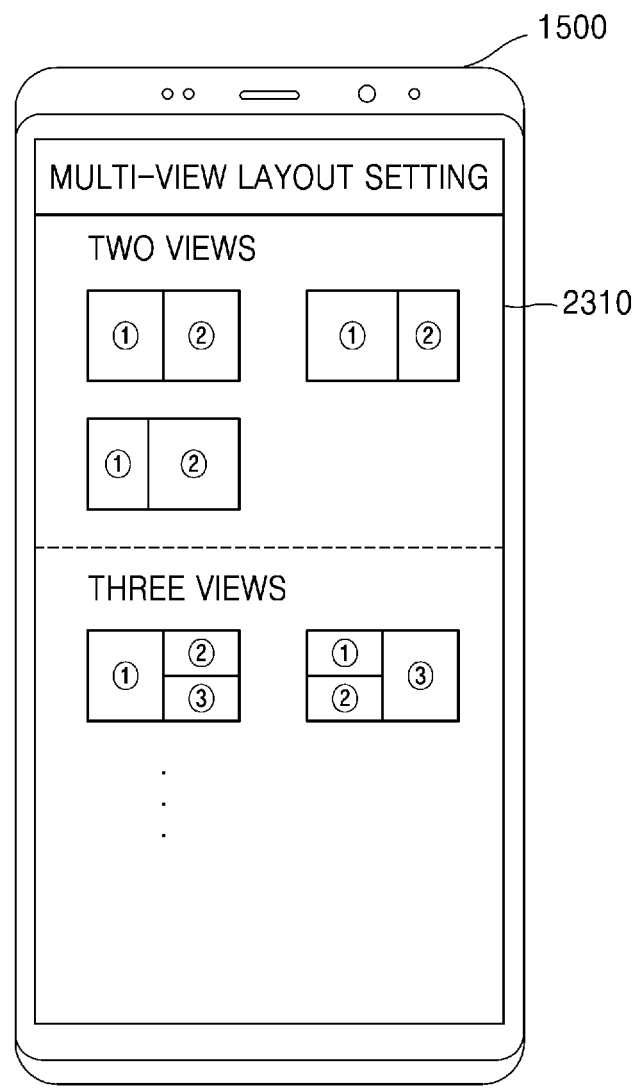
FIG. 23 is another diagram illustrating the user interface screen that is output by the mobile device, according to an embodiment of the disclosure.

FIG. 23 is another diagram illustrating the user interface screen that is output by the mobile device, according to an embodiment of the disclosure.

The mobile device 1500 may perform the setting of the multi-view screen described above, based on user inputs. For example, the mobile device 1500 may perform the setting of the multi-view screen in response to the user input received through a user interface screen 2210 or 2310 illustrated in FIG. 22 or 23.

Referring to FIG. 22, the mobile device 1500 may generate and display the user interface screen 2210 for setting at least one of the number of windows (or images corresponding to the windows) included in the multi-view screen, a multi-view layout, or an audio output setting.

Referring to FIG. 23, when the "multi-view layout" is selected in the user interface screen 2210 of FIG. 22, the mobile device 1500 may generate and display the user interface screen 2310 for setting a layout of images in the multi-view screen.

Figure 24:
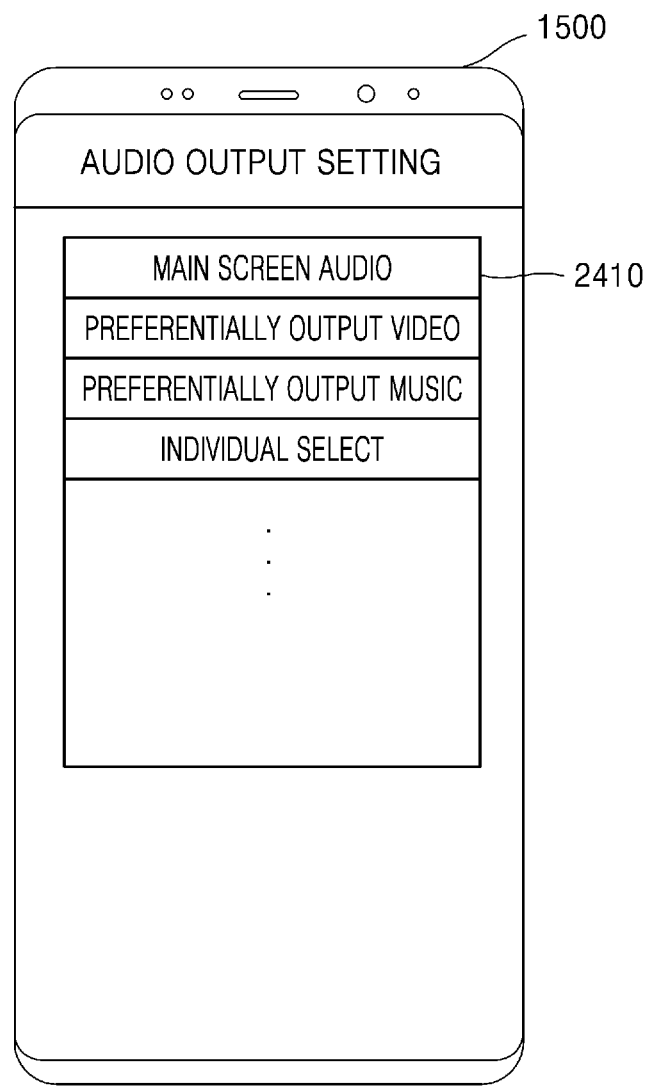
FIG. 24 is another diagram illustrating the user interface screen that is output by the mobile device, according to an embodiment of the disclosure.

FIG. 24 is another diagram illustrating the user interface screen that is output by the mobile device, according to an embodiment of the disclosure.

Referring to FIG. 24, when "the audio output setting" is selected in the user interface screen 2210 of FIG. 22, and when at least two of a plurality of tasks simultaneously performed are accompanied by audio outputs, the mobile device 1500 may generate and display a user interface screen 2410 for setting which piece of audio data is to be preferentially output by the display device 1300. The mobile device 1500 may transmit, to the display device 1300, a control signal for performing the audio output according to the audio output setting performed through the user interface screen 2410. Then, the display device 1300 may output corresponding audio data according to the audio output setting, when the multi-view screen is displayed in operation S870.

Hereinafter, detailed operations of the screen mirroring method according to an embodiment of the disclosure will be described by referring to FIGS. 25 through 29. Also, the screen mirroring method according to embodiments of the disclosure illustrated in FIGS. 25 through 29 will be described by referring to the mobile device 1500 and the display device 1300 illustrated in FIGS. 13, 15, and 18. Also, FIGS. 25 through 29 illustrate an example in which the display device 1300 corresponds to a TV.

Figure 25:
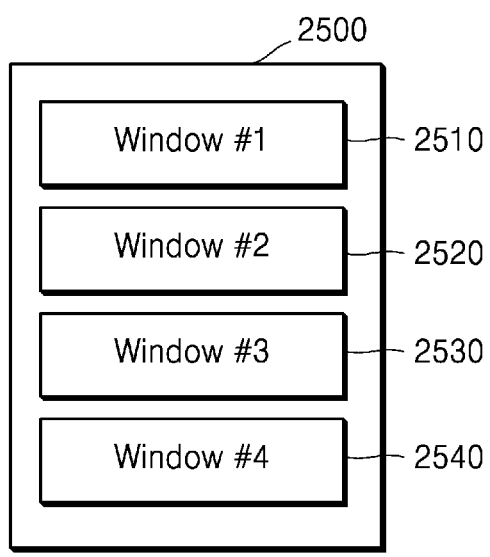
FIG. 25 is a diagram for describing a plurality of pieces of window data generated by a mobile device, according to an embodiment of the disclosure.

FIG. 25 is a diagram for describing a plurality of pieces of window data generated by the mobile device 1500, according to an embodiment of the disclosure. In detail, FIG. 25 illustrates the plurality of pieces of window data corresponding to a plurality of tasks simultaneously performed.

The mobile device 1500 may generate the plurality of pieces of window data corresponding to the plurality of tasks, when the plurality of tasks are performed. In detail, the processor 1505 may generate the plurality of pieces of window data. Also, the plurality of pieces of window data that are generated may be stored in a memory included in the processor 1505 or a memory included in the mobile device 1500 separately from the processor 1505.

FIG. 25 illustrates an example in which the mobile device 1500 generates first through fourth pieces of window data 2510, 2520, 2530, and 2540 respectively corresponding to four tasks, namely, first through fourth tasks.

Referring to FIG. 25, the mobile device 1500 may generate the first piece of window data 2510 for generating an execution window (or an "execution window") when the first task is performed, the second piece of window data 2520 for generating an execution window when the second task is performed, the third piece of window data 2530 for generating an execution window when the third task is performed, and the fourth piece of window data 2540 for generating an execution window when the fourth task is performed.

Here, the plurality of pieces of window data corresponding to the plurality of tasks may be generated in the form in which the plurality of pieces of window data are included in a window stack 2500. An order of arrangement of the pieces of window data in the window stack 2500 may be changed according to an output order or a priority order of the windows.

For example, a first window generated by using the first piece of window data 2510 may be output on a main screen, and second through fourth windows generated by using the second through fourth pieces of window data 2520, 2530, and 2540, respectively, may be output on a sub-screen. In this case, the first piece of window data 2510 may be arranged at an uppermost end in the window stack 2500, and the second through fourth pieces of window data 2520, 2530, and 2540 may be arranged in the window stack 2500 below the first piece of window data 2510.

Also, the mobile device 1500 may sequentially transmit the plurality of pieces of window data to the display device 1300 according to an order in which the plurality of pieces of window data are arranged in the window stack 2500. Then, the display device 1300 may recognize an output order or a priority order of the plurality of windows, based on the order in which the plurality of pieces of window data are transmitted.

Figure 26:
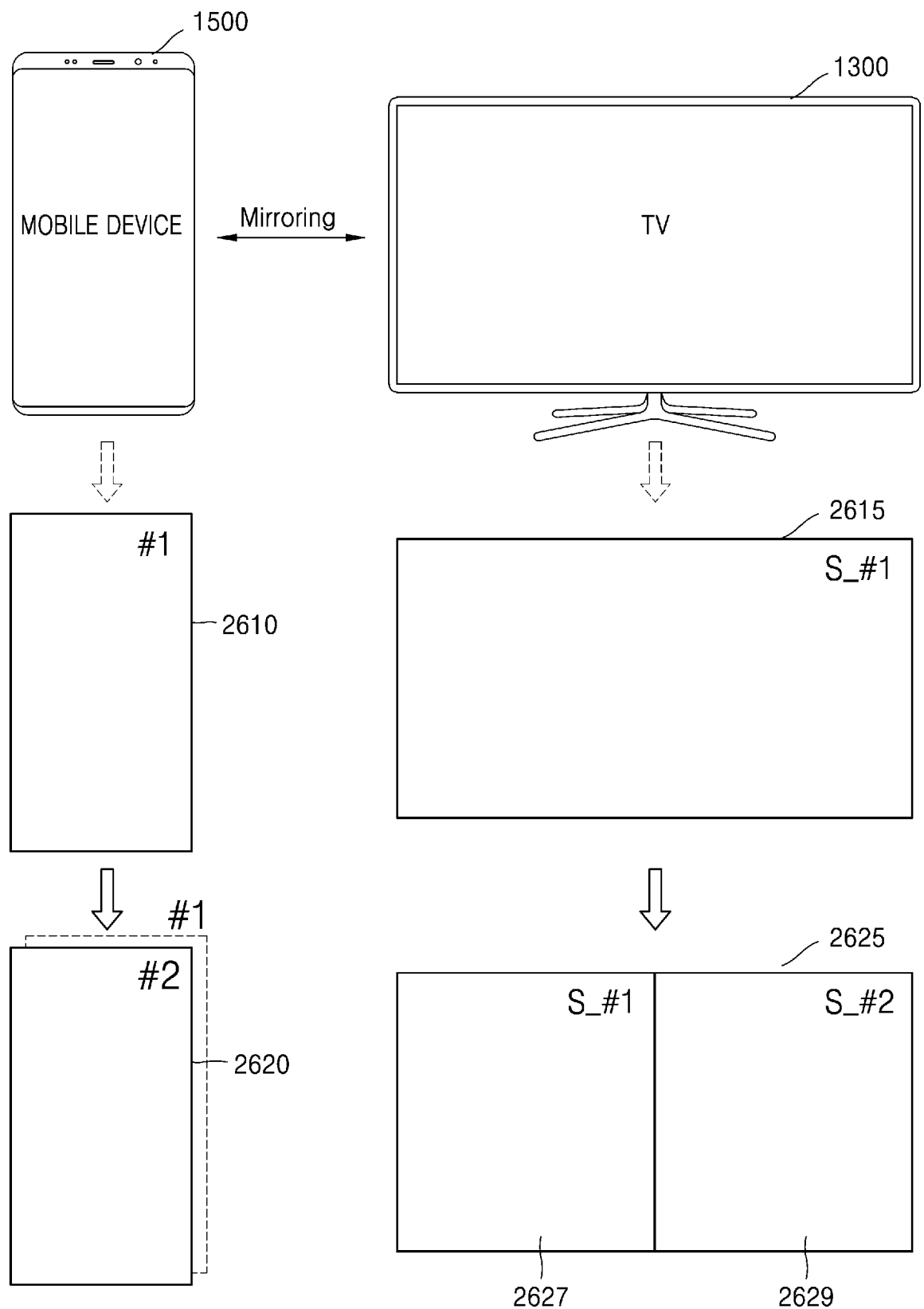
FIG. 26 is a diagram for describing a screen splitting operation, according to an embodiment of the disclosure.

FIG. 26 is a diagram for describing a screen splitting operation, according to an embodiment of the disclosure.

Figure 27:
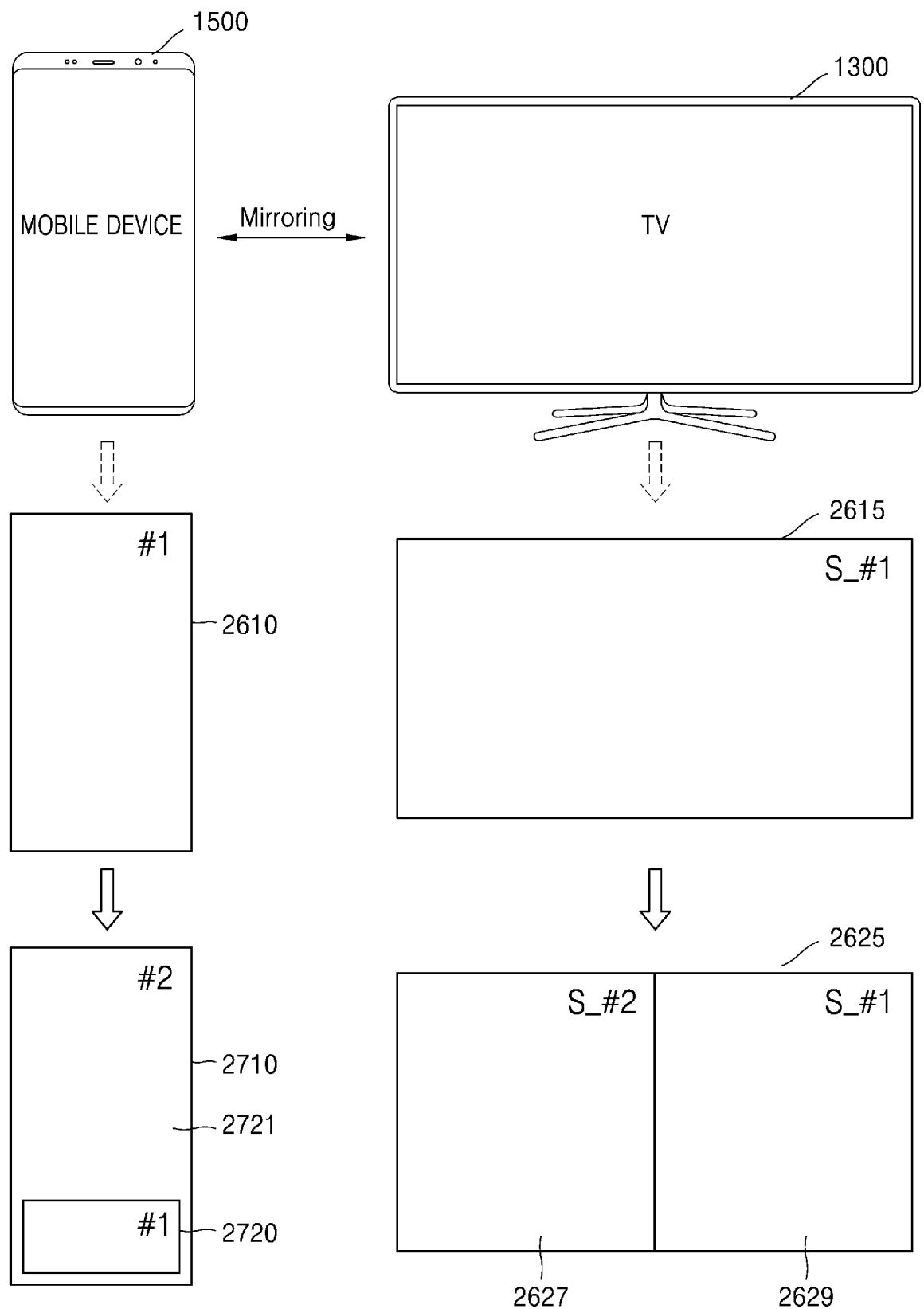
FIG. 27 is another diagram for describing the screen splitting operation, according to an embodiment of the disclosure.

In FIGS. 26 and 27, #1 indicates a first window 2610 output according to the performance of a first task. Here, the first window 2610 may correspond to an execution window of the first task and may indicate a screen output on the display 1520 of the mobile device 1500 when the first task is performed. Also, the first window 2610 may be generated by using the first piece of window data.

Also, #2 indicates a second window 2620 output according to the performance of a second task. Here, the second window 2620 may correspond to an execution window of the second task and may indicate a screen output on the display 1520 of the mobile device 1500 when the second task is performed. Also, the second window 2620 may be generated by using the second piece of window data.

Referring to FIG. 26, a mirroring service between the mobile device 1500 and the display device 1300 may be started.

According to the screen mirroring method according to an embodiment of the disclosure, when the display device 1300 mirrors a screen of the mobile device 1500 and outputs a multi-view screen, at least one image that is not output on the screen of the mobile device 1500 may be output on the multi-view screen.

Referring to FIG. 26, the mobile device 1500 may display the first window 2610 corresponding to the first task on the display 1520, when the first task is performed.

While the first task is executed, the mobile device 1500 may additionally execute the second task. For example, the mobile device 1500 may execute a task that is most recently started in a foreground environment and a task that is previously performed in a background environment. Also, a window (in detail, the second window) corresponding to the task (in detail, the second task) performed in the foreground environment may be output on the display 1520. Also, a window (in detail, the first window) corresponding to the task (in detail, the first task) performed in the background environment may be output on the display 1520 in the form of a floating window or may not be output on the display 1520. By referring to FIG. 26, an example in which the window corresponding to the task (in detail, the first task) performed in the background environment is not output will be described.

Referring to FIG. 26, the second window 2620 corresponding to the second task may be displayed on the display 1520, and the first window 2610 corresponding to the first task may not be displayed.

Because the mirroring service between the mobile device 1500 and the display device 1300 is started, the display device 1300 may mirror the first window 2610, which is the screen of the mobile device 1500, and display a screen 2615 corresponding to the first window 2610, on the display 1120. In FIG. 26, S_#1 indicates an image corresponding to #1 corresponding to the first window 2610. Also, S_#1 may correspond to an image generated by enlarging the image #1 based on a predetermined ratio.

Also, when the mobile device 1500 starts to simultaneously perform the first task and the second task because the second task is added, the display device 1300 may display a screen 2625 that is converted from the screen 2615.

In detail, the display device 1300 may split the screen 2625 according to the number of the tasks simultaneously performed by the mobile device 1500. Here, a first partial screen 2627 and a second partial screen 2629 illustrated in FIG. 26 may respectively correspond to the first partial screen 852 and the second partial screen 853 described with reference to FIG. 8. Also, the display device 1300 may output the image S_#1 corresponding to the first window 2610 corresponding to the first task on the first partial screen 2627 and output the image S_#2 corresponding to the second window 2620 corresponding to the second task on the second partial screen 2629.

FIG. 27 is another diagram for describing the screen splitting operation, according to an embodiment of the disclosure. In FIG. 27, configurations that are the same as the configurations in FIG. 26 are illustrated by using like reference numerals.

Referring to FIG. 27, the window (in detail, the second window) corresponding to the task (in detail, the second task) performed in the foreground environment may be output on the display 1520, and the window (in detail, the first window) corresponding to the task (in detail, the first task) performed in the background environment may be output on the display 1520 in the form of a floating window. Here, the window output in the form of the floating window may correspond to a portion of the whole window.

Thus, when the second task is started to be performed while the first task is performed so that the mobile device 1500 simultaneously performs the first task and the second task, a second window 2721 may be displayed throughout a screen 2710, and a first window 2720 may be displayed in the form of the floating window displayed on a portion of the second window 2721.

The display device 1300 may display the screen 2625 by mirroring the screen 2720, according to an embodiment of the disclosure.

Figure 28:
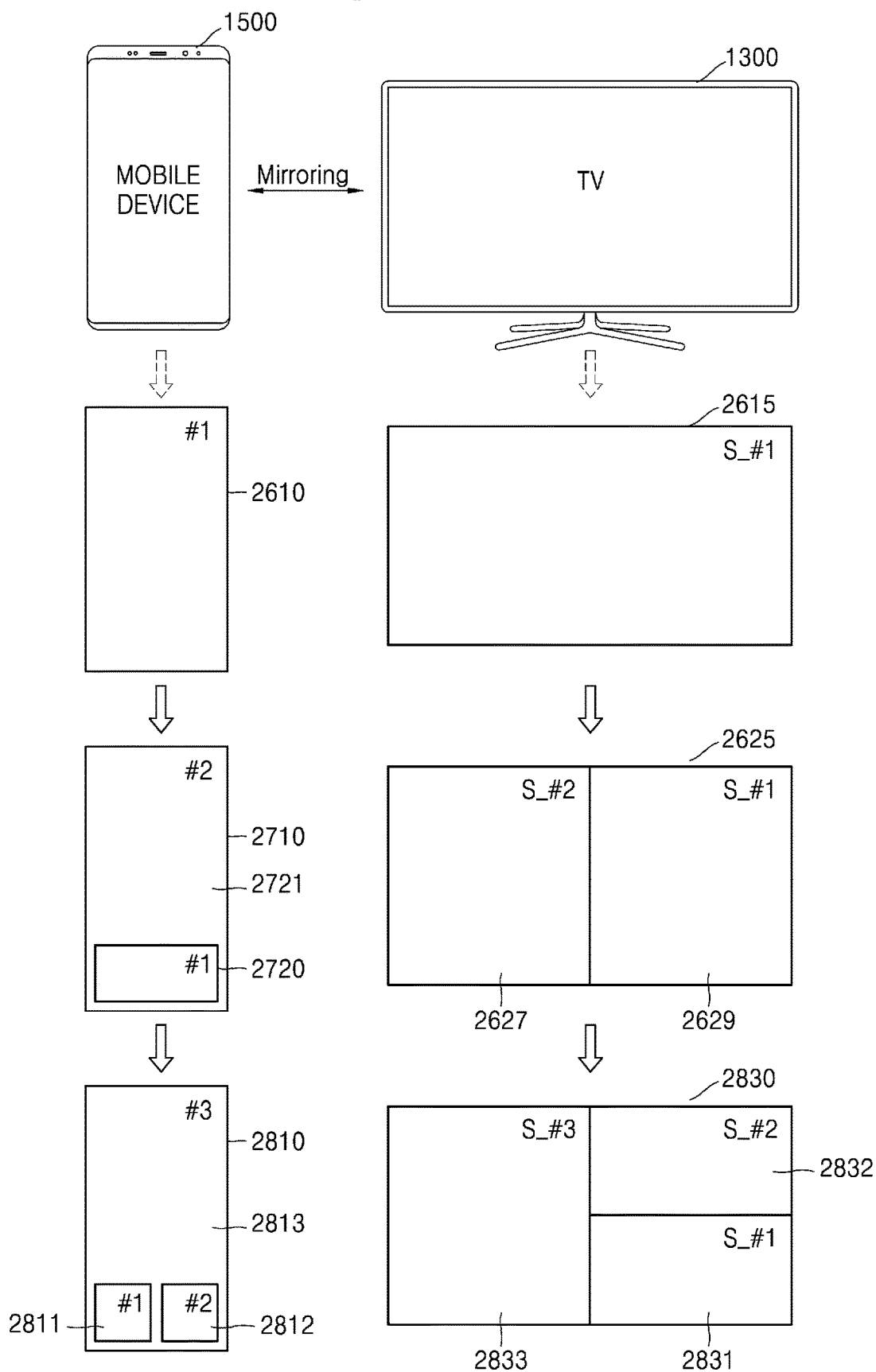
FIG. 28 is another diagram for describing the screen splitting operation, according to an embodiment of the disclosure.

FIG. 28 is another diagram for describing the screen splitting operation, according to an embodiment of the disclosure. In FIG. 28, configurations that are the same as the configurations in FIG. 27 are illustrated by using like reference numerals.

Referring to FIG. 28, the mobile device 1500 may sequentially perform a first task, a second task, and a third task. In detail, the mobile device 1500 may additionally perform the third task while outputting the screen 2710 by simultaneously performing the first and second tasks. Then, the mobile device 1500 may convert the screen 2710 into a screen 2810 as the third task is additionally performed. Also, the mobile device 1500 may transmit information about a change in the tasks simultaneously performed to the display device 1300, when the third task is additionally performed while the first and second tasks are simultaneously performed. In detail, the communicator 1530 may transmit the information about the change to the display device 1300 under control of the processor 1505.

Then, the processor 1110 of the display device 1300 may again split the screen based on the information about the change described above. Also, the processor 1110 may control images corresponding to the plurality of tasks simultaneously performed to be displayed on a plurality of re-split partial screens, respectively.

Referring to FIG. 28, the mobile device 1500 perform a task that is most recently started in a foreground environment and at least one task previously performed in a background environment.

Thus, a window (in detail, a third window 2813) corresponding to the task (in detail, the third task) performed in the foreground environment may be output on the display 1520, and windows (in detail, first and second windows 2811 and 2812) corresponding to the tasks (in detail, the first and second tasks) performed in the background environment may be output on the display 1520 in the form of floating windows.

In detail, the mobile device 1500 may display the third window 2813 corresponding to #3 throughout a screen 2810 and display the first window 2811 and the second window 2812 in the form of the floating windows on portions of the third window 2813.

The display device 1300 may display a screen 2830 by mirroring the screen 2810, according to an embodiment of the disclosure.

In detail, the display device 1300 may split the screen 2830 according to the number (3) of the tasks simultaneously performed by the mobile device 1500, when the third task is additionally started while the first and second tasks are performed. Thus, an image S_#1 corresponding to the first window 2811 corresponding to the first task may be output on a first partial screen 2831, an image S_#2 corresponding to the second window 2812 may be output on a second partial screen 2832, and an image S_#3 corresponding to the third window 2813 may be output on a third partial screen 2833, wherein the three of the first through third partial screens 2831, 2832, and 2833 are split in the screen 2830.

Figure 29:
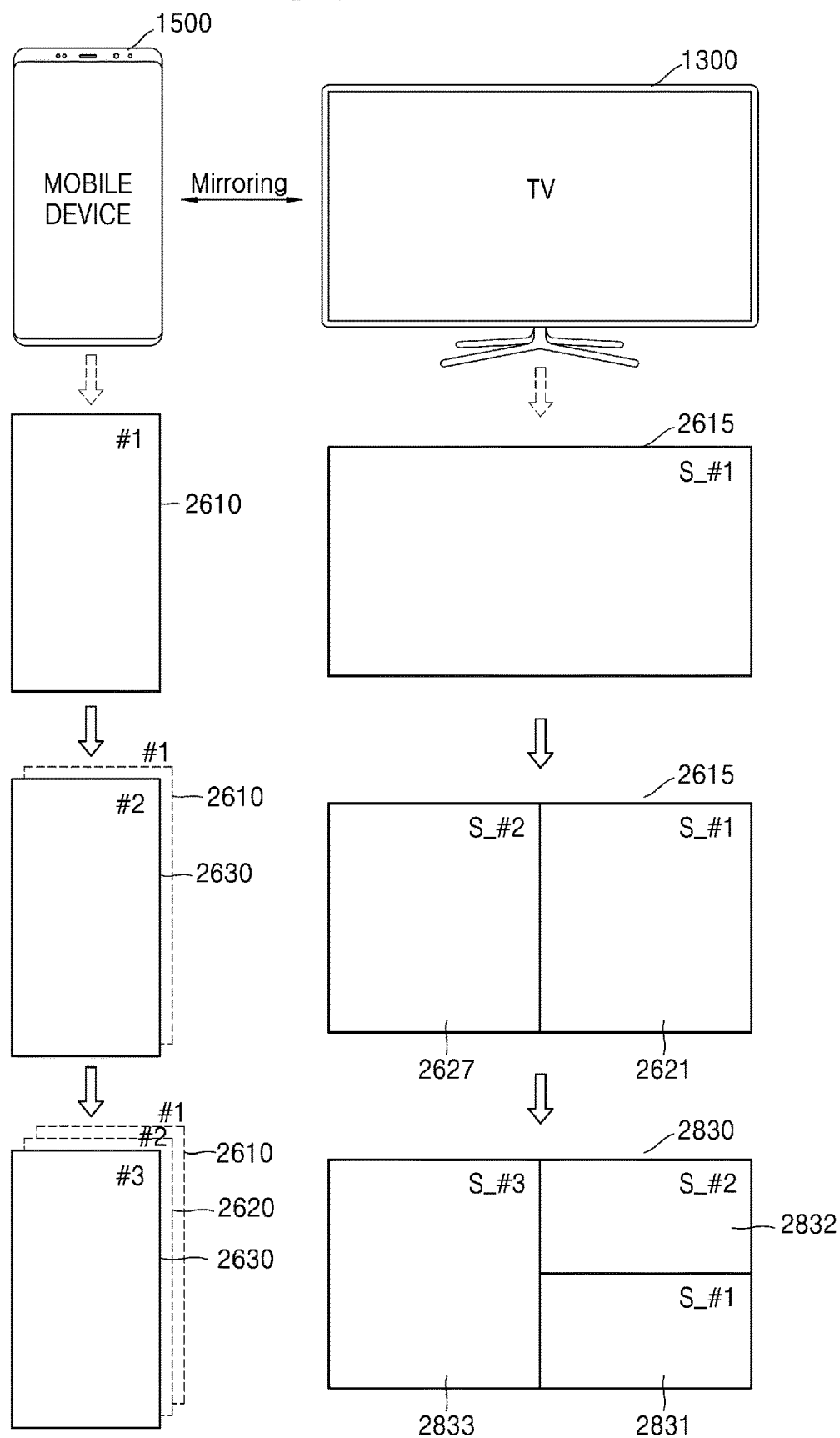
FIG. 29 is another diagram for describing the screen splitting operation, according to an embodiment of the disclosure.

FIG. 29 is another diagram for describing the screen splitting operation, according to an embodiment of the disclosure. In FIG. 29, configurations that are the same as the configurations in FIG. 26 are illustrated by using like reference numerals.

Referring to FIG. 29, the mobile device 1500 may sequentially perform a first task, a second task, and a third task. In detail, the mobile device 1500 may additionally perform the third task while outputting the screen 2620 corresponding to the second window by simultaneously performing the first and second tasks. Then, the mobile device 1500 may convert the screen 2620 corresponding to the second window into a screen 2920 as the third task is additionally performed.

Referring to FIG. 29, the mobile device 1500 perform a task that is most recently started to be performed in a foreground environment and at least one task previously performed in a background environment. By referring to FIG. 29, an example in which the window corresponding to the task performed in the background environment is not output will be described.

Thus, a window (in detail, a third window 2831) corresponding to the task (in detail, the third task) performed in the foreground environment may be output on the display 1520, and windows (in detail, first and second windows 2610 and 2620 corresponding to the tasks (in detail, the first and second tasks) performed in the background environment may not be output on the display 1520. Referring to FIG. 29, while all of the first through third tasks are performed, the mobile device 1500 may display a screen 2920 displaying the third window #3 2831 corresponding to the third task that is most recently started.

The display device 1300 may display the screen 2830 by mirroring the screen 2920, according to an embodiment of the disclosure.

In detail, the display device 1300 may split the screen 2830 according to the number (3) of the tasks simultaneously performed by the mobile device 1500, when the third task is additionally started while the first and second tasks are performed. Thus, the image S_#1 corresponding to the first window 2610 corresponding to the first task may be output on the first partial screen 2831, the image S_#2 corresponding to the second window 2620 may be output on the second partial screen 2832, and the image S_#3 corresponding to the third window 2630 may be output on the third partial screen 2833, wherein the three of the first through third partial screens 2831, 2832, and 2833 are split in the screen 2830.

Figure 30:
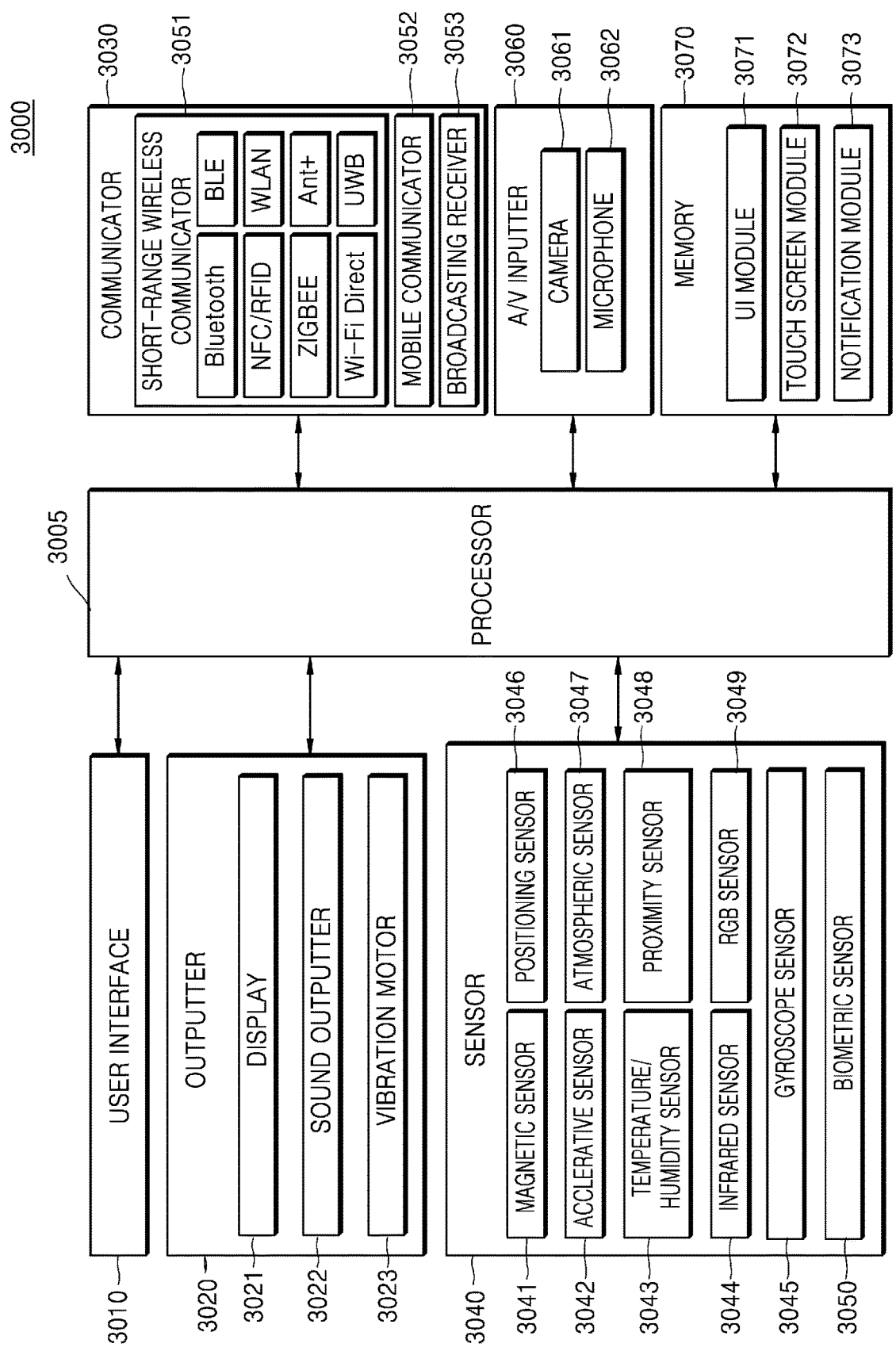
FIG. 30 is another diagram illustrating the display device, according to an embodiment of the disclosure.

FIG. 30 is another diagram illustrating the mobile device, according to an embodiment of the disclosure. A mobile device 3000 illustrated in FIG. 30 may correspond to the mobile device 110 or 1500 described in FIG. 1 or 15. In detail, a processor 3005, a user interface 3010, a display 3021, and a communicator 3030 included in the mobile device 3000 illustrated in FIG. 30 may respectively correspond to the processor 1505, the user interface 1510, the display 1520, and the communicator 1530 included in the mobile device 1500 illustrated in FIG. 15.

Thus, when describing the mobile device 3000, aspects that are the same as the aspects of the mobile device 110 or 1500 will not be redundantly described.

The user interface 3010 may denote a device for inputting data for a user to control the mobile device 3000. For example, the user interface 3010 may include a key pad, a dome switch, a touch pad (a touch capacitance method, a pressure resistive-layer method, an infrared sensing method, a surface ultrasonic conduction method, an integral tension measurement method, a piezo effect method, etc.), a jog wheel, a jog switch, etc., but is not limited thereto.

The user interface 3010 may receive a user input for selecting a virtual image to be displayed. Also, the user interface 3010 may receive a user input for setting an operation of the virtual image and a user input for purchasing items related to the virtual image.

An outputter 3020 may output an audio signal, a video signal, or a vibration signal. The outputter 3020 may include a display 3021, a sound outputter 3022, and a vibration motor 3023.

The display 3021 may display data processed by the mobile device 3000. For example, the display 3021 may display the user interface for selecting the virtual image, the user interface for setting the operation of the virtual image, and the user interface for purchasing the items related to the virtual image.

When a touch screen is provided by including a layered structure of the display 3021 and a touch pad, the display 3021 may also be used as an inputter, in addition to an outputter. The display 3021 may include at least one of a liquid crystal display, a thin-film transistor liquid crystal display, an organic light-emitting diode, a flexible display, a three-dimensional display, or an electrophoretic display. Also, the mobile device 3000 may include two or more displays 3021 according to a realized form of the mobile device 3000. Here, the two or more displays 3021 may be arranged to face each other by using a hinge.

The sound outputter 3022 may output audio data received from the communicator 3030 or stored in a memory 3070. Also, the sound outputter 3022 may output a sound signal related to functions performed in the mobile device 3000 (for example, call signal reception sound, message reception sound, notification sound, etc.). The sound outputter 3022 may include a speaker, a buzzer, etc.

The vibration motor 3023 may output a vibration signal. For example, the vibration motor 3023 may output a vibration signal corresponding to an output of audio data or video data (for example, call signal reception sound, message reception sound, etc.). Also, the vibration motor 3023 may output a vibration signal when a touch is input on the touch screen.

The processor 3005 may control general operations of the mobile device 3000. For example, the processor 3005 may execute programs stored in the memory 3070 to generally control the user interface 3010, the outputter 3020, a sensor 3040, the communicator 3030, an audio/video (NV) inputter 3060, etc.

The sensor 3040 may sense a state of the mobile device 3000 or a state around the mobile device 3000 and transmit the sensed information to the processor 3005.

The sensor 3040 may include, but is not limited to, at least one of a magnetic sensor 3041, an acceleration sensor 3042, a temperature/humidity sensor 3043, an infrared sensor 3044, a gyroscope sensor 3045, a positioning sensor (for example, a global positioning sensor (GPS) 3046, an atmospheric sensor 3047, a proximity sensor 3048, an RGB (illuminance) sensor 3049, or a biometric sensor 3050. A function of each of the sensors may be intuitively inferred by one of ordinary skill in the art from its name, and thus, its detailed description will not be given.

The communicator 3030 may include one or more components enabling communication between the mobile device 3000 and an HMD device or between the mobile device 3000 and a server. For example, the communicator 3030 may include a short-range wireless communicator 3051, a mobile communicator 3052, and a broadcasting receiver 3053.

The short-range wireless communicator 3051 may include a Bluetooth communicator, a BLE communicator, a near field communicator, a WLAN (Wifi) communicator, a Zigbee communicator, an infrared data association (IrDA) communicator, a Wifi direct (WFD) communicator, a UWB communicator, an Ant+ communicator, etc., but is not limited thereto.

The mobile communicator 3052 may transmit and receive wireless signals to and from at least one of a base station, an external terminal, or a server through a mobile network. Here, the wireless signals may include a sound call signal, a video-telephony call signal, or various forms of data according to transmission and reception of text/multimedia.

The broadcasting receiver 3053 may receive a broadcasting signal and/or information related to a broadcasting program from the outside through a broadcasting channel. The broadcasting channel may include a satellite channel, a ground wave channel, etc. According to an embodiment of the disclosure, the mobile device 3000 may not include the broadcasting receiver 3053.

The AN inputter 3060 may include a camera 3061 and a microphone 3062 for inputting an audio signal or a video signal. The camera 3061 may obtain an image frame, such as a still image or a video, through an image sensor, in a video-telephony mode or a capturing mode. An image captured by the image sensor may be processed by the processor 3005 or an additional image processor.

The image framed processed by the camera 3061 may be stored in the memory 3070 or may be transmitted to the outside through the communicator 3030. Two or more cameras 3061 may be provided according to a realized form of the terminal.

The microphone 3062 may receive an external sound signal and process the received external sound signal into electrical sound data. For example, the microphone 3062 may receive a sound signal from an external device or a speaker. The microphone 3062 may use various noise removal algorithms for removing noise occurring in a process of receiving the external sound signal.

The memory 3070 may store a program for processing and controlling operations of the processor 3005 and may store data input to the mobile device 3000 or output from the mobile device 3000.

The memory 3070 may include at least one type of storage medium from a flash-type memory, a hard disk-type memory, a multimedia card micro-type memory, a card type memory (for example, an SD or an XD memory), RAM, SRAM, ROM, EEPROM, PROM, a magnetic memory, a magnetic disk, or an optical disk.

The programs stored in the memory 3070 may be divided into a plurality of modules according to their functions. For example, the programs may be divided into a user interface (UI) module 3071, a touch screen module 3072, a notification module 3073, etc.

The UI module 3071 may provide a specialized UI or GUI synchronized with the mobile device 3000 for each of applications. The touch screen module 3072 may sense a touch gesture of a user on the touch screen and transmit information about the touch gesture to the processor 3005. The touch screen module 3072 according to an embodiment of the disclosure may recognize and analyze a touch code. The touch screen module 3072 may be formed as an additional hardware device including a controller.

Various sensors may be provided in or around the touch screen to sense a touch or an approximate touch on the touch screen. For example, a haptic sensor may be provided as an example of the sensor for sensing the touch on the touch screen. The tactile sensor refers to a sensor configured to sense a touch of a specific object as a human being senses or better than a human being. The tactile sensor may sense various information, such as the roughness of a contact surface, the rigidity of a contact object, and the temperature of a contact point.

The sensor for sensing the touch on the touch screen may include, for example, a proximity sensor.

The proximity sensor refers to a sensor configured to detect the presence or absence of an object approaching a predetermined detection surface or a nearby object without mechanical contact by using the force of an electromagnetic field or infrared rays. Examples of the proximity sensor include a transmission-type photoelectric sensor, a direct reflection-type photoelectric sensor, a mirror reflection-type photoelectric sensor, a high frequency oscillation-type proximity sensor, a capacitive proximity sensor, a magnetic proximity sensor, an infrared proximity sensor, etc. The user's touch gestures may include tap, touch & hold, double tap, drag, panning, flick, drag and drop, swipe, and the like.

The notification module 3073 may generate a signal for notifying about the occurrence of an event of the mobile device 3000. Examples of the event occurring in the mobile device 3000 may include call signal reception, message reception, key signal inputting, schedule notification, etc. The notification module 3073 may output the notification signal in the form of a video signal through the display 3021, may output the notification signal in the form of an audio signal through the sound outputter 3022, or may output the notification signal in the form of a vibration signal through the vibration motor 3023.

Figure 31:
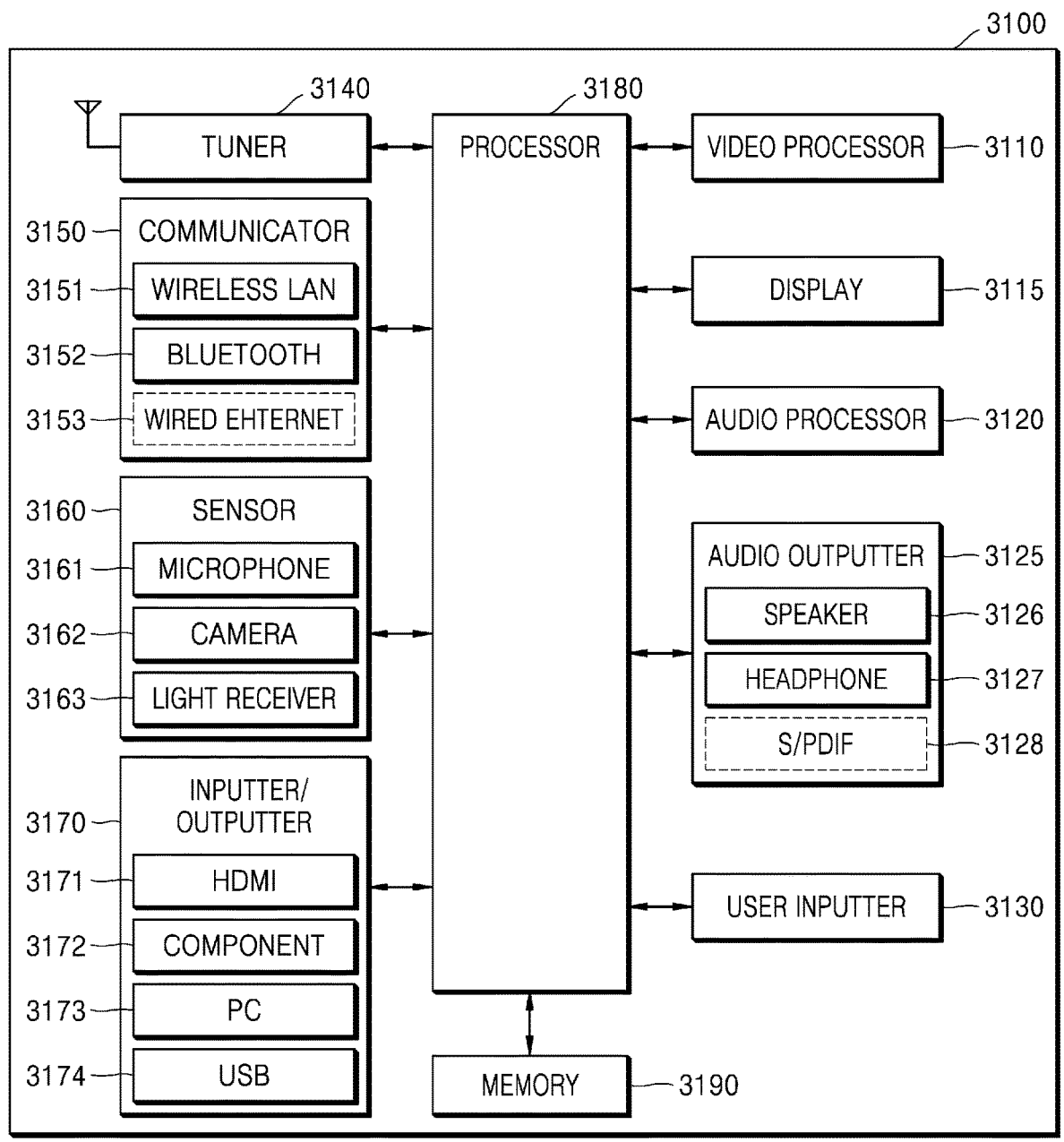
FIG. 31 is another diagram illustrating the display device, according to an embodiment of the disclosure.

FIG. 31 is another diagram illustrating the display device, according to an embodiment of the disclosure.

A display device 3100 may correspond to the display device (for example, 120, 1100, or 1300) according to an embodiment of the disclosure described with reference to FIGS. 1 through 29. Thus, when describing the display device 3100, the same aspects as FIGS. 1 through 29 will not be described.

In detail, a processor 3180, a display 3115, a communicator 3150, a memory 3190, a user interface 3130, and an audio outputter 3125 included in the display device 3100 illustrated in FIG. 31 may respectively correspond to the processor 1110, the display 1120, the communicator 1130, the memory 1140, the user interface 1150, and the audio outputter 1160 included in the display device 1300 illustrated in FIG. 13.

The video processor 3110 may process video data received by the display device 3100. The video processor

3110 may perform various image processing operations on the video data, such as decoding, scaling, noise filtering, frame rate conversion, resolution conversion, etc.

The processor 3180 may receive a request of recording the video data processed by the video processor 3110 and control the video data to be encrypted and recorded in a memory device, for example, RAM, included in the processor 3180 or the memory 3190.

The display 3115 may display a video included in the broadcasting signal received through a tuner 3140 on a screen under control of the processor 3180. Also, the display 3115 may display content (for example, a video) input through the communicator 3150 or an inputter/outputter 3170.

Also, the display 3115 may output an image stored in the memory 3190 under control of the processor 3180. Also, the display 3115 may display a sound UI (for example, including a sound instruction guide) for performing a sound recognition task corresponding to sound recognition or a motion UI (for example, including a user motion guide for motion recognition) for performing a motion recognition task corresponding to motion recognition.

The audio processor 3120 may process audio data. The audio processor 3120 may perform various processing operations on the audio data, such as decoding, amplification, noise filtering, etc. The audio processor 3120 may include a plurality of audio processing modules for processing audio data corresponding to a plurality of pieces of content.

The audio outputter 3125 may output audio data included in the broadcasting signal received through the tuner 3140 under control of the processor 3180. The audio outputter 3125 may output audio data (for example, a voice, sound, etc.) input through the communicator 3150 or the inputter/outputter 3170. Also, the audio outputter 3125 may output audio data stored in the memory 3190 under control of the processor 3180. The audio outputter 3125 may include at least one of a speaker 3126, a headphone output terminal 3127 or an S/PDIF output terminal 3128. The audio outputter 3125 may include a combination of the speaker 3126, the headphone output terminal 3127, and the S/PDIF output terminal 3128.

A power unit 3130 may supply power that is input from an external power source to the components 3110 through 3190 of the display device 3100 under control of the processor 3180. Also, the power unit 3130 may supply power that is output from a battery or two or more batteries included in the display device 3100 to the internal components 3110 through 3190 under control of the processor 3180.

The tuner 3140 may tune and select only frequencies of a channel to be received by the display device 3100, from many eletrowave components, through amplification, mixing, resonance, etc. with respect to the broadcasting signals received based on a wired or wireless method. The broadcasting signals may include audio data, video data, and additional data (for example, an electronic program guide (EPG)).

The tuner 3140 may receive the broadcasting signals from a frequency band corresponding to a channel number (for example, a cable broadcasting number 506) according to a control signal received from an external control device, for example, a remote controller, wherein the control signal includes for example, an input of a channel number, an input of upward or downward scrolls through channels, a channel input on an EPG screen, etc.

The tuner 3140 may receive the broadcasting signals from various sources, such as ground wave broadcasting, cable broadcasting, satellite broadcasting, Internet broadcasting, etc. The tuner 3140 may receive the broadcasting signals from sources, such as analog broadcasting or digital broadcasting. The broadcasting signals received through the tuner 3140 may be decoded (for example, audio-decoded, video-decoded, or additional data-decoded) and divided into audio data, video data and/or additional data. The divided audio data, video data, and/or additional data may be stored in the memory 3190 under control of the processor 3180.

The tuner 3140 of the display 3100 may include a single tuner or a plurality of tuners. According to an embodiment of the disclosure, when the tuner 3140 includes a plurality of tuners, a plurality of broadcasting signals may be output on a plurality of partial screens included in a multi-view screen provided on the display 3115.

The tuner 3140 may be realized as an all-in-one unit in the display device 3100, as an additional device (for example, a settop box) having a tuner electrically connected to the display device 3100, or as a tuner connected to the inputter/outputter 3170.

The communicator 3150 may connect the display device 3100 to an external device (for example, an audio device, etc.) under control of the processor 3180. The processor 3180 may transmit/receive content to and from the external device connected to the processor 3180 through the communicator 3150 or may download/web-browse an application from the external device through the communicator 3150. In detail, the communicator 3150 may receive content from the external device by accessing a network.

As described above, the communicator 3150 may include at least one of a short-range wireless communication module, a wired communication module, or a mobile communication module.

FIG. 31 illustrates an example in which the communicator 3150 includes one of a wireless LAN 3151, a Bluetooth communicator 3152, or wired Ethernet 3153.

Also, the communicator 3150 may include a module combination including at least one of the wireless LAN 3151, the Bluetooth communicator 3152, or the wired Ethernet 3153. Also, the communicator 3150 may receive a control signal of a controller under control of the processor 3180. The control signal may be realized as a Bluetooth type, a radio frequency (RF) signal type, or a Wifi type.

The communicator 3150 may further include a different short-range wireless communication module (for example, an NFC module and an additional BLE module), in addition to the Bluetooth module.

A sensor 3160 may sense a voice, an image, or interaction of a user.

A microphone 3161 may receive an uttered voice of the user. The microphone 3161 may output the received voice to the processor 3180 by converting the received voice into an electrical signal. The user voice may include, for example, a voice corresponding to a menu or a function of the display device 3100. For example, a recommended recognition range of the microphone 3161 may be within about 4 m from the microphone 3161 to a location of the user, and the recognition range of the microphone 3161 may be changed based on a volume of the voice of the user or an ambient environment (for example, a speaker sound, an ambient noise, etc.).

The microphone 3161 may be realized as an integral type or a separate type with respect to the display device 3100. The microphone 3161 that is a separate type may be electrically connected to the display device 3100 through the communicator 3150 or the inputter/outputter 3170.

It may be easily understood by one of ordinary skill in the art that the microphone 3161 may be excluded according to the performance and the structure of the display device 3100.

The camera 3162 may receive an image (for example, continual frames) corresponding to a motion of the user including a gesture within a camera recognition range. For example, the recognition range of the camera 3162 may correspond to a distance of about 0.1 m to about 5 m from the camera 3162 to the user. The motion of the user may include, for example, a body part of the user, such as a face, an expression, a hand, a fist, a finger, etc. of the user, or a motion of the body part of the user. The camera 3162 may convert the received image into an electrical signal and output the electrical signal through the processor 3180 under control of the processor 3180.

The processor 3180 may select a menu displayed on the display device 3100 by using a result of recognizing the received motion or may perform a control operation corresponding to the result of recognizing the receiving motion. For example, the control operation may include a channel adjustment, a volume adjustment, a cursor movement, etc.

The camera 3162 may include a lens and an image sensor. The camera 3162 may support optical zooming or digital zooming, by using a plurality of lenses and image processing. A recognition range of the camera 3162 may be set in various ways according to an angle of the camera and conditions of an ambient environment. When the camera 3162 includes a plurality of cameras, a three-dimensional still image or a three-dimensional motion may be received by using the plurality of cameras.

The camera 3162 may be realized as an integral type or a separate type with respect to the display device 3100. An additional device including the separate type camera 3162 may be electrically connected to the display device 3100 through the communicator 3150 or the inputter/outputter 3170.

It may be easily understood by one of ordinary skill in the art that the camera 3162 may be excluded according to the performance and the structure of the display device 3100.

A light receiver 3163 may receive an optical signal (including a control signal) from an external controller through an optical window of a bezel of the display 3115. The light receiver 3163 may receive the optical signal corresponding to a user input (for example, a touch input, a press input, a touch gesture, a voice, or a motion) from the controller. A control signal may be extracted from the received optical signal under control of the processor 3180.

For example, the light receiver 3163 may receive a signal corresponding to a pointing location of the controller and transmit the signal to the processor 3180. For example, when a user interface screen for receiving data or a command from the user is output through the display 3115 and the user is to input the data or the command to the display device 3100 through the controller, the light receiver 3163 may receive a signal corresponding to a motion of the controller and transmit the signal to the processor 3180, when the user moves the controller in a state in which a finger of the user touches a touch pad provided in the controller. Also, the light receiver 3163 may receive a signal indicating that a predetermined button provided in the controller is pressed and transmit the signal to the processor 3180. For example, when the user presses the touch pad provided in the form of a button in the controller by using a finger, the light receiver 3163 may transmit the signal indicating that the button-type touch pad is pressed to the processor 3180. For example, the signal indicating that the button-type touch pad is pressed may be used as a signal for selecting one of items.

The inputter/outputter 3170 may receive video data (for example, a video, etc.), audio data (for example, a voice, music, etc.), and additional data (for example, an EPG, etc.) from the outside of the display device 3100 under control of the processor 3180. The inputter/outputter 3170 may include one of an HDMI port 3171, a component jack 3172, a PC port 3173, or a USB port 3174. The inputter/outputter 3170 may include a combination of the HDMI port 3171, the component jack 3172, the PC port 3173, and the USB port 3174.

It may be easily understood by one of ordinary skill in the art that the structure and the operation of the inputter/outputter 3170 may be realized in various ways according to an embodiment of the disclosure.

The processor 3180 may control general operations of the display device 3100, control signal flows among the internal components of the display device 3100, and process data. When there is a user input or a condition predetermined and stored is met, the processor 3180 may execute an operation system (OS) or various applications stored in the memory 3190.

The processor 3180 may include RAM used as a storage for storing signals or data input from the outside of the display device 3100 or as a storage corresponding to various operations performed by the display device 3100, ROM storing control programs for controlling operations of the display device 3100, and a processor.

The processor may include a GPU for processing graphics corresponding to video data. The processor may be realized as a SoC combining a core and the GPU. The processor may include a single core, a dual core, a triple core, a quad core, or higher multiple core.

Also, the processor may include a plurality of processors. For example, the processor may be realized as a main processor and a sub-processor operating in a sleep mode.

The GPU may generate a screen including various objects, such as an icon, an image, text, etc. by using a calculator and a renderer to The calculator may use user interaction that is sensed through the sensor to calculate attribute values of each of the objects, such as a coordinate value, a shape, a size, a color, etc., via which the object is to be displayed according to a layout of a screen. The renderer may generate the screen of various layouts including the objects based on the attribute values calculated by the calculator. The screen generated by the renderer may be displayed in a display area of the display 3115.

The screen mirroring method according to an embodiment of the disclosure may be realized in the form of a program command which may be executed by various computing devices and may be recorded on a computer-readable medium. Also, one or more embodiments of the disclosure may include a computer-readable recording medium having recorded thereon one or more programs including instructions for executing the screen mirroring method described above.

The computer-readable recording medium may include program commands, data files, data structures, or a combination thereof. The program commands recorded on the computer-readable recording medium may be specially designed and constructed for the inventive concept or may be known to and usable by one of ordinary skill in a field of computer software. Examples of the computer-readable medium include storage media such as magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices that are specially configured to store and carry out program commands (e.g., ROMs, RAMs, or flash memories). Examples of the program commands include a high-level language code that may be executed by a computer using an interpreter as well as a machine language code made by a compiler.

According to the one or more of the embodiments of the disclosure, the screen mirroring method may be realized as a computer program product including a recording medium having recorded thereon a program for: obtaining a sentence constructed of multiple languages; obtaining vector values respectively corresponding to words included in the sentence constructed of the multiple languages by using a multiple language translation model; converting the obtained vector values into vector values corresponding to a target language; and obtaining a sentence constructed of the target language based on the converted vector values.

According to the display device, the mobile device, the screen mirroring method of the display device, and the screen mirroring method of the mobile device according to an embodiment of the disclosure, a user may conveniently view, through the display device, the screen of the mobile device simultaneously performing the plurality of tasks.

In detail, according to the display device, the mobile device, the screen mirroring method of the display device, and the screen mirroring method of the mobile device according to an embodiment of the disclosure, the screen of the mobile device simultaneously performing the plurality of tasks may be mirrored and displayed by the display device such that the user may conveniently view, as high quality images, the plurality of images respectively corresponding to the plurality of tasks.

While the disclosure has been particularly shown and described with reference to example embodiments thereof, it will be understood by one of ordinary skill in the art that various changes in form and details may be made therein without departing from the spirit and scope of the disclosure as defined by the following claims.

What is claimed is:

1. A screen mirroring method of a display device, the screen mirroring method comprising:
    based on the display device being requested to mirror a mobile device that performs a first task of an application to display a first screen, displaying a first image corresponding to the first screen on a screen of the display device;
    in response to a second task of the application being performed in the mobile device to display a second screen with the first screen while the first task is performed, receiving, from the mobile device, a control signal for displaying a second image corresponding to the second screen on a partial screen while the first image corresponding to the first screen is displayed on the screen of the display device;
    in response to the control signal being received, arranging the screen of the display device into a plurality of partial screens including a first partial screen and a second partial screen;
    receiving, from the mobile device, first window data corresponding to the first task and second window data corresponding to the second task, respectively; and
    displaying the first image based on the first window data on the first partial screen included in the screen of the display device and the second image based on the second window data on the second partial screen included in the screen of the display device.

2. The screen mirroring method of claim 1, wherein the control signal including information for arranging the screen of the display device into the plurality of partial screens,
    wherein the arranging of the screen of the display device comprises arranging the screen of the display device based on the information for arranging the screen of the display device into the plurality of partial screens.

3. The screen mirroring method of claim 2, wherein the control signal comprises information about a number of a plurality of tasks.

4. The screen mirroring method of claim 3, wherein the arranging of the screen of the display device comprises arranging the screen of the display device into the plurality of partial screens according to the number of the plurality of tasks.

5. The screen mirroring method of claim 3, wherein the arranging of the screen of the display device comprises arranging the screen of the display device into the plurality of partial screens, based on the number of the plurality of tasks, an aspect ratio of a display included in the mobile device, and an aspect ratio of a display included in the display device.

6. The screen mirroring method of claim 1, further comprising, when each of the first task and the second task is accompanied by an audio output, outputting, via the display device, audio data that is selected from the first task and the second task.

7. The screen mirroring method of claim 6, wherein the outputting of the audio data includes outputting audio data of a task corresponding to a window that is output on a main screen portion of the screen of the mobile device.

8. The screen mirroring method of claim 6, wherein the outputting of the audio data includes:
    selecting a task from the first task and the second task based on at least one of an application type or a task type; and
    outputting audio data corresponding to the task.

9. The screen mirroring method of claim 1, further comprising:
    transmitting information for notifying an occurrence of a change in at least one of task performed by the mobile device; and
    again arranging the screen of the display device based on the information for notifying the occurrence of the change.

10. The screen mirroring method of claim 1, further comprising performing a pairing operation between the mobile device and the display device,
    wherein the pairing operation comprises transmitting, via the display device, information about the screen of the display device to the mobile device.

11. The screen mirroring method of claim 1, further comprising setting the screen of the display device that includes the plurality of partial screens, based on a user input.

12. A display device comprising:
    a display;
    a communicator configured to communicate with a mobile device; and
    a processor configured to execute at least one instruction to:
        based on the display device being requested to mirror the mobile device that performs a first task of an application to display a first screen, display a first image corresponding to the first screen on a screen of the display device;

in response to a second task of the application being performed in the mobile device to display a second screen with the first screen while the first task is performed, receive, from the mobile device, a control signal for displaying a second image corresponding to the second screen on a partial screen while the first image corresponding to the first screen is displayed on the screen of the display device;

in response to the control signal being received, arrange the screen of the display device into a plurality of partial screens including a first partial screen and a second partial screen;

receive, from the mobile device, first window data corresponding to the first task and second window data corresponding to the second task, respectively; and display the first image based on the first window data on the first partial screen included in the screen of the display device and the second image based on the second window data on the second partial screen included in the screen of the display device.

13. The display device of claim 12, wherein the processor is further configured to execute the at least one instruction to:

control the communicator to receive, from the mobile device, the control signal including information for arranging the screen of the display device into the plurality of partial screens; and arrange the screen of the display into the plurality of partial screens based on the information for arranging the screen of the display device into the plurality of partial screens.

14. The display device of claim 12, wherein the processor is further configured to execute the at least one instruction to arrange the screen of the display into the plurality of partial screens, according to a number of a plurality of tasks.

15. The display device of claim 14, wherein the processor is further configured to execute the at least one instruction to arrange the screen of the display into the plurality of partial screens, based on the number of the plurality of tasks, an aspect ratio of a display included in the mobile device, and an aspect ratio of the display.

16. The display device of claim 14, further comprising an audio outputter configured to output audio data, wherein the processor is further configured to execute the at least one instruction to control the audio outputter to output audio data that is selected from the first task and the second task, when each of the first task and the second task includes an audio output.

17. The display device of claim 16, wherein the processor is further configured to execute the at least one instruction to output audio data of a task selected from the first task and the second task, the task corresponding to a window that is output on a main screen portion of the screen of the mobile device.

18. A mobile device comprising:

a display;

a user interface;

a communicator configured to communicate with a display device; and a processor configured to execute at least one instruction to:

while a first task of an application to display a first screen via the display is performed, execute a mirroring service to display a first image corresponding to the first screen on a screen of the display device;

in response to a second task of the application being performed in the mobile device to display a second screen with the first screen while the first task is performed, transmit, to the display device, a control signal for displaying a second image corresponding to the second screen on a partial screen of the screen of the display device while the first image corresponding to the first screen is displayed on the screen of the display device, and transmit, to the display device, first window data corresponding to the first task and second window data corresponding to the second task, respectively.

19. The mobile device of claim 18, wherein, the first window data comprises data for generating the first image corresponding to the first screen, and the second window data comprises data for generating the second image corresponding to the second screen.

* * * * *